(12) United States Patent
Verhoeven et al.

(10) Patent No.: US 11,367,007 B2
(45) Date of Patent: Jun. 21, 2022

(54) SYSTEMS AND METHODS FOR NETWORKS OF TIME SERIES

(71) Applicant: MYST AI INC., San Francisco, CA (US)

(72) Inventors: Pieter Joris Verhoeven, San Francisco, CA (US); Lucas Merrill Brown, Seattle, WA (US); Sean James MacPherson, San Francisco, CA (US); Titiaan Frans Marie Palazzi, San Francisco, CA (US); Allison Leigh Fero, San Francisco, CA (US)

(73) Assignee: MYST AI INC., San Francisco, CA (US)

(*) Notice: Subject to any disclaimer, the term of this patent is extended or adjusted under 35 U.S.C. 154(b) by 0 days.

(21) Appl. No.: 17/208,436

(22) Filed: Mar. 22, 2021

(65) Prior Publication Data

US 2021/0248496 A1 Aug. 12, 2021

Related U.S. Application Data

(63) Continuation of application No. 17/169,017, filed on Feb. 5, 2021.

(60) Provisional application No. 62/971,667, filed on Feb. 7, 2020.

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

2016/0062950 A1* 3/2016 Brodersen ............... G06F 17/18
702/181

OTHER PUBLICATIONS

Gao, Zhong-Ke, Michael Small, and Juergen Kurths. "Complex network analysis of time series." EPL (Europhysics Letters) 116.5 (2017): 50001. (Year: 2017).*

* cited by examiner

*Primary Examiner* — Kevin W Figueroa
(74) *Attorney, Agent, or Firm* — Van Court & Aldridge LLP

(57) ABSTRACT

This patent specification relates to systems and methods that use networks of standardized time series and models in a generic and extensible platform. More particularly, this patent specification relates to standardizing time series and models, using standardized time series and models in a network of time series (NOTS), and creating networks of time series in a NOTS platform. In addition, this patent specification relates to use of nodes that can be arranged in any user defined order, and each node is evaluated to return a time array that may be used to populate a time series. A layering framework may be used to define how each node is evaluated.

15 Claims, 34 Drawing Sheets

Time Series

Deterministic

- No Predictions Required

Non - Deterministic

- Predictions Required
  - Relative to the "As of Time"
    (Includes Start Offset and End Offset)
  - Not Relative to the "As of Time"
    (Includes Start Time and End Time)

FIG. 4

SYSTEMS AND METHODS FOR NETWORKS OF TIME SERIES

CROSS-REFERENCE TO A RELATED APPLICATION

This patent application is a continuation of U.S. patent application Ser. No. 17/169,017, filed Feb. 5, 2021, which claims the benefit of U.S. Provisional Application No. 62/971,667, filed Feb. 7, 2020, each of which is incorporated herein in its entirety.

TECHNICAL FIELD

This patent specification relates to systems and methods for using time series.

BACKGROUND

Machine learning or artificial intelligence is used to process data and provide useful results. One type of machine learning uses time series. A time series is a series of data arranged in time order. Examples of time series can be heights of ocean tides, historical weather, and daily closing value of the Dow Jones Industrial Average. In a machine learning context, time series can be used to predict unseen values based on previously observed values. That is a time series model can be fitted on available time series data so that values for other time steps can be predicted using the model in a supervised learning task.

SUMMARY

This patent specification relates to systems and methods that use networks of time series in a generic and extensible platform. More particularly, this patent specification relates to evaluating and creating a network of time series (NOTS) using a combination of sources, time series, operations, and models in a NOTS platform. The sources, time series, operations, and models are standardized in nodes that are used to define the NOTS, and the NOTS platform enables users to customize how data is evaluated by each time series by using a layering scheme.

A further understanding of the nature and advantages of the embodiments discussed herein may be realized by reference to the remaining portions of the specification and the drawings.

BRIEF DESCRIPTION OF THE DRAWINGS

FIG. 4 illustrates a table of different time series that may be used according to various embodiments;

DETAILED DESCRIPTION

Figure 1:
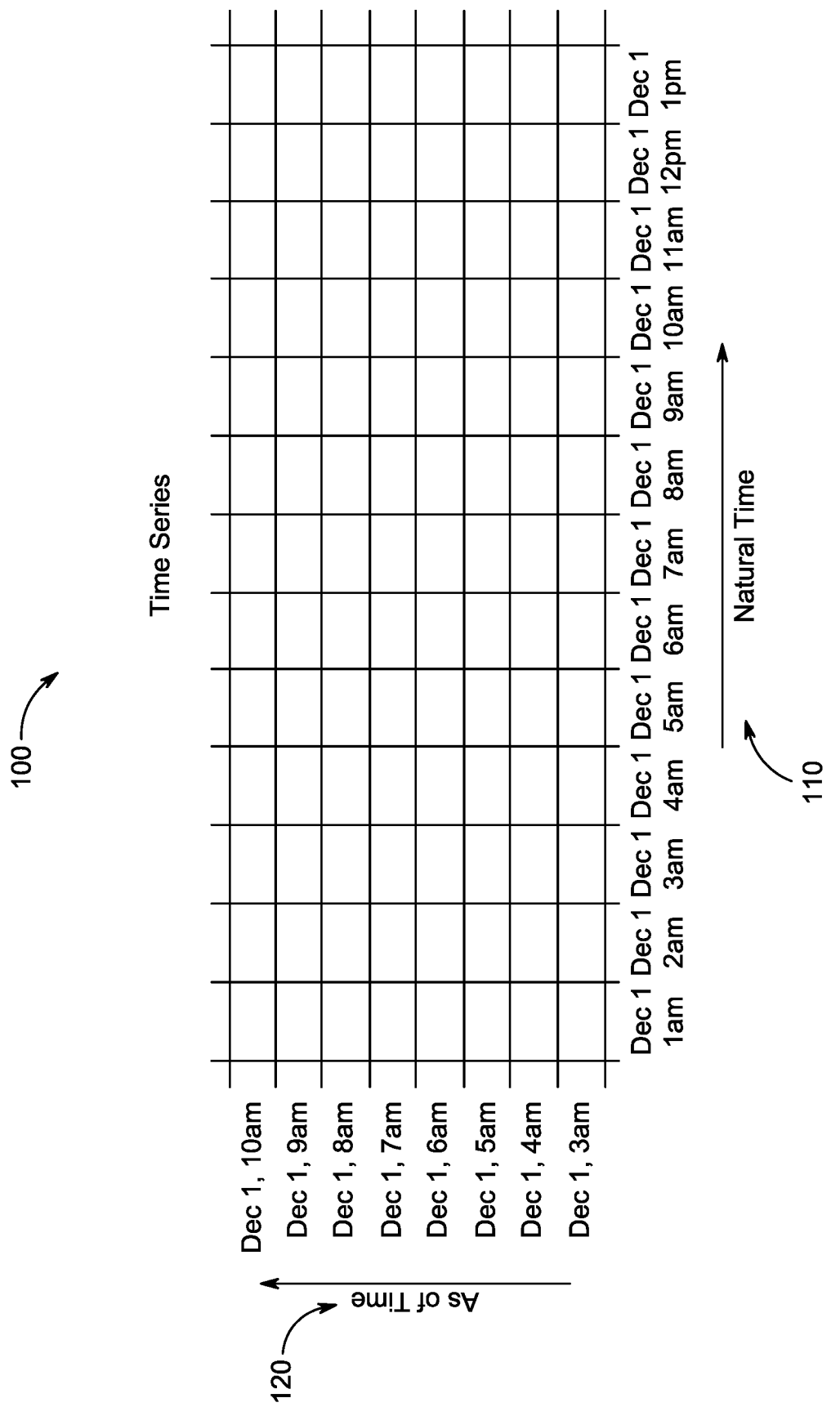
FIG. 1 shows an illustrative time series that is used by various embodiments.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Machine learning applied to the time series domain forms the basis of the embodiments discussed herein. A time series is a series of data arranged in time order. Time series are typically used by companies to measure specific phenomena that somehow impact their business and, based on these measurements, to better understand the past and to be able to reason about the future. Time series can also be used to predict present values (sometimes referred to as nowcasting), predict past values (sometimes referred to as backcasting), in addition to predicting future values (sometimes referred to as forecasting). Examples of time series are the heights of ocean tides, the numbers of products sold by an online retailer, the amount of energy generated by a solar or wind farm, and the daily closing value of the Dow Jones Industrial Average. What makes time series unique compared to other types of data are its natural temporal ordering and its inherent correlation in time with itself and other time series. These correlations in time imply that one time series can be used to predict another time series. One example of this might be how a World Cup soccer final that takes place in Brazil may have a significant impact on the energy consumption in the Netherlands during the event, where people might be watching the game on television. Another example would be how the real-time price of electricity in the ERCOT market might depend on the wind speed at the largest wind farms in Texas around that same time. In a world that is becoming increasingly more connected, systems and methods discussed herein can leverage this global interdependence of time series and provide high value predictions to help users (e.g., businesses) make decisions and/or take actions.

Time series forecasting is the field that uses statistical models to predict future values of a particular time series based on previously observed and predicted values of itself or other time series. Systems and methods disclosed herein can use machine learning to predict unseen values, which may lie in the future, the present, the past, or a combination thereof, on much larger global scale than previously possible, leveraging complex relationships between potentially hundreds, thousands, or millions or more time series. The systems and methods disclosed herein can integrate new time series as they are created, thereby expanding the pool of time series that may be accessed to predict values for a particular time series.

Systems and methods are described herein that use a platform to enable users to build a network of time series (NOTS). The network of time series can include any combination of time series, sources, operations, and models. The time series, sources, operations, and models can each be represented as a node in a NOTS. Each node is standardized so that data can be freely used among any of the nodes that make up the NOTS. This way, the output of any node can be used as an input to any node. The nodes within a NOTS are arranged in an upstream-downstream format in which evaluation of any given node requires that all upstream nodes that directly or indirectly feed into that given node be evaluated in order for the given node to be evaluated. These upstream nodes can be other time series, sources, operations, or models.

Sources point to internal or external sources from which data can be obtained. When a source is evaluated, data can be obtained from a source for a specific range of natural times and an as of time, and an "evaluation result" is returned that includes a time array of the obtained data. The evaluation results of a source can be mapped into a time series through one or more "source layers". Operations can receive zero or more time series as input(s), and when run, can return one or more time arrays encapsulated in an "evaluation result." These operations can be mapped to a time series through one or more "operation layers". Examples of operations include multiplying two time series, computing a percentile of a normal distribution, or splitting a time series into smaller sub-arrays. Models can produce one or more time arrays encapsulated in an "evaluation result" based on one or more time series as input(s). Models, in contrast with operations, are fitted (or trained) so that the model can provide the time array(s) encapsulated in an evaluation result. When fitted, a model returns a "fit result", which contains its fit parameters based on the one or more time series it was fitted on. Models may be called "stateful", whereas operations may be called "stateless". Models may produce a transformation or prediction based on one more time series. Examples of models include linear regression, neural networks, k-means clustering, principal component analysis, or min-max scaling.

A time array represents the data returned during evaluation of a time series node, a source node, an operation node, or a model node. The time array can be part of a multidimensional array having a first axis representing a time dimension. New time arrays may be realized each time the node is evaluated. The time arrays can be provided to another node, stored in a database, or presented in a user interface. In some embodiments, each node may query data that has been stored across many evaluations. The user interface may obtain data through these queries and present the data.

The time array is a specific instance of a time series representation of data, and it is this representation of data that is standardized for all nodes in the NOTS such that data can be passed from one node to another. Thus, each node returns a time array embodied as a time series-hence the basis for the term network of time series. The term "time series" is used in two separate contexts throughout this document. In one context, time series refers to a time series node (e.g., node that include a layer pointing to a source, operation, or model), and in the other context, time series refers to a general name for data with a time dimension. Examples of different time series arrangements are shown below in connection with FIGS. 1, 2A, 2B, 3A, and 3B.

FIG. 1 shows an illustrative time series 100 that is used by various embodiments as described herein. As shown, time series 100 has two different time axes. The first axis is a "natural time" axis 110 (shown along the x-axis) and the second axis is an "as of time" axis (shown along the y-axis). Both axes 110 and 120 are arranged according to the same time interval (e.g., shown here as hours within a given day). The empty boxes within the grid formed by natural time axis 110 and as of time axis 120 can be populated with a time series value (if known or predicted) or can be null if unknown (e.g., neither known nor predicted). A time series value may be a scalar, tensor, categorical variable, probability distribution, or any other type of data. Many of the time series examples expressed herein are scalar time series. It should be understood that any suitable time interval may be used in axes 110 and 120. For example, the time intervals can be on the order of seconds, minutes, hours, days, weeks, years, or other suitable time metric. The time interval used across the natural time axis may be referred to as the sample period. The time period framing the start and end times of the time intervals may be the same or different for axes 110 and 120. For example, the time period of both the natural time axis 110 and as of time axis 120 may be set at one-hour intervals from a start time to an end time for a given year, multiple years, decades or longer.

Natural time axis 110 refers to the ordinary or actual time that is associated with a time series value or a null value. Natural time axis 110 can span across past time, current time, and future time. The current time can refer to the instantaneous time such as Greenwich Mean Time (GMT) or Pacific Standard Time (PST). In some embodiments, the time series value is known for a particular time interval. Known time series values can be based on deterministic knowledge (e.g., time of the day, the position of the planets on any given day, etc.) or historical knowledge (e.g., knowledge gathered based on observations). Historical knowledge can be, for example, temperature readings. Thus, if time series 100 is a temperature time series, and the temperature at 1:00 am was 42F, the time series value associated with 1:00 am is 42F. In other embodiments, the time series value is unknown. For example, if the time series values for a time series are derived from historical knowledge, but the records for a period in the past are missing, the time series values associated with the time intervals in that past period may be set to null or not available (n/a). As will be explained in more detail below, these unknown time series values can be populated with predictions using embodiments described herein. In yet another embodiment, the time series value for a given time interval can be a prediction. For example, referring again to the temperature time series example, the time series values for the time intervals from 2:00 am through 1:00 pm may be populated with predicted time series values when the current time is 1:00 am. These predicted time series values are made in conjunction with an as of time interval as shown in as of time axis 120.

As of time axis 120 refers to a point in time when one or more time series values are predicted for one or more time intervals across natural time axis 110. FIG. 1 shows as of time intervals of 3 am-10 am. Each of these time intervals can represent the point in time in which predictions for time series values are made, based on the knowledge that was available at that moment in time. For example, for the 3:00 am as of time interval, predictions can be made for natural time intervals 1:00 am-1:00 pm across natural time axis 210, and at the 4:00 am as of time interval, predictions can be made for natural time intervals 1:00 am-1:00 pm across natural time axis 210, and so on. It should be appreciated that if the time series value for a natural time interval is known, that known time series value may likely take precedence over the predicted time series value. For example, assume the current time is 4:00 am, but there is no historical data available for natural time intervals 1:00 am-4:00 am. In this situation, the predicted time series values may be used for natural time intervals 1:00 am-4:00 am and the as of time interval 4:00 am. If the historical data for natural time intervals 1:00 am-4:00 am finally becomes available at 6:00 am, the known values for natural time intervals 1:00 am-4:00 am would have an as of time interval of 6:00 am.

The predictions generated for any as of time interval can be projected into the past, the future, the present, and any combination thereof with respect to time intervals across natural time axis 110.

Figure 2A:
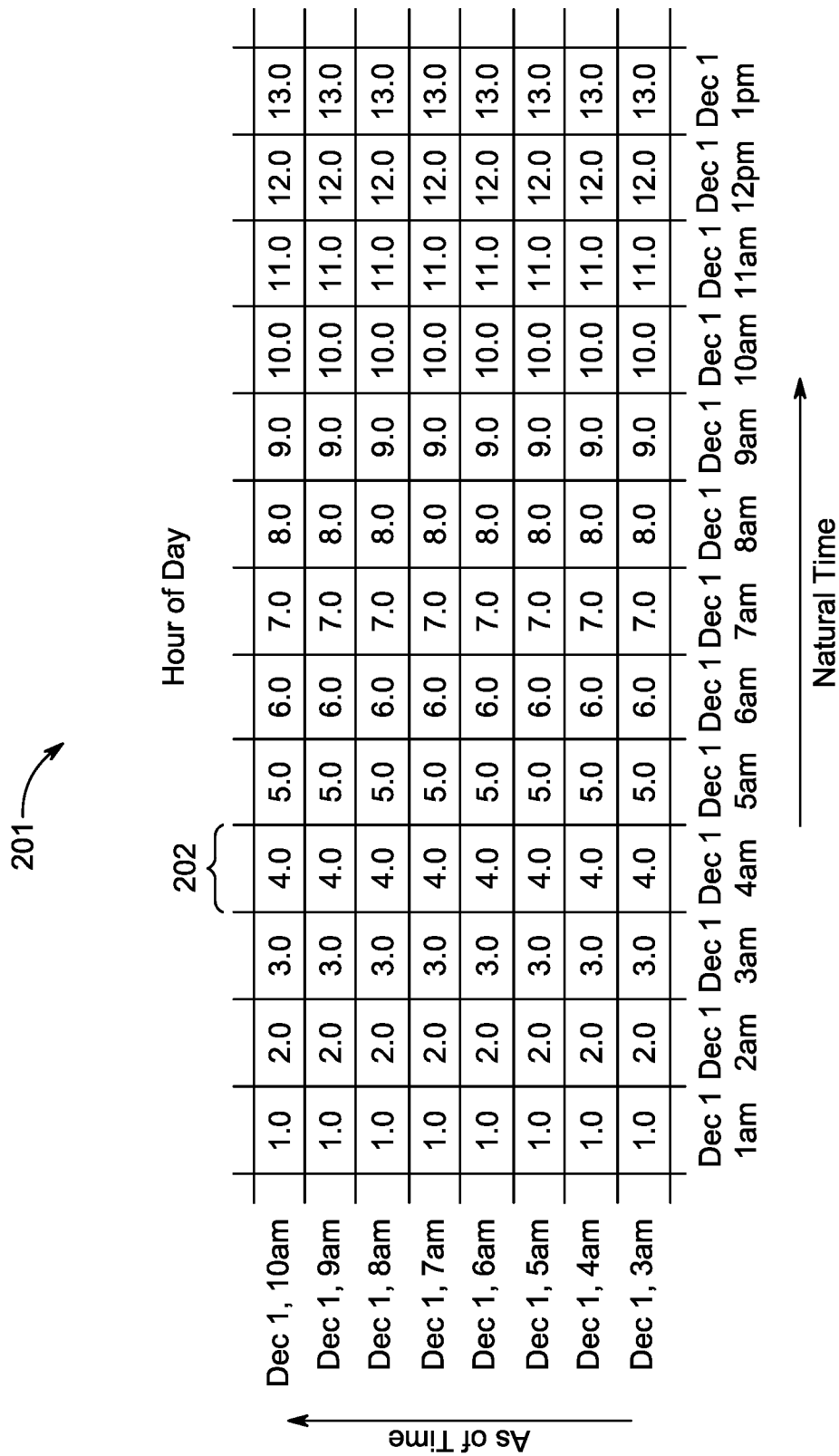
FIGS. 2A, 2B, 3A, and 3B show several different time series examples illustrating different contextual uses of natural time and as of time according to various embodiments.

FIGS. 2A, 2B, 3A, and 3B show several different time series examples illustrating different contextual uses of the natural time and as of time axes. FIG. 2A shows illustrative hour of the day time series 201. Time series 201 is an example of a deterministic time series. In deterministic time series, the as of time intervals have no impact on any of the time series values across the natural time axis. This is because the hour of the day will be the same regardless of when any system is making a prediction of the time of day. For example, all of the as of time intervals associated with column 202 (e.g., 4 am column) are the same.

Figure 2B:
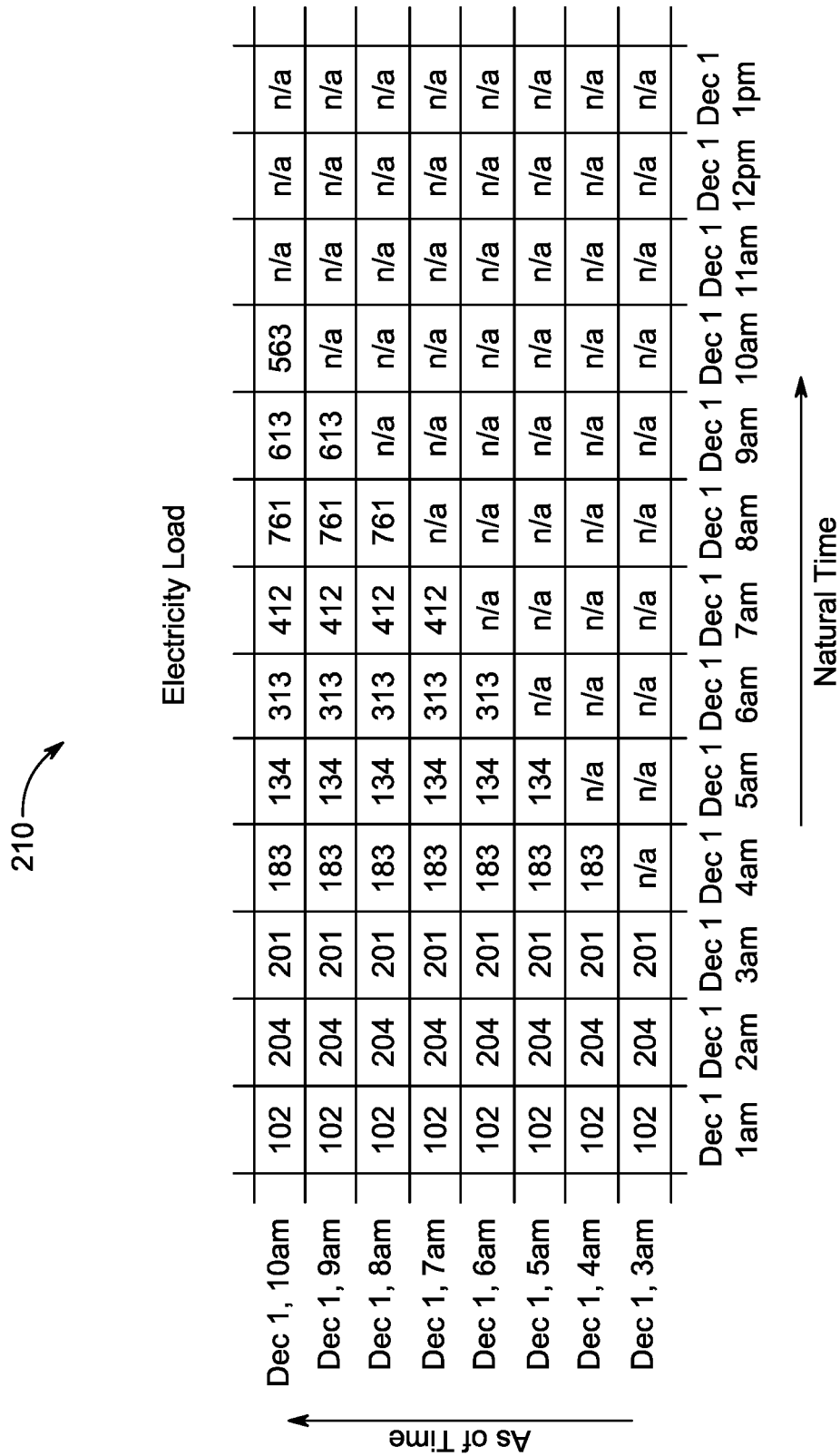

FIG. 2B shows illustrative electricity load time series 210. Electricity load time series 210 may only include historical data. In time series 210, predictions are not used to populate time series future values relative to the as of time intervals and those unpopulated time series values are null (e.g., N/A). Note that in this example the time series values across the natural time axis are always available up until their respective as of time intervals, e.g. natural time intervals 1:00 am-6:00 am for as of time interval 6:00 am. However, there could be a two-hour delay before historical data becomes available such that for as of time interval 6:00 am data is available for natural time intervals 1:00 am-4:00 am and the values for natural time intervals 5:00 am-6:00 am are null.

Figure 3A:

FIG. 3A shows illustrative temperature time series 320. Temperature time series 320 may include known values and predicted values. Predictions for different as of time intervals are used to populate the future intervals across the natural time axis. In temperature time series 320, the predicted values are analogous to forecasted values, since they all lie in the future relative to their respective as of time intervals. For example, the 3:00 am as of time interval can represent predictions for natural time intervals 4:00 am-1:00 pm (as shown by circle 321). The 4:00 am as of time interval can represent predictions for natural time intervals 5:00 am-1:00 pm (as shown by circle 322). The 5:00 am as of time interval can represent predictions for natural time intervals 6:00 am-1:00 pm (as shown by circle 323). The 6:00 am as of time interval can represent predictions for natural time intervals 7:00 am-1:00 pm (as shown by circle 324). The 7:00 am as of time interval can represent predictions for natural time intervals 8:00 am-1:00 pm (as shown by circle 325). The 8:00 am as of time interval can represent predictions for natural time intervals 9:00 am-1:00 pm (as shown by circle 326). The 9:00 am as of time interval can represent predictions for natural time intervals 10:00 am-1:00 pm (as shown by circle 327). The 10:00 am as of time interval can represent predictions for natural time intervals 11:00 am-1:00 pm (as shown by circle 328). It is important to note that for the purpose of this example the natural time was limited to 1 pm, which means that each of the previously described predictions had a different number of natural time intervals. In practical scenarios, predictions typically have the same number of natural time intervals.

The historical data is consistent across as of time intervals when the natural time interval precedes or matches the as the time interval. For example, time series values in columns 331-333 are the same throughout the entire range of as of time intervals. In column 334, for example, the time series values are the same from as of time interval 5:00 through as of time interval 11:00 am, with the time series values at as of time intervals 3:00 am and 4:00 am being predicted time series values. In column 335, the time series values vary across the as of time axis, thus indicating that predicted time series values are not necessarily going to be consistent or accurate.

Figure 3B:
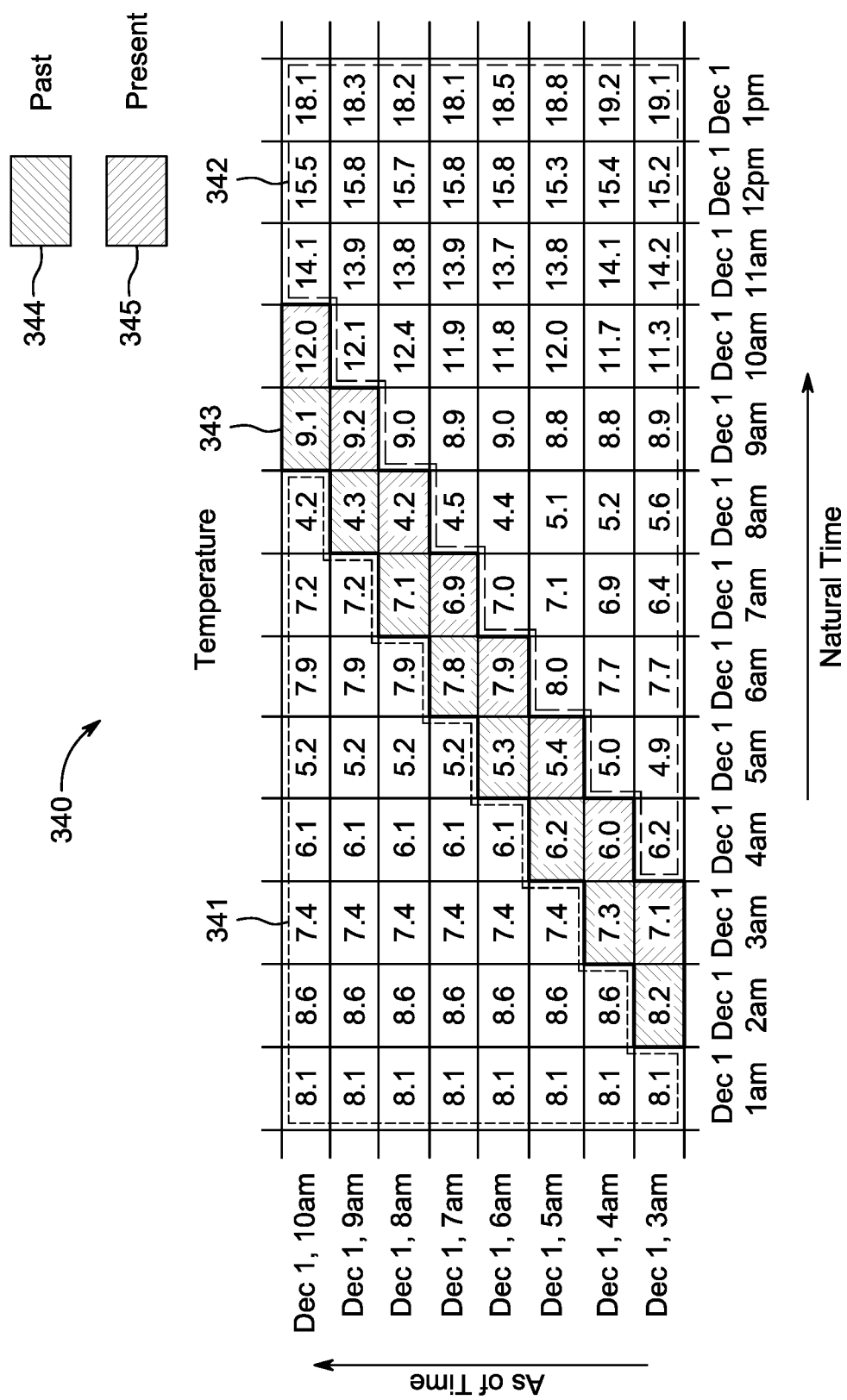

FIG. 3B shows illustrative temperature time series 340. Temperature time series 340 may include known values and predicted values that include past, present, and future predicted values. The predictions for different as of time intervals can be used to populate the past, present, and future intervals across the natural time axis. The known time series values are contained within outline 341 and the future predicted time series values are contained within outline 342. The past and present predicted time series values are contained within outline 343. The past predicted time series values are shaded according to the hash marks set forth in box 344, and the present predicted time series values are shaded according to the hash marks set forth in box 345. Referring now specifically to the 5:00 am as of time interval, the time series values for natural time intervals 1:00 am-3:00 am are known values (e.g., shown as 8.1, 8.6, and 7.4, respectively). The time series value at the 4:00 am natural time interval (e.g., 6.2) is a past predicted time series value because the 4:00 am natural time interval is before the 5:00 am as of time interval. The time series value at the 5:00 am natural time interval (e.g., 5.4) is a present predicted time series value because the 5:00 am as of time interval is the same as the natural time interval. It may be that the historical temperature data has a two-hour upload delay, hence the reason the time series values for natural time intervals 4:00 am-5:00 am corresponding to the 5:00 am as of time interval are past and present predictions. The time series values spanning natural time intervals 6:00 am-1:00 pm (e.g., 8, 7.1, 5.1, 8.8, 12, 13.8, 15.3, and 18.8, respectively) are future predicted values because they occur after the 5:00 am as of time interval.

The combination of the as of time and natural time for a time series, or any time array, can be a standardized format that is used by all nodes within a NOTS. This enables data "evaluated" or returned for any node to be used with any other node within the NOTS. This also enables prior evaluations that have been stored in a database, for example, to be accessed and evaluated by new nodes that did not exist when the data was initially stored.

A network of time series (NOTS) platform can handle or classify data according to as of time and natural time axes using a number of different criteria. The as of time interval can be determined when data is pulled in from a data source. The data source suppliers can be required to provide timestamps for every data point being provided across the natural time axis. For example, when an integration is setup with a customer for pulling regularly updated historical data (e.g. electricity load), "snapshots" of the data can be pulled that are available through the integration using a regular "refresh period". The refresh period is determined by how often new data is expected to be available. For every new snapshot, the as of time interval associated with the new snapshot can be tagged with the current timestamp since that is the time "as of" which that data was received.

The intervals of the as of time and natural time axes can be set to a predefined interval such as one second, one minute, one hour, or one day. In other embodiments, the interval can be based on a contractual agreement between a customer or vendor and the NOTS platform. In yet other embodiments, a received time series can be resampled to achieve the desired sample period (i.e. the interval used across the natural time axis). In some specific examples, the NOTS platform may use more fine-grained data (e.g., 10 minute sample period) and resample it to a more coarse-grained sample period. As another example, the NOTS platform may use "interval end" (take the measurement made at the end of the interval, so, for example, the measurement for 3 pm is used for the natural time interval 2 pm), "interval start" (take the measurement made at the start of the interval, so, for example, the measurement for 3 pm is used for the natural time interval 3 pm) or "interval mean" (take the mean of all measurements in a certain interval, so, for example, the measurements in 1:30-2:30 pm are averaged and used for the natural time interval 2 pm).

The NOTS platform can have as many as of time intervals as deemed necessary. In one embodiment, the as of time intervals can be set to every sample period. If desired, the granularity of the as of time intervals can be much finer. For example, for a time series with a one-hour sample period, and the NOTS platform creates new predictions every hour, or it receives new historical data snapshots every hour, each hour can correspond to a new as of time interval.

FIG. 4 illustrates a table of different time series that may be used according to various embodiments discussed herein. The time series can be classified as a deterministic time series or a non-deterministic time series. Deterministic time series do not require any predictions, because all values are either known or can be computed deterministically. For example, deterministic time series can include deterministic knowledge (e.g., time of the day or the relative positive of the moon relative to the earth). Time series 102 of FIG. 3A, respectively, is an example of a deterministic time series. In some embodiments, deterministic time series do not need to include both the as of time axis and the natural time axis, but can include both. In some embodiments, the deterministic time series can include only the natural time axis.

Non-deterministic time series require predictions for certain combinations of natural time intervals and as of time intervals. Non-deterministic time series are arranged to include both the as of time axis and the natural time axis. In one embodiment, the natural time intervals of the predictions can be relative to the as of time intervals. That is the predictions generated across the natural time axis are relative to the as of time intervals. The degree to which the predictions are relative to the as of time intervals are defined by a start offset and an end offset. Thus if the as of time interval is X, the prediction values generated for as of time interval X start at (X+the start offset) and end at (X+the end offset) along the natural time axis. For example, if the sample period is one hour, the start offset can be +1 hour and the end offset can be +8 hours. In this example, such offsets can be used to predict future natural time intervals. As another example, the start offset can be −1 hours and the end offset can be +8 hours. In this example, such offsets can be used to predict past, present, and future natural time intervals. In yet another example, the start offset can be −2 hours and the end offset can be 0 hours. In this example, such offsets can be used to predict the past and present natural time intervals. In yet another example, the offsets can be set such that only past natural time intervals are predicted.

In another embodiment, the predictions are not relative to the as of time intervals. That is the predictions are generated between a fixed start time and end time across the natural time axis. For example, the start time may be a specific date and time such as January 8 at 12 pm and the end time may also be a specific date and time such as January 9 at 4 pm. In this example, predictions can be generated for each interval across the natural time axis from January 8 at 12 pm through January 9 at 4 pm. The start and end times can result in predictions for past natural time intervals, present natural time intervals, future natural time intervals, and any combination thereof. In yet another embodiment, the predictions can be generated for a fixed start time and the end time may be determined using an offset relative to the as of time interval, or vice versa.

Other embodiments discussed herein use a network of time series to generate predictions that enable users or entities to perform actions based on the generated predictions. A network of time series (NOTS) system can assemble an array of different time series and use machine learning models to generate time series prediction values for an actionable time series that is used by a user or entity. Examples of machine learning models that may be used for time series predictions are: linear regression, recurrent neural networks, convolutional neural networks, random forests, gradient tree boosting. The NOTS system can leverage any of the time series by standardizing all of the time series data, for example, by organizing the time series data according to the deterministic or non-deterministic time series as discussed above. This standardization enables individual nodes (e.g., time series, sources, operations, or models) in the network to interact freely with each other, without having to necessarily understand the underlying mechanisms that were used to generate data. In this NOTS system, the as of time interval is communicated across nodes upstream to ensure that the models generating the predictions never have access to data that was not available at that specific point in time. For example, the NOTS system can enable a Japanese company that predicts the global weather to share its time series data with an Austrian solar asset owner that wants to use the weather data to predict power generation, without either party having to understand each other's specific context and APIs. The Austrian solar asset owner may sell or share its predictions with the operator of the Austrian Power Grid, which can integrate this directly into its grid optimizations. The Austrian Power Grid operator does not need to know anything about the data sources used to create the predictions it receives from the Austrian solar asset owner. Because the integration does not change based on the sources changing, this also allows the Austrian solar asset owner to change to using a Brazilian global weather forecaster to produce better predictions. The Austrian Power Grid operator will continue to receive forecasts in the same NOTS data model and API contract despite the change.

The standardization process that enables time series to be uniformly accessed by any party is similar to the way any party can access a website via the "Internet". The Internet is a global computer network providing a variety of information and communication facilities, consisting of interconnected networks using standardized communication protocols. The rise of the World Wide Web went hand in hand with the adoption of the HTTP protocol, which allowed users to easily access resources across the Internet, without having to understand each other's specific context and infrastructure.

The NOTS system standardizes time series such that they are easily accessible over a network of time series or an "Internet of Time Series" (IOTS), without requiring different parties to understand how the time series was created or the data underlying the time series. For example, the NOTS system can enable any party to access any time series in the world by going to a simple link. Through this link, one will be able to perform actions such as retrieving, storing, updating, or deleting time series values for a particular time series, for any combination of natural time intervals and as of time intervals. Which of these actions a particular user might be allowed to perform depends on the level access they have for a specific time series.

For example, an illustrative time series link could be:
ts://fbe874de-2623-4e36-9ef8-69debd141a69,
where "ts" represents the protocol and "fbe874de-2623-4e36-9ef8-69debd141a69" represents the unique identifier of the time series. Such a link would allow any person or organization to share their time series data with any other person or organization in a standardized format. In addition, being able to access time series via these links would enable a person or organization to create new time series that are leveraging others' time series. For example, a weather time series might be used in a model to predict an energy time series, and an energy time series might be used in a model to predict a financial market time series.

The NOTS system supports the creation of a new value chain by enabling users to use standardized time series existing in a pool of standardized time series to create higher value time series using standardized models that are compatible with the standardized time series. As a byproduct of the NOTS system, containing the standardized time series and the standardized models, companies may form to focus solely on measuring time series data, while other companies may focus on using existing time series to develop models that predict higher value time series. Moreover, many other companies will use standardized time series to solve actual real-world problems by taking specific actions or applying specific controls. An example of this would be how the operator of an electric grid uses the time series of all the demand and supply in the market to make decisions on how to optimally distribute the electricity. These resulting actions or control signals can also be time series that become part of the NOTS pool of time series.

Figure 4A:
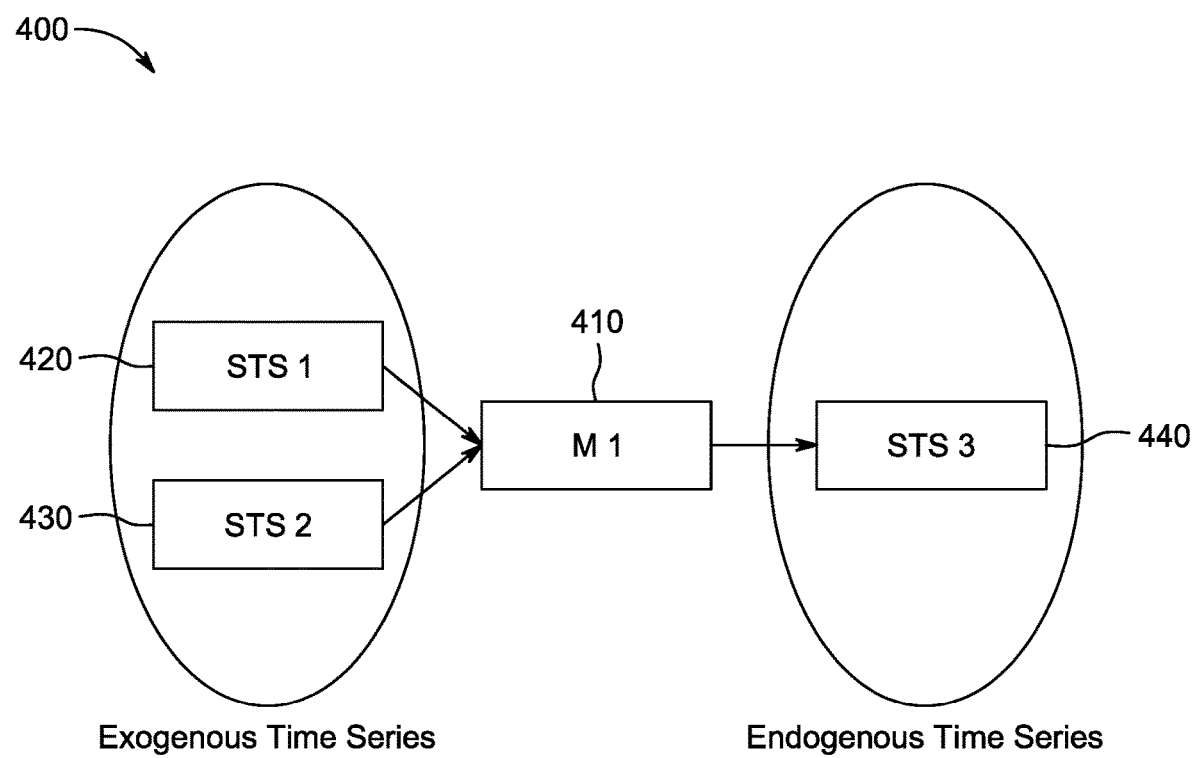
FIGS. 4A, 4B, 4C, and 4D show illustrative block diagrams showing how models can be used to predict time series according to various embodiments.

FIGS. 4A-4D show illustrative block diagrams showing how models can be used to predict time series. Specifically, it shows how time series are first used to fit models, how fit models are then used to predict values, and how model time series may hold values according to various embodiments. FIG. 4A shows network of time series 400 that includes model 410 using one or more input time series, shown here as source time series 420 and 430 to predict one or more output time series, shown here as source time series 440. Each of time series 420, 430, and 440 can be individual nodes (e.g., source nodes representing different time series that are used as a source or input to another node) in NOTS 400. Input time series may be referred to as feature time series, predictor time series, explanatory time series, independent time series, or exogenous time series. Output time series may be referred to as target time series, label time series, response time series, explained time series, dependent time series, or endogenous time series. In order for model 410 to predict the output time series (or endogenous time series), model 410 is first fitted on examples of pairs of exogenous time series values and endogenous time series values for combinations of natural time intervals and as of time intervals. An exogenous time series contains values for the combinations of natural time intervals and as of time intervals used to fit the model, as well as for the combinations for which one wants to create predictions for the endogenous time series. An endogenous time series contains values for combinations of natural time intervals and as of time intervals that are used to fit the model.

Figure 4B:
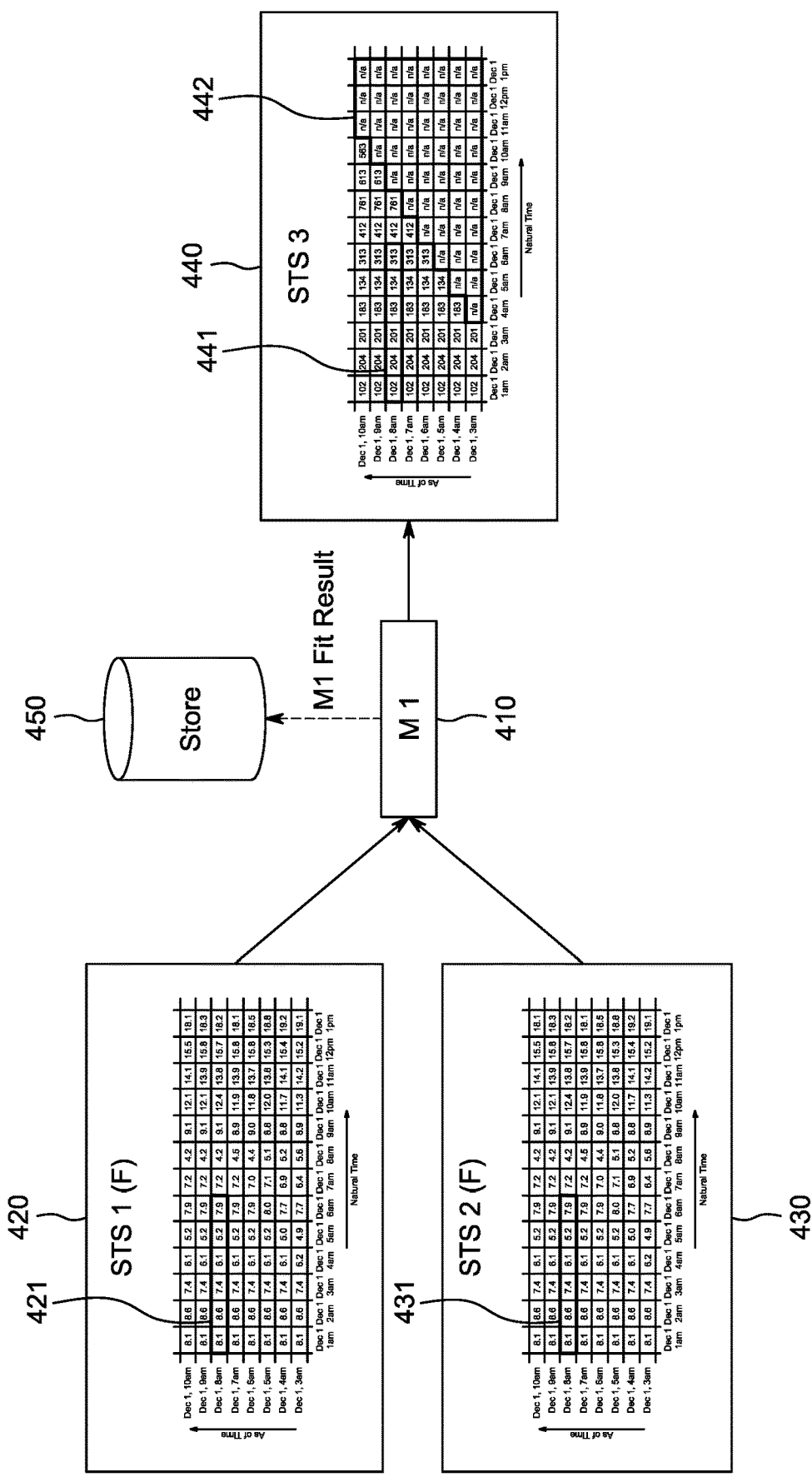

As shown in FIG. 4B, model 410 is fit using values located at specific natural time intervals and as of time intervals within each of exogenous time series 420 and 430 and endogenous time series 440. Note that for simplicity in FIG. 4B the values in exogenous time series 420 and 430 are identical, but in real-world use cases these would likely always be different. Any suitable number of values for any combination of natural time intervals and as of time intervals from time series 420, 430, and 440 can be used to fit model 410. For the purposes of this discussion and as an example, the values are for the specific natural time intervals and as of time intervals that are highlighted by boxes 421, 431, and 441. There are six values in each highlighted box, derived from each of time series 420, 430, and 440 that are used to fit model 410. The fit result for the model is stored in storage 450. The model fitting process can be repeated any number of times involving different combinations of natural time intervals and as of time intervals for each of time series 420, 430, and 440, each resulting in a specific fit result that is tagged by the specific natural time intervals and as of time intervals that were used. For example, a model may be fit every two hours using data from the most recent 24 hours supplied by time series 420, 430, and 440. In some embodiments, the exogenous time series values or endogenous time series values used to fit the model may contain null values.

Figure 4C:
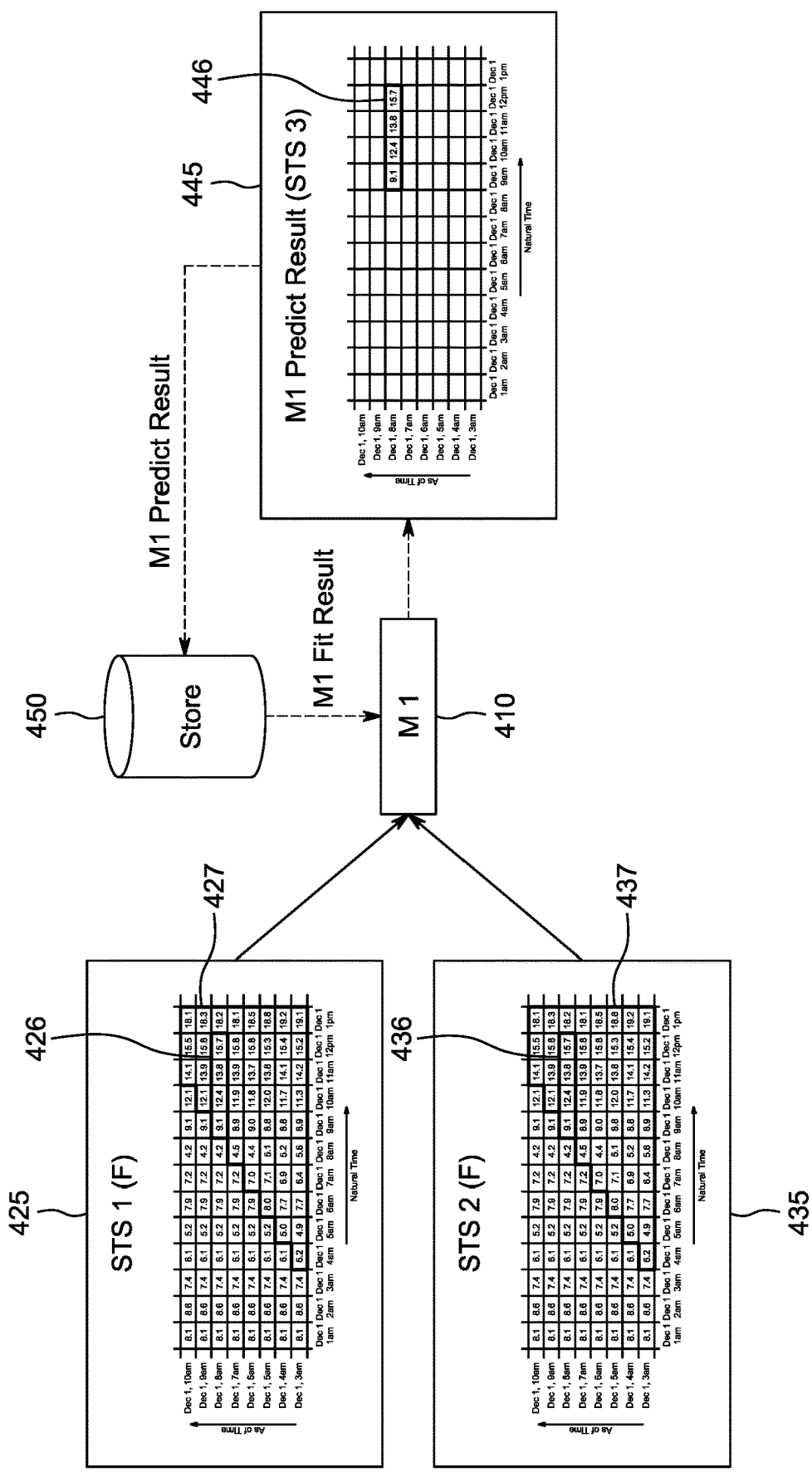

FIG. 4C illustrates a concept where a fitted model 410 can predict endogenous time series values based on one or more exogenous time series. As shown in FIG. 4C, exogenous times series 425 and 435 supply values for a specific as of time interval and specific natural time intervals, which is delineated by outlines 426 and 436. The values in outlines 426 and 436 may include future predicted or deterministically known values. All values contained within outlines 427 and 437 may be future predicted or deterministically known values, and values located left of outlines 427 and 437 may be past predicted, present predicted, or known values. Model 410 may be fit with a fit result provided by storage 450. Model 410 can produce predictions in the form of model predict result for a particular combination of natural time intervals and as of time intervals, shown in FIG. 4C as model predict result 445. Model predict results can be similar to a model evaluate result. The predicted values are shown in outline 446 and correspond to the same specific as of time interval and natural time intervals from the exogenous time series values. Model predict result 445 may be stored in storage 450. Note that in this example model predict result 445 contains predicted values for only time series 440. In another example there could be multiple endogenous time series, in which case the model predict result would contain predictions for all of these endogenous time series.

Figure 4D:
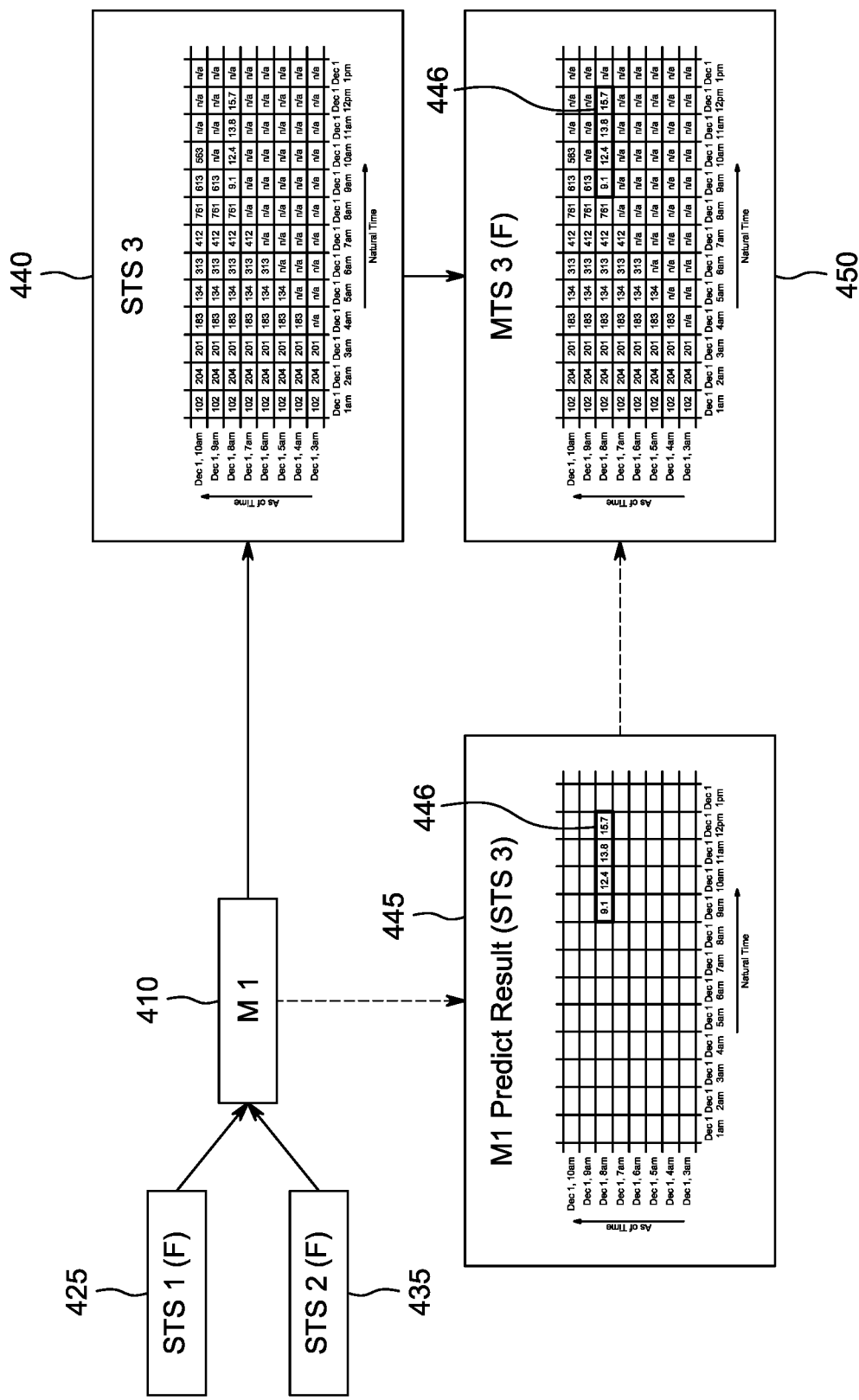

FIG. 4D shows how a model time series 450 is created to hold predicted values created by the fitted model 410. FIG. 4D shows exogenous time series 425 and 435, endogenous time series 440, predict result 445, and model time series 450. The values for all combinations of natural time intervals and as of time intervals, including known and unknown values, included in endogenous time series 440 are copied to model time series 450. These values (supplied by time series 440) can serve as the foundation of values that populate model time series 450. The predicted values contained within outline 446 of predict result 445 overwrite respective values supplied by endogenous time series 440 for the specific natural time intervals and as of time interval in the predict result. That is, the values in outline 446 that correspond to the specific as of time interval and natural time intervals within predict result 445 are used to overwrite the values corresponding to same specific as of time interval and natural time intervals within time series 450. Thus, when endogenous time series 440 is used to populate model time series 450, these null or not available values (in outline 442 of FIG. 4B) are overlaid with the predicted values generated by model 410 based on the exogenous time series 420 and 430. Model time series 450, which may now have values (i.e. not null) for future natural time intervals relative to the as of time intervals, can then be used as an exogenous time series for another model, if desired.

Figure 5:
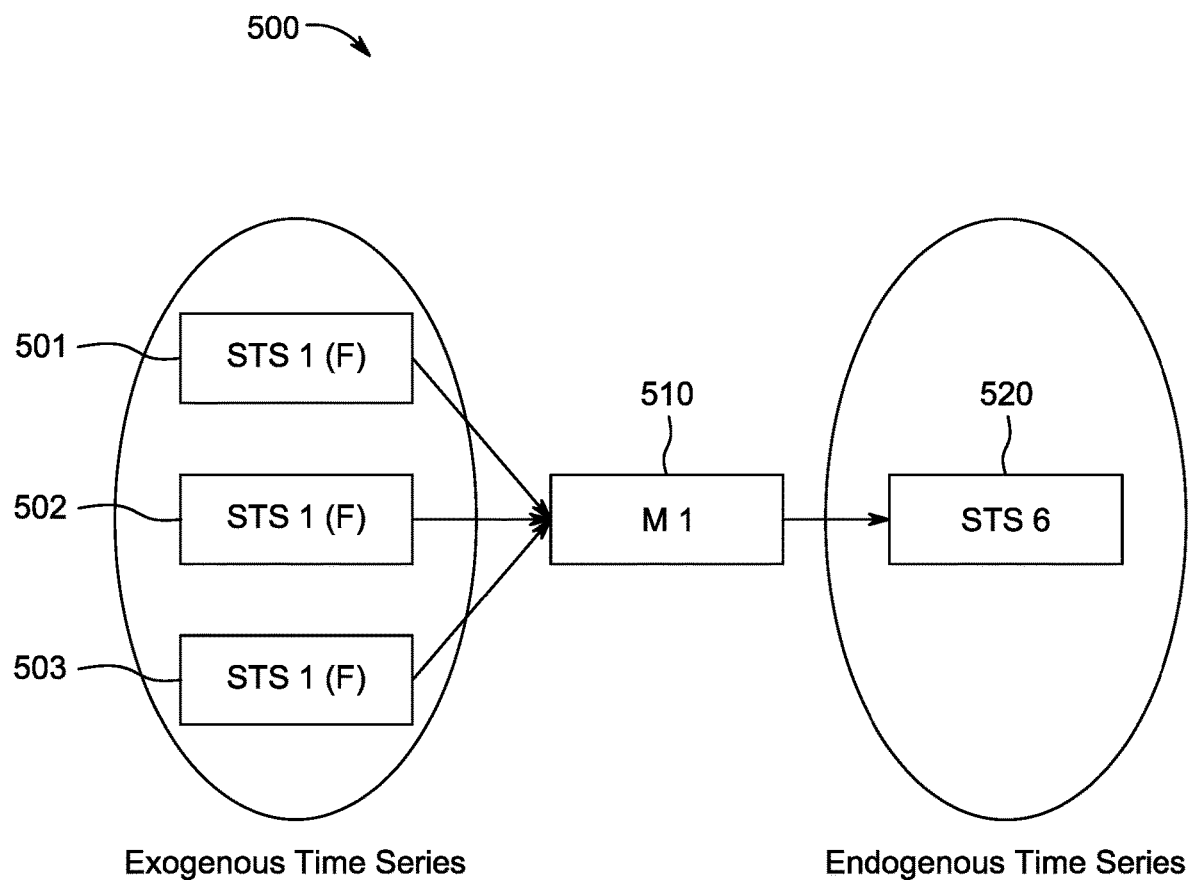
FIGS. 5, 6, 6A, 7, 8, and 9 show several different illustrative networks of time series according to various embodiments.
Figure 6:
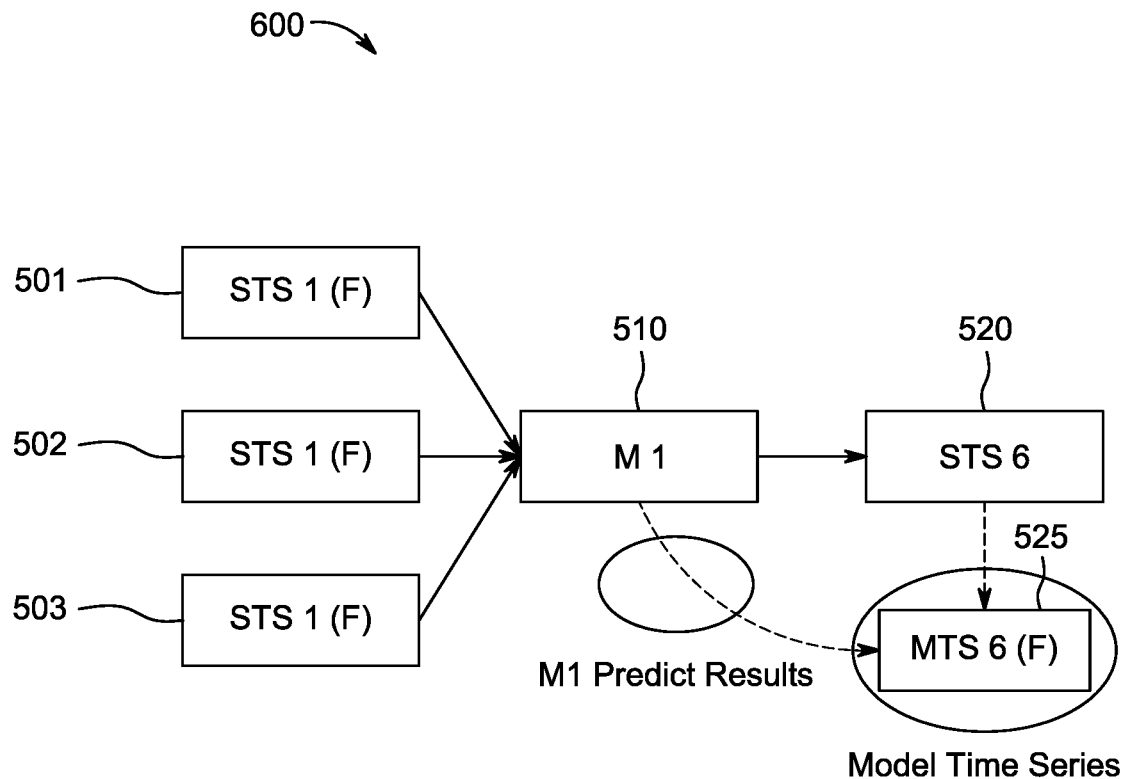
Figure 7:
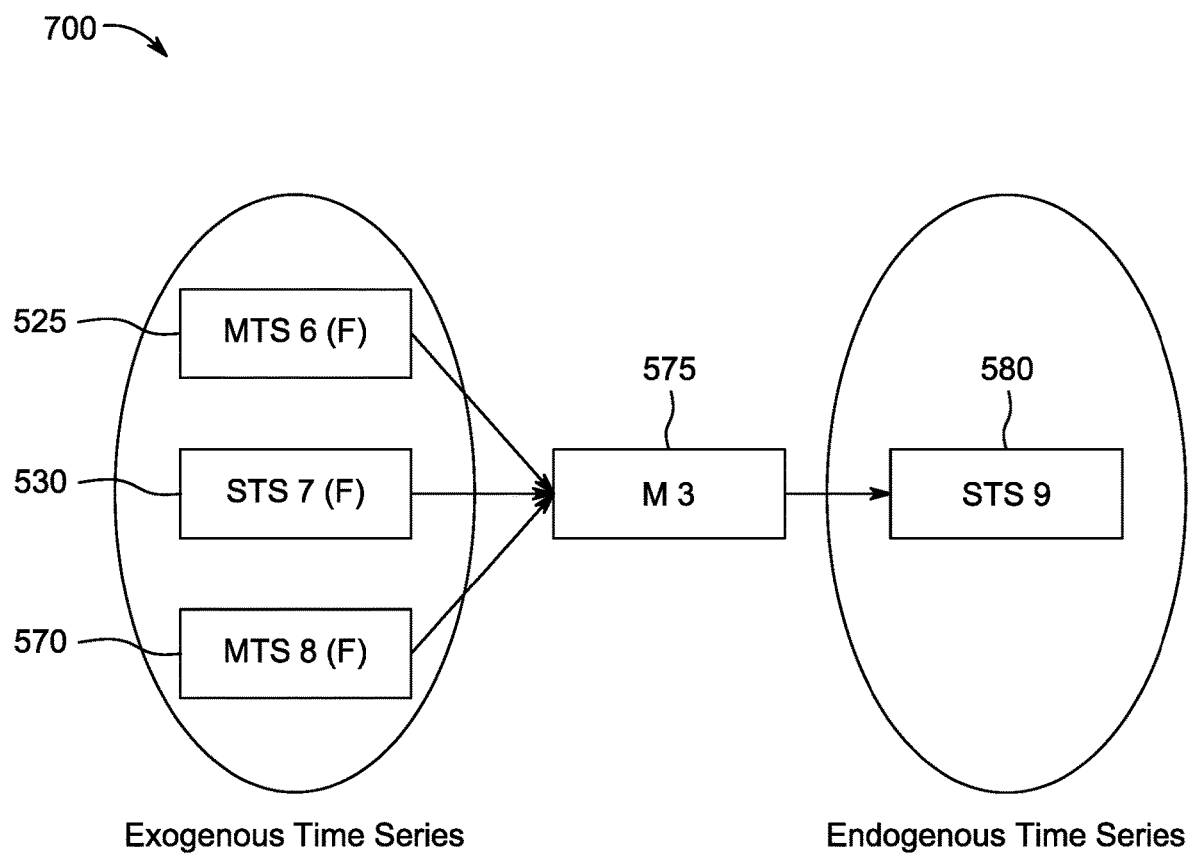

FIGS. 5-7 show different NOTS examples of time series and models being used in conjunction with each other. The NOTS examples shown in FIGS. 5-7 may serve as basic building blocks that are used to create more advanced NOTS. FIG. 5 shows NOTS 500, which can be used to fit a model or can use a fitted model to predict a time series. Source time series are considered to be time series that are already defined before they enter a particular NOTS. That is, they have specified values, which may be predicted, known or unknown, for specific combinations of natural time intervals and as of time intervals. NOTS 500 can include exogenous source time series 501-503, a model 510, and endogenous source time series 520. Source time series 501-503 can serve as input time series to model 510. Although three input time series are shown being provided to model 510, it should be understood that any number of input time series can be provided to model 510. Source time series 501-503, also labeled as "STS 1 (F)", "STS 2 (F)", and "STS 3 (F)", respectively, can include values for future natural time intervals relative to the as of time intervals. These future values may be known or they may be the result of future predictions. That source time series 501-503 may include values for future natural time intervals relative to the as of time intervals is indicated by the "(F)" designation following the STS marker. Model 510 can be a machine learning model that predicts an output time series shown here as endogenous source time series 520 (also labeled as "STS 6"). Model 510 can be fitted using historical data from exogenous time 501-503 and endogenous time series 520 for combinations of natural time intervals and as of time intervals. Moreover, the model can be continuously fitted and updated as additional historical data is made available. For example, model 510 can be fitted with data from exogenous time series 501-503 and endogenous time series 520. This fit can be performed, for example, as discussed above in connection with FIG. 4B.

The values contained in source time series 520 can include known values and predicted values. Although source time series 520 is an endogenous time series, source time series 520 can serve as an input time series (or exogenous time series) to another model. When model 510 is fitted and then uses exogenous time series 501-503 to predict endogenous time series 520 for a combination of natural time intervals and as of time intervals, it is key that the natural time intervals and as of time intervals that were used to retrieve data from time series 501-503 will be consistent, and that this combination of natural time intervals and as of time intervals will be used to tag the resulting model prediction. Model predictions hence follow a similar data structure as shown in FIG. 1. For the purposes of using NOTS 500 as a building block for a more advanced NOTS, the arrangement of NOTS 500 is used to fit model 510 so that it can used to generate predicted values for the endogenous time series 520, which are used to create a model time series, now discussed in FIG. 6.

FIG. 6 shows NOTS 600 that maps model predict results to a model time series. NOTS 600 builds on NOTS 500 and the FIG. 5 reference numbers will be used in FIG. 6. NOTS 600 adds model time series 525 (also labeled as "MTS 6") and the predict results that are generated by fitted model 510. The predict results generated by model 510 are based on exogenous time series 501-503. Endogenous time series 525 may provide values to model time series 525 for all combinations of natural time intervals and as of time intervals and the model predict results generated by model 510 may be used to overwrite these with predicted values. Model time series 525 can use model predictions that are relative to an as of time interval (e.g., −2 hours through +5 hours) or that are not relative to an as of time interval (e.g., January 8 at 12 pm through January 9 at 4 pm), and model time series 525 uses the underlying time series 520 for all other combinations of natural time intervals and as of time intervals. In other words, model time series 525 can be a time series such as time series 320 or 340. The predicted values are supplied by model 510 through one or more model predict results for specific combinations of natural time intervals and as of time intervals, and predicted or known values are supplied by source time series 520 for all other combinations of natural time intervals and as of time intervals.

Figure 6A:
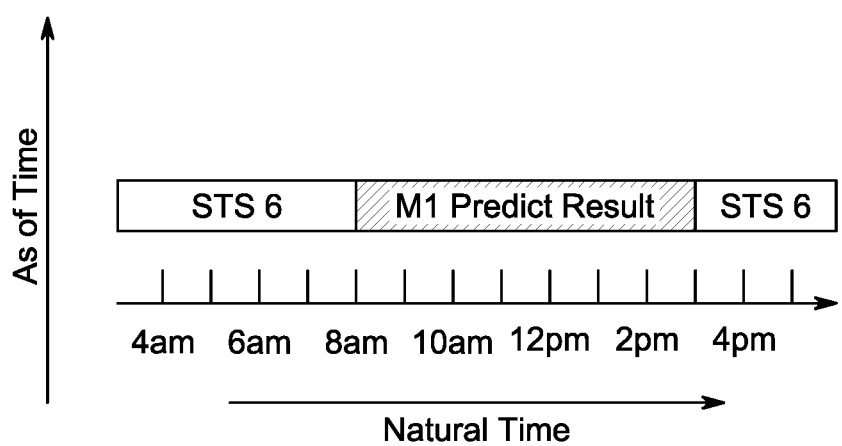

FIG. 6A shows an example of model time series 525. Assume model time series 525 uses a −2 hour starting offset and +5 hour ending offset for using its model's predict results to overwrite its underlying values. In this example we look at the as of time interval 10 am, for which predicted values from Sam through 3 pm are obtained from a model predict result generated by model 510, as indicated by the blacked out bar between Sam and 3 pm. Time series values for all other natural time intervals can be obtained from source time series 520. After 3 pm, the values may be supplied by source time series 520, and in this particular example, those values may be null because they are not yet observed.

FIG. 7 shows NOTS 700 that uses model time series as inputs to a model according to an embodiment. NOTS 700 shows that model time series 525 (also labeled as "MTS 6"), source time series 530 (also labeled as "STS 7 (F)"), and model time series 570 (also labeled as "MTS 8") are fed into model 575 (also labeled as "M3") as exogenous time series. The mixing of model time series 525 and 570 and source time series 530 is possible because they are all standardized time series. Model 575 can be fit based on model time series 525, source time series 530, model time series 570, and source time series 580 (also labeled as "STS 9"), which is an endogenous time series. NOTS 700 illustrates that any combination of model time series and source time series can be provided as inputs to a model. Another type of time series, known as a transform time series, may also be used in the NOTS platform. A transform time series may be a stateless transformation of an existing source time series, transform time series, or a model time series. In one embodiment, a transform time series is a time series node with a layer that points to an operation node. One example of a stateless transformation would be a multiplication by a factor of two, which means that a transform time series would receive all values from a particular time series for all combinations of natural time intervals and as of time intervals multiplied by two. Another example would be taking the average across three particular time series, which means that a transform time series would receive the average of the values from the three underlying time series for all combinations of natural time intervals and as of time intervals. Yet another example would be to compute the difference between the values across the natural time axis for a particular time series and a specified time offset (e.g. the 24-hour difference).

Figure 8:
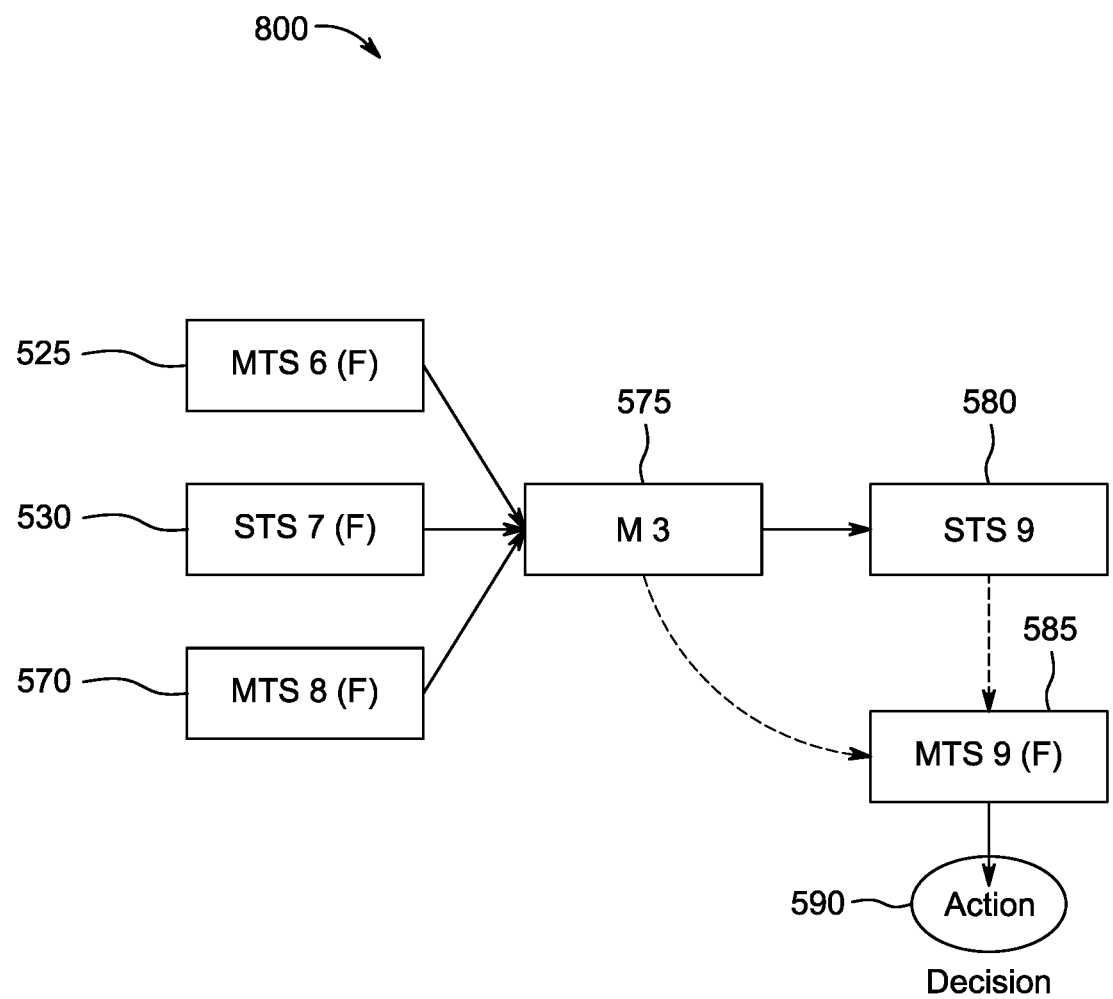

FIG. 8 shows NOTS 800 that uses model time series as inputs to a model to create another model time series according to an embodiment. NOTS 800 adds to NOTS 700 by adding model time series 585 (labeled as "MTS 9"). Model time series 585 can receive predicted values from fitted model 575 through one or more model predict results and all other values from source time series 580. The predicted values received from model 575 can be relative to one or more as of time intervals or can be independent of any as of times (e.g., predictions values can be provided between a start time and an end time). An action or decision 590 may be executed based on model time series 590.

Figure 9:
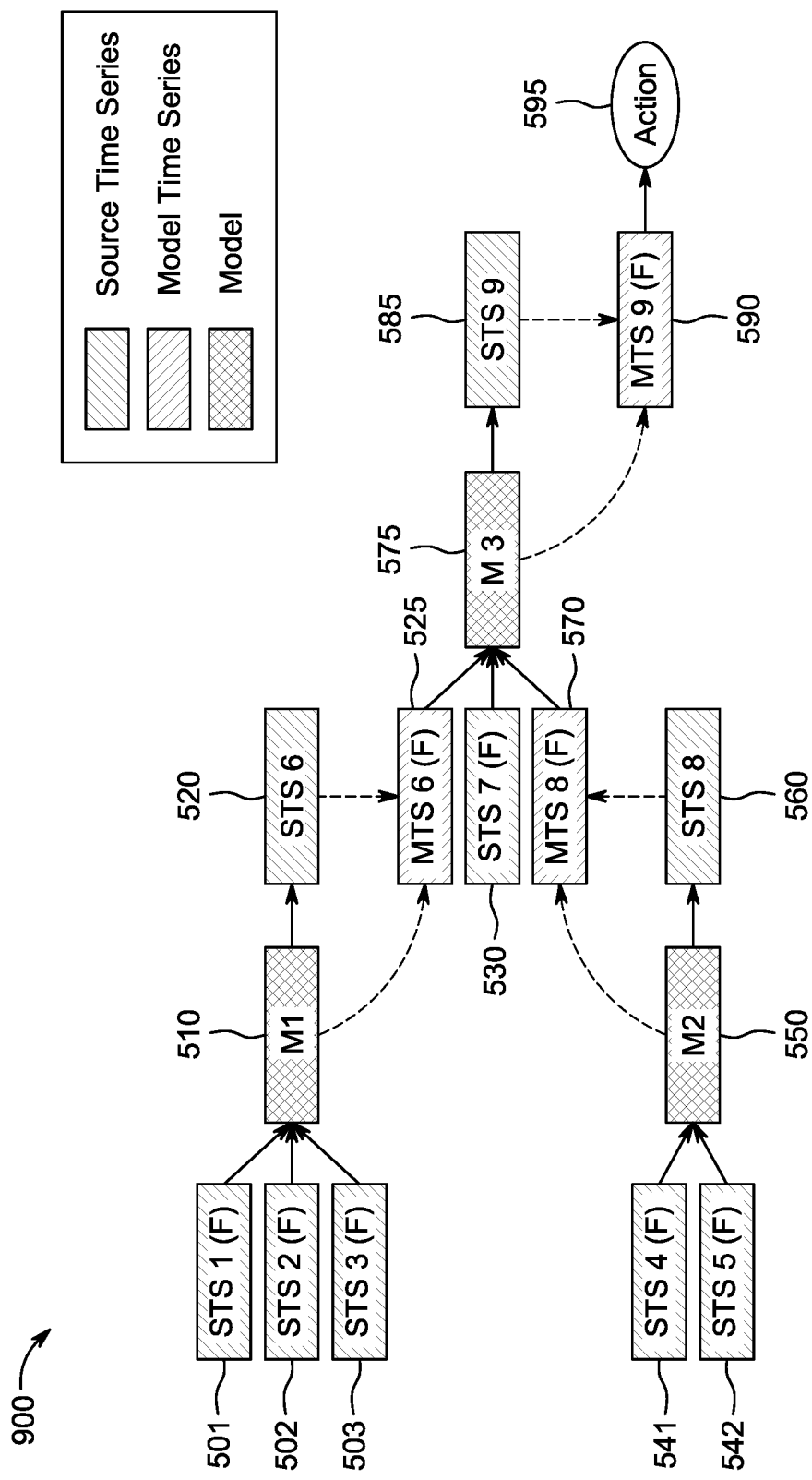

FIG. 9 shows illustrative NOTS 900 according to an embodiment. NOTS 900 can represent a comprehensive network of time series that incorporates several smaller networks. NOTS 900 can incorporate NOTS 600 and NOTS 800 as previously described and adds source time series 541 and 542 (also labeled as "STS 4 (F)" and "STS 5 (F)"), model 550 (also labeled as "M2"), and source time series 560 (also labeled as "STS 8"). Model 550 provides predicted values for specific combinations of natural time intervals and as of time intervals to model time series 570 through one or more model predict results that were generated based on values provided by source time series 541 and 542. Source time series 560 contributes values to model time series 570 for all other combinations of natural time intervals and as of time intervals. Note that illustrative NOTS 900 contains only source time series and model time series, but that any NOTS might also include transform time series.

NOTS 900 is designed to create model time series 590 so that action 595 can be executed. In order to provide model time series 590, NOTS 900 is arranged to generate model time series 525 and model time series 570. As shown, model time series 525 is derived from predicted values encapsulated by one or more model predict results generated by model 510, which receives inputs from source time series 501-503, and values from source time series 520. Model time series 570 is derived from predicted values encapsulated by one or more model predict results generated by model 550, which receives inputs from source time series 541 and 542, and values from source time series 560. Source time series 501-503, 530, 541, and 542 can each represent different first order time series containing predicted or known values that are used to influence action 595. Model time series 525 and 570 can represent two different second order time series containing predicted or known values that are used to influence action 595. Model time series 525, source time series 530, and model time series 570 are fed into model 575, which generated predicted values for model time series 590. Model time series 590 can represent a third order time series that depends on the predicted or known values of the first and second order time series. Note that the requested combinations of as of time intervals and natural time intervals for model time series 590 will always travel through all models and time series upstream. For example, if for action 595 a user requires values from model time series 590 for as of time January 4 at 10 am and natural time intervals January 4 at 11 am through January 4 at 8 pm, first a model predict result needs to be generated by model 3 for this combination of as of time intervals and natural time intervals. In order for this model predict result to be generated, model 3 requires values from its exogenous time series 525, 530, and 570 for the discussed combination of as of time intervals and natural time intervals. For model time series 525 and 570 to provide these values, their respective models need to generate model predict results for the same combinations of as of time intervals and natural time intervals, and so on. This flow of information is enabled by the standardization of time series and models discussed in this document and is fundamental to the NOTS.

Figure 10:
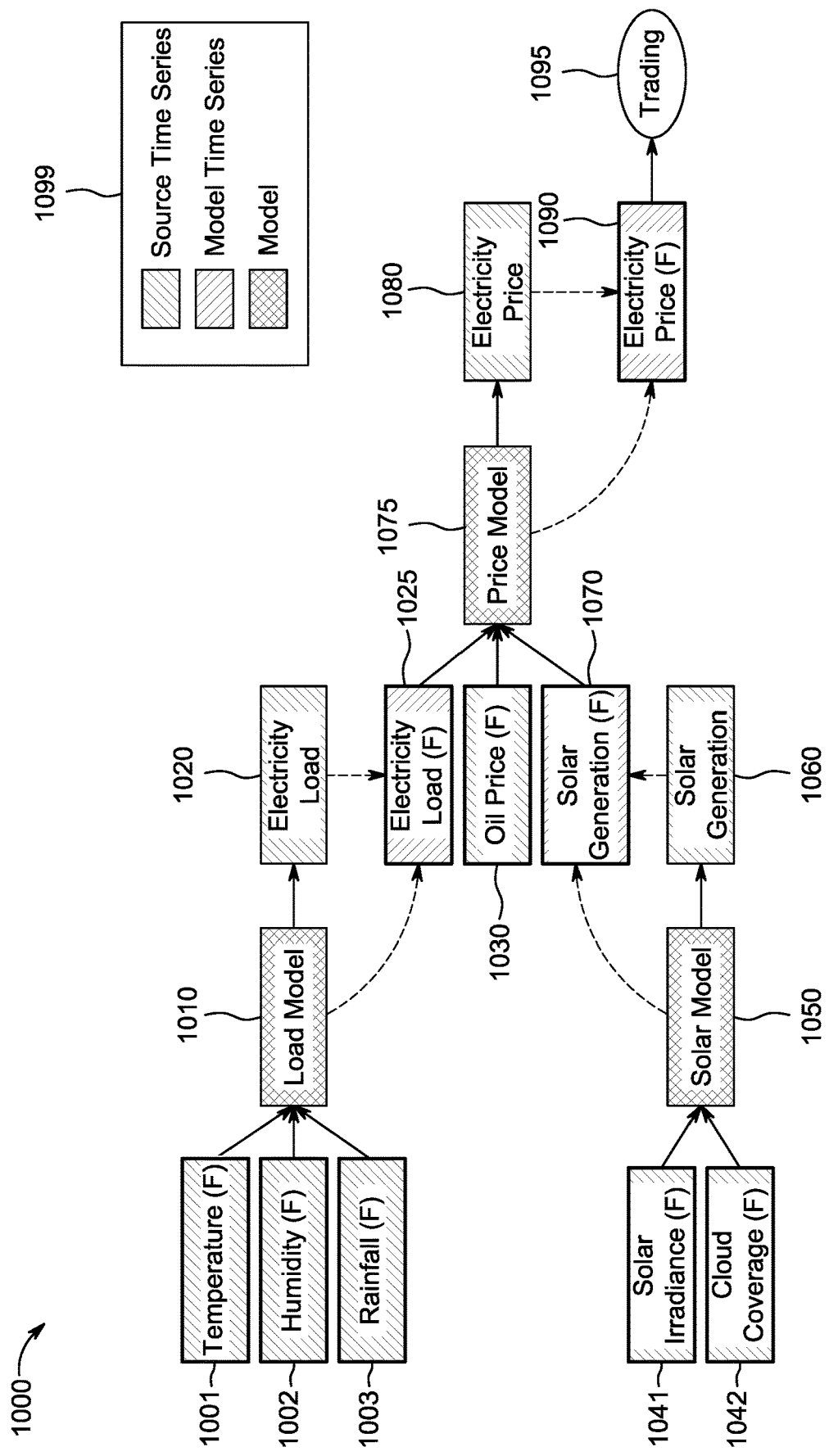
FIG. 10 shows electricity price network of time series as an illustrative embodiment.

FIG. 10 shows electricity pricing NOTS 1000 as an illustrative embodiment. NOTS 1000 can represent a potential real-world implementation of NOTS 900. NOTS 1000 is designed to predict the price of electricity so that electricity can be traded as an actionable item by a user or company at step 1095. Legend 1099 indicates whether the boxes shown in FIG. 10 correspond to source time series, a model time series, or a model. Legend 1099 also indicates whether a source time series or a model time series contains future predicted values. As shown, temperature source time series (STS) 1001, humidity STS 1002, and rainfall STS 1003 are fed into load model 1010. Load model 1010 can predict electricity load and provide predicted values for specific combinations of natural time intervals and as of time intervals to electricity load model time series (MTS) 1025, and electricity load source time series (STS) 1020 contributes values for all other combinations of natural time intervals and as of time intervals Solar irradiance STS 1041 and cloud coverage STS 1042 are fed into solar model STS 1050. Solar model STS 1050 can predict solar generation and provide predicted values for specific combinations of natural time intervals and as of time intervals to solar generation MTS 1070, and solar generation STS 1060 contributes values for all other combinations of natural time intervals and as of time intervals. Oil price STS 1030, electricity load MTS 1025, and solar generation MTS 1070 are fed to price model 1075. Price model 1075 can predict electricity price and can provide electricity price predicted values for specific combinations of natural time intervals and as of time intervals to electricity price MTS 1090, and electricity price STS 1080 contributes values for all other combinations of natural time intervals and as of time intervals.

It should be understood that the arrangement of NOTS 900 and NOTS 1000 are merely illustrative and that any arrangement of a network of time series may be constructed. For example, although only three orders of time series are shown, it is possible for any number of orders of time series to be constructed, and each order can have any number of time series. The possible configurations and potential applications are limitless.

Figure 11:
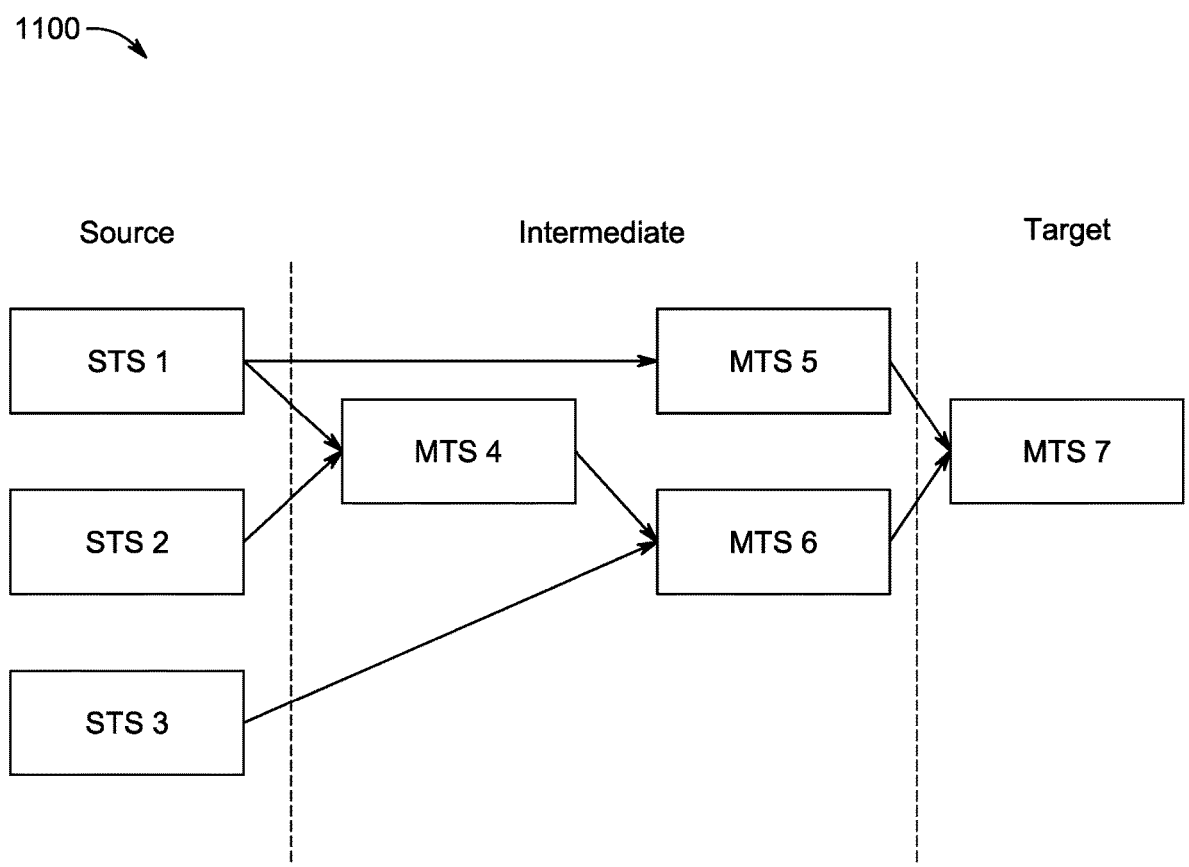
FIG. 11 shows an illustrative conceptual generic network of time series according to an embodiment.

FIG. 11 shows an illustrative conceptual NOTS 1100 according to an embodiment. NOTS 1100 shows time series STS 1-STS 3 and MTS 4-MTS 7 arranged in an exemplary network as shown. The models and the underlying time series, as shown in NOTS 900, are omitted for clarity. NOTS 1100 is arranged to include source time series, intermediate time series, and target time series. The source time series (illustrated here as STS 1-STS 3) can serve as the starting or source nodes of this network of time series and can be used to create intermediate time series and/or target time series. In some embodiments, the source time series may align with a first order of the network of time series. However, such alignment is not mandatory. For example, if desired, source time series can be used in any order of the network of time series. Referring specifically to NOTS 900, for example, source time series 530 is used in the second order, whereas source time series 501-503, 541, and 542 used in the first order. The intermediate time series can represent intermediate nodes within the network of time series and are illustrated here as MTS 4-MTS 6. In some embodiments, the intermediate time series can include only model time series or any combination of source time series, model time series, or transform time series. The target time series can represent the final or terminal node of a network of time series, shown here as MTS 7. The target time series can produce the final result of the network of time series that is used by a user, company, or some other entity to take an action based on the predicted values provided by the target time series. The intermediate time series may correspond to intermediate orders of the network and the target time series may correspond to the final order of the network. Note that in some cases all source time series could be used as exogenous time series in one model to directly predict the target time series. However, the dimensionality of this feature space of this model (i.e. the possible combinations of values across the exogenous time series) might be too large to effectively sample it with historical data. For example, if there are a thousand source time series that can ultimately explain one target time series, one might need millions of hours of historical examples to fit the model in order for it to make accurate predictions, which is not possible in most use cases (e.g. an electricity market might not have historical hourly electricity price data for more than a few decades). In this context, using intermediate time series can be thought of as a way to constrain the problem by enforcing structure that reflects human knowledge about the use case. For example, weather time series could be used directly to predict electricity price time series, but using the intermediate electricity load time series and solar generation time series introduce constraints onto the problem that may ultimately lead to more accurate electricity price predictions.

Figure 12:
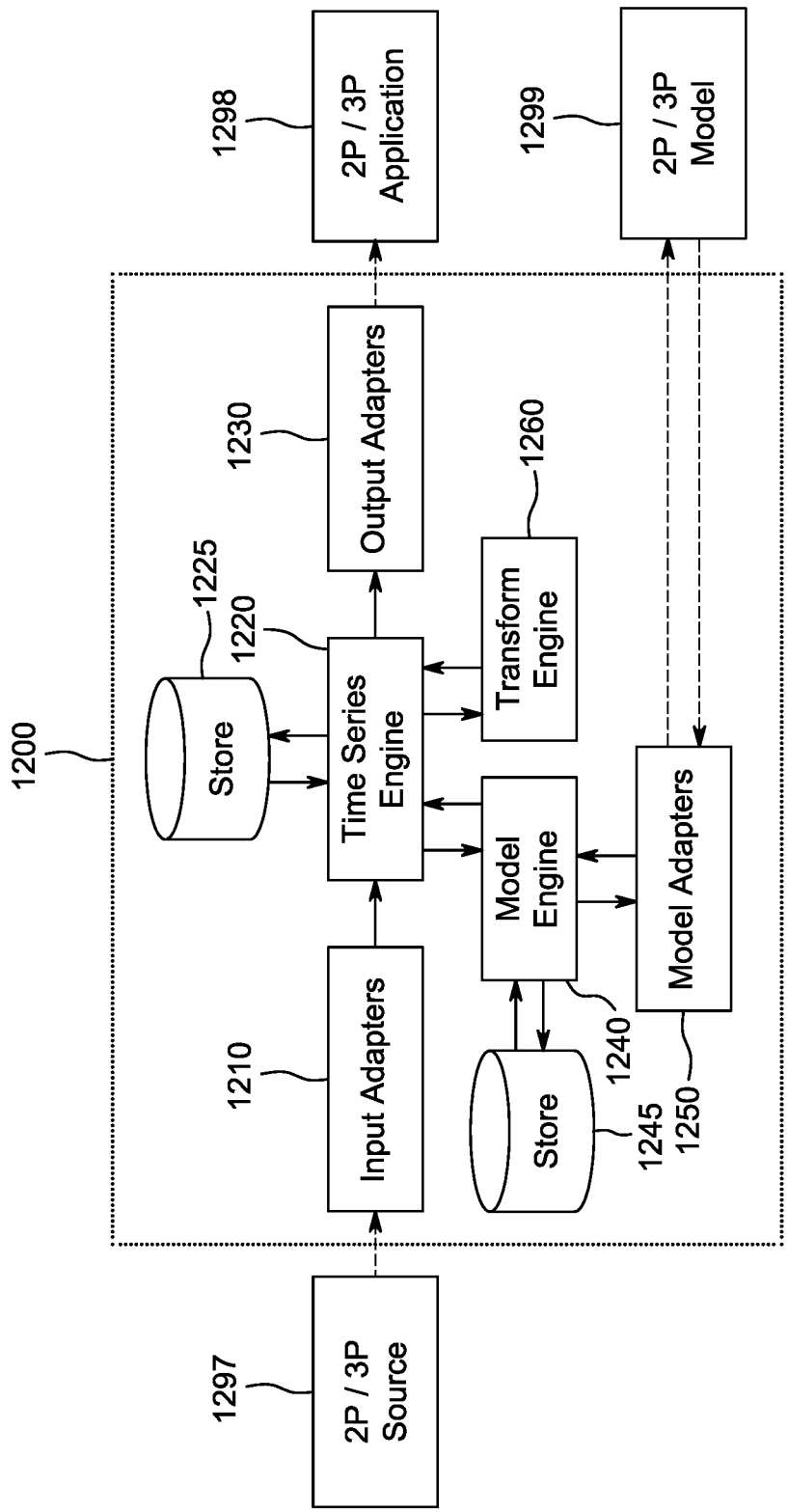
FIG. 12 shows illustrative platform according to an embodiment.

FIG. 12 shows illustrative NOTS platform 1200 according to an embodiment. NOTS platform 1200 can interact with external sources 1297, external applications 1298, and external models 1299. Platform 1200 can access external sources 1297, external applications 1298, and external models 1299 via the Internet or other networks. External sources 1297 can include, for example, time series that are supplied by providers of time series. Providers of time series can include entities that specialize in time series such as weather, cloud coverage, and solar irradiance or the providers can be an open source database. External applications 1298 can represent applications that are used by users or companies that perform actions based on predictions provided by platform 1200. External model 1299 can enable externally generated models (machine learning models) to be interchangeably used with platform 1200.

Platform 1200 can include input adapters/source connector 1210, time series engine 1220, time series database 1225, output adapters 1230, model engine 1240, model database 1245, model adapter/model connector 1250, and transform/operation engine 1260. Input adapter/source connector 1210 is operative to receive time series from external sources 1297. For example, platform 1200 may have built-in integrations with third party data vendors that serve as external sources 1297. This may allow users of platform 1200 to have access to a large variety of data sources without requiring the users to setup specific contracts or data integrations with the third party data vendors. As another example, if a user of platform 1200 has their own time series data, platform 1200 can ingest their time series data via adapter/connector 1210 so that data can be used by platform 1200. In other words, input adapter/source connector 1210 can convert any external time series into a standardized time series (e.g., time series described above in connection with FIGS. 1, 2A, 2B, 3A, 3B, and 4) used by platform 1200. Output adapter 1230 is operative to convert time series data received from time series engine 1220 to a format suitable for use by external application 1298. Input adapter/input connector 1210 and output adapter 1230 can handle files such as CSV, JSON, XML, and XLSX, databases such as InfluxDB, TimescaleDB, and OpenTSBD, cloud storage such as FTP, S3, GCS, Client libraries such as Python, R, and Javascript, Third Party integration such as Splunk, Tableau, ETRM, and Google Sheets, and customizations such as a Docker container. In some embodiments, users can build their own input adapters and output adapters. This may be enabled by allowing users to specify their own Docker containers, which may allow for integration with any data source or any application.

Model adapter/model connector 1250 may enable model engine 1240 to access or use models available by external model 1299. That is, instead of using a model that is included as part of platform 1200, which can be referred to as a native model, model adapter/connector 1250 may enable platform 1200 to swap the native model for an external model. A native model may refer to a model that is stored and managed by platform 1200. An external model is a model that is stored and managed by an entity other than platform 1200. For example, assume a user has created a highly customized model and wishes to use that model as opposed to a native model available on the platform. For example, the customized model may be specified in a Docker container. When that highly customized model is needed for fitting based on exogenous and endogenous time series, or to predict values based on exogenous time series, model engine 1240 can provide the time series via model adapter/connector 1250 to that customized model (located at external model 1299) and receive the predicted values from external model 1299 via model adapter/connector 1250.

Time series engine 1220, model engine 1240, and transform/operation engine 1260 can operate together to produce predicted values that are provided to a user, for example, via output adapter 1230 or a user interface (not shown). For example, the predicted values can be presented as part of a model time series in a user interface. When a user accesses platform 1200 and desires values from specific time series, time series engine 1220 can retrieve one or more time series from storage 1225 and/or access one or more time series available at external sources 1297. All time series used by time series engine 1220 are standardized using the as of time and natural time axes as discussed above. In addition, model engine 1240 may retrieve one or more model fit results for one or more models from storage 1245 and/or access one or more external models 1299 via model adapter 1250. Transform/operation engine 1260 can generate new time series by applying a stateless transformation or operation to one or more existing time series. For example, transform/operation engine 1260 can create a new time series by multiplying a time series by two, or by aggregating multiple time series, or subtracting one time series from another time series. In some embodiments, transform/operation engine 1260 can function as a connector for operations. For example, the connector may serve as an operation layer that connects a time series node to an operation node. Source connector 1210 can serve as a source layer that connects a time series node to a source node. Model connector 150 can serve a model layer that connects a time series node to a model node.

Time series engine 1220 can organize the time series (e.g., source time series, model time series, and transform time series) and coordinate the generation of predicted values by models being managed by model engine 1240. For example, time series engine 1220 may retrieve values from one or more source time series and provide them to a model in model engine 1240, which can generate predicted values for a model time series. The values associated with a target time series in the network of time series can be provided to output adapter 1230 or a user interface. Model engine 1240 may be used to automatically select the optimal model type and model hyperparameters such that the predicted values for a set of endogenous time series minimize a specified evaluation function. Model engine 1240 may also be used to automatically select optimal combinations of exogenous time series for a particular model from the pool of time series managed by time series engine 1220 based on which combinations minimize a specified evaluation function applied to the model predictions for the endogenous time series. Examples of evaluation functions that may be used for these purposes are: mean absolute error, mean squared error, mean absolute percentage error, or negative log-likelihood.

An example of how platform 1200 is able to produce an actionable model time series is now discussed in reference to NOTS 900 of FIG. 9. In order for platform 1200 to produce MTS 590, platform 1200 can access STS 501-503, 520, 541, 542, 560, and 585 via input adapters 1210 or storage 1225, and further access models 510, 550, and 575 via model adapters 1250 of storage 1245. Platform 1200 can then generate MTS 525 and MTS 560 (as previously discussed) and then generate MTS 590 (as previously discussed), which may all be stored in storage 1225. Platform 1200 can provide MTS 590 to output adaptors 1230 so that an appropriate action can be taken.

Platform 1200 can retrieve time series values for any combination of natural time intervals and as of time intervals, provided such data is available. For example, platform 1200 can retrieve hourly temperatures for a certain weather station for the past three years, as of 10 am this morning. As another example, platform 1200 can retrieve temperatures for every hour tomorrow, as of 2 pm yesterday. In some scenarios, platform 1200 may be asked to provide values that are not available. In such scenarios, the platform may resort to a fall back time series, use a default value, use null values, or provide an indication or warning that the data is not available.

Platform 1200 may use smart compression techniques to efficiently store time series and time series data, including values across the as of time axis, in storage 1225. As can be appreciated, a substantial amount of data for any given time series, and as of time intervals thereof, can have overlapping data. For example, historical values for a weather time series observed for October 2019 as of Jan. 1, 2020 are almost certainly the same as those observed for October 2019 as of Jan. 2, 2020. This data would be duplicated if stored without intelligent compression and deduplication techniques. If desired, traditional compression techniques can be used to reduce storage requirements. As another example, fully normalized representations of time series may be created to reduce or eliminate duplication among overlapping segments. In this approach, special metadata can be used to re-compose a time series, on-demand or pre-computed, from constituent, de-duplicated parts. As yet another example, asynchronous post-processing methods that act as meta-compression across multiple time series data segments. Such meta-compression can identify duplicate segments with larger time series and data segments that are related to immutable input data by way of a transform function. In yet another approach, intelligent pruning of pre-computed predicted values can be implemented. For example, pre-computed predicted values that are infrequently used can be pruned if such predicted values can be regenerated on-demand with acceptable tradeoffs. In yet another example, instead of storing raw output of a model, the function and metadata describing operation of the function can be stored and used to generate the output when needed.

Platform 1200 may enable users to search for time series that suit their particular needs. This may be particularly useful when the number of available time series approaches thousands or millions or more. Platform 1200 may tag each time series with metadata or classify it according to a catalogue. For example, metadata can include location of the time series asset such as its unique address or specific tag information created by the author of the time series. The metadata can include, for example, the category of time series (e.g., "weather"), the type of data (e.g., "temperature"), information about how it was generated (e.g., "prediction", "historicals", "combined prediction and historicals") or who generated it.

Platform 1200 may enable users to share and/or modify time series or models. Users may be able to share time series or models within their organization or across organizations. Platform 1200 may assign a specific sharing policy to each time series or model. For example, the sharing policy may indicate whether the time series may be shared, whether it can be viewed or downloaded, and whether the time series can be modified. Users or organizations may decide to sell their time series data to other users or organizations. Platform 1200 may be able to process these types of financial transactions.

Figure 13A:
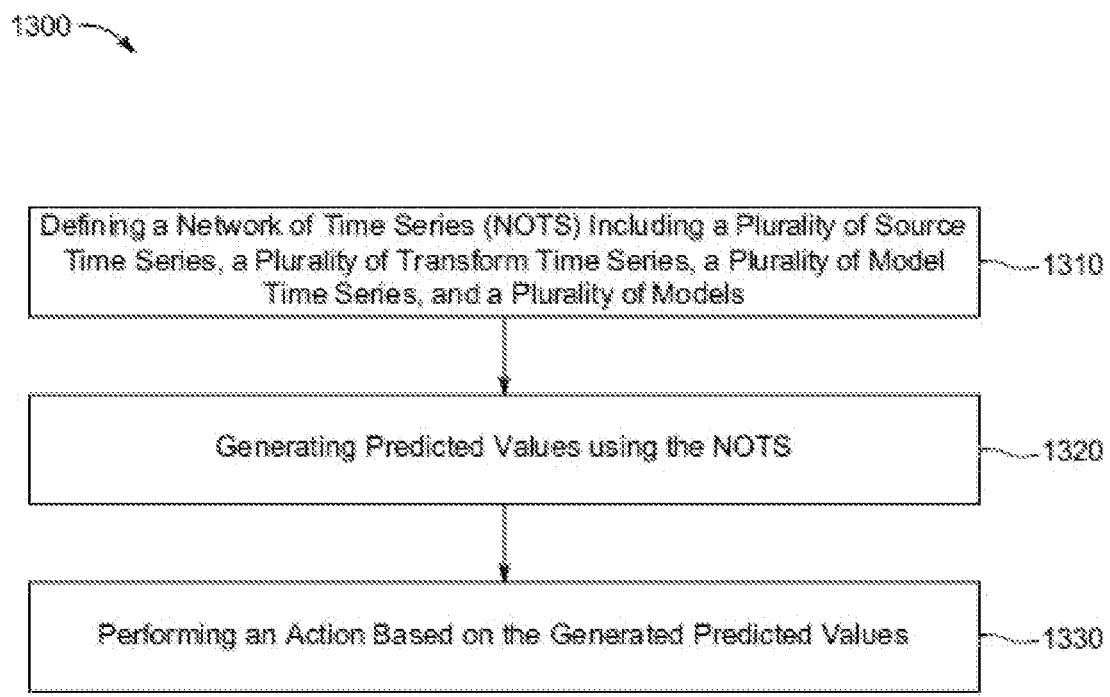
FIGS. 13A, 13B, 14, 15, and 16 show illustrative processes according to various embodiments.

FIG. 13A shows illustrative process 1300 according to an embodiment. Process 1300 may be implemented using platform 1200. Starting at step 1310, a network of time series (NOTS) including a plurality of source time series, a plurality of transform time series, a plurality of model time series, and a plurality of models is defined. The NOTS can be defined based on user inputs and design criteria. For example, the user can define the NOTS to resemble NOTS 900 or NOTS 1000. The user or platform may specify how the plurality of source time series is used as inputs to the plurality of models and the plurality of model time series. In addition, the user or platform may specify each of the plurality of models that are used to yield each of the plurality of model time series. The user or platform may also specify which of the model time series are to be used as inputs to a model. The arrangement of source time series, models, and model time series can take any suitable shape to define the NOTS. Each of the source time series and the model time series can be standardized to include a natural time axis and an as of time axis. This facilitates interaction of all time series with each other and with the models. At least one of the plurality of source time series can include future predicted or deterministically known values. Other source time series may be used as underlying time series for a given model time series. The source time series, transform time series, or model time series can be classified as exogenous time series or endogenous time series. A combination of exogenous time series and endogenous time series may be used to fit one of the models.

At step 1320, predicted values are generated using the NOTS. The generated predicted values can be future predicted values past predicted values, present predicted values, or any combination thereof. The generated predicted values can be relative to an as of time interval (e.g., the values are predicted from a start offset through an end offset) or the generated predicted values can be not relative to an as of time interval (e.g., the values are predicted between a fixed start time and a fixed end time).

At step 1330, an action can be performed based on the generated predicted values. It should be understood that each of the model time series can include generated predicted values, however, the action being performed may be based on only one of the model time series, or a source time series or a transform time series. Any time series within the NOTS can be characterized as one of an upstream time series, a downstream time series, and both an upstream time series and a downstream time series relative to any other time series within the NOTS. The downstream time series may have a higher intrinsic value than the intrinsic value of upstream time series, and the downstream time series may produce predicted values that have a lower accuracy than values produced by upstream time series. The action being performed can be external to the NOTS platform.

It should be understood that the steps shown in FIG. 13A are merely illustrative and that additional steps may be added, re-arranged, or omitted.

Figure 13B:
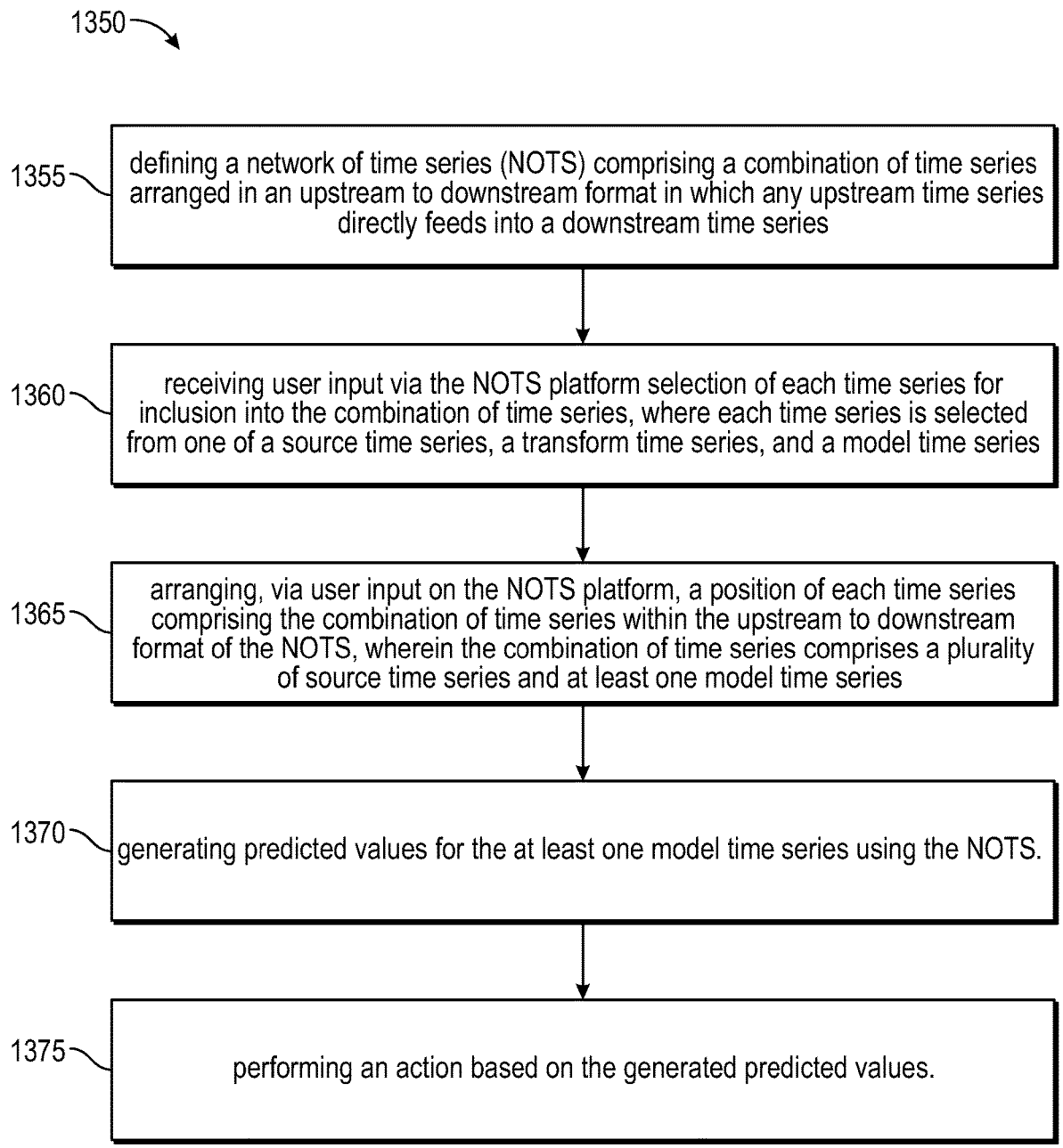

FIG. 13B shows illustrative process 1350 according to an embodiment. At step 1355, a network of time series (NOTS) including a combination of time series arranged in an upstream to downstream format in which any upstream time series directly or indirectly feeds into a downstream time series is defined. The NOTS can be further defined by receiving user input via a NOTS platform selection of each time series for inclusion into the combination of time series, where each time series is selected from one of a source time series, a transform time series, and a model time series, as shown in step 1360, and arranging, via user input via the NOTS platform, a position of each time series comprising the combination of time series within the upstream to downstream format of the NOTS, as shown in step 1365. As will be explained in more detail below, each time series can be a time series node with a layer that points to a source, operation, or model. The combination of time series can include a plurality of source time series and at least one model time series. At step 1370, predicted values for the at least one model time series using the NOTS can be generated. At step 1375, an action based on the generated predicted values can be performed. For example, the generated values can be stored in a database, be used by an authorized user to execute a financial transaction, or displayed in a user interface.

It should be understood that the steps shown in FIG. 13B are merely illustrative and that additional steps may be added, re-arranged, or omitted.

Figure 14:
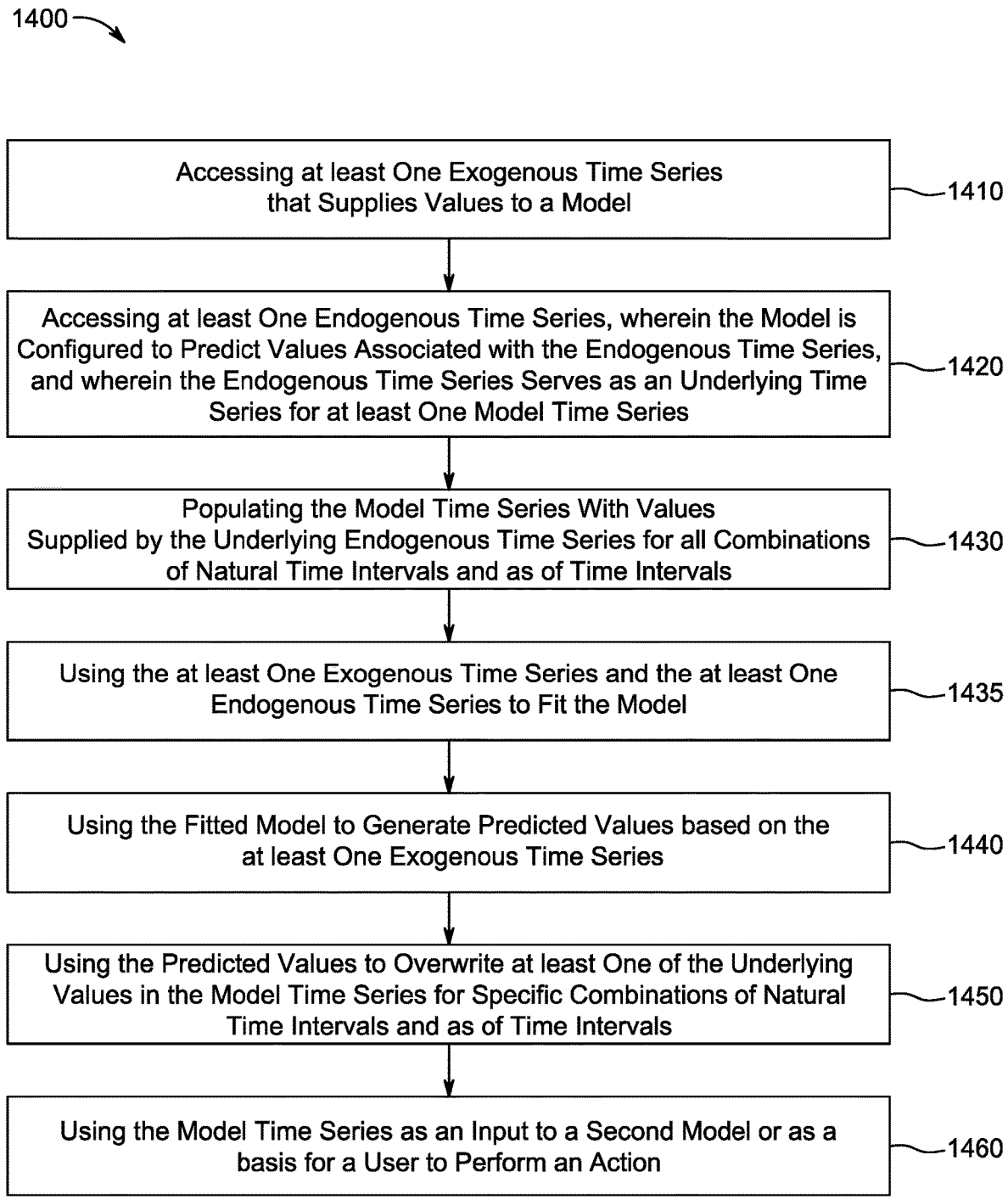

FIG. 14 shows illustrative process 1400 according to an embodiment. Process 1400 can be implemented in platform 1200, for example. Process 1400 can include several steps such as receiving user inputs via a platform to define a network of time series, receiving user inputs via the platform to define an evaluation time period, and evaluating the network of time series based on the evaluation time period. Evaluating the network of time series can include steps 1410, 1420, 1430, 1440, 1450, and 1460. Starting at steps 1410 and 1420, at least one exogenous time series (e.g., source time series 501 of FIG. 6) and one endogenous time series (e.g., source time series 520 of FIG. 6) that supply values to a model (e.g., model 510 of FIG. 6) can be accessed. The model is first fitted based on values from the exogenous time series and endogenous time series, after which it can be used to predict values associated with the endogenous time series. In addition, the endogenous time series serves as an underlying time series for a model time series (e.g., model time series 525). At step 1430, the model time series can be populated with underlying values supplied by the endogenous time series. At step 1435, the at least one exogenous time series and the at least one endogenous time series can be used to fit the model. At step 1440, the model can be used to generate predicted values based on at least one exogenous time series (e.g., the predict results generated by model 510 are provided to model time series 525). At step 1450, the predicted values can overwrite at least one of the underlying values in the model time series. At step 1460, the model time series can be used as an input to a second model (e.g., referring to FIG. 7, model time series 525 can be used as an exogenous time series for model 575) or as a basis for a user to perform an action (e.g., referring to FIG. 8, model time series 585 may result in action 590).

It should be understood that the steps shown in FIG. 14 are merely illustrative and that additional steps may be added, re-arranged, or omitted.

Figure 15:
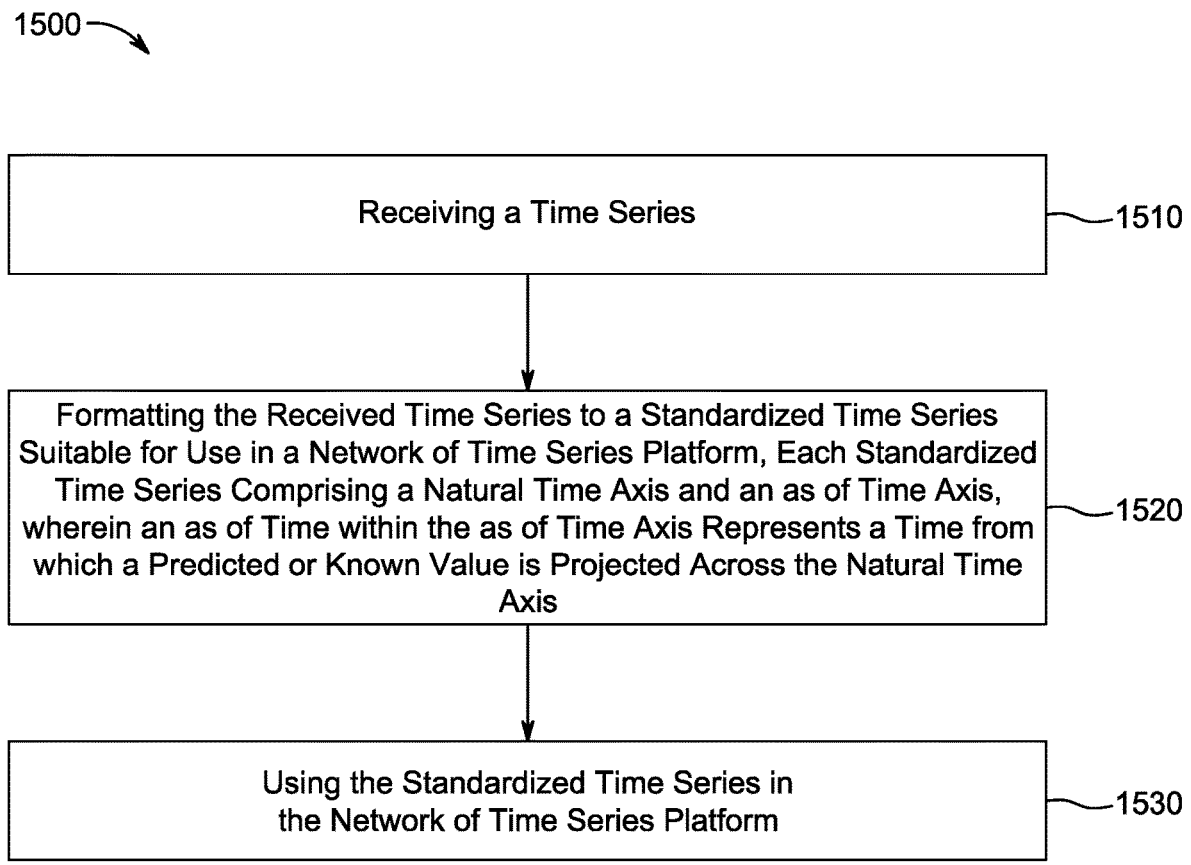

FIG. 15 shows illustrative process 1500 according to an embodiment. Process 1500 can be implemented in platform 1200, for example. Starting at step 1510, a time series can be received. At step 1520, the received time series can be formatted as a standardized time series suitable for use in an NOTS platform, each standardized time series comprising a natural time axis and an as of time axis, wherein an as of time interval within the as of time axis represents a time from which a predicted or known value is projected across the natural time axis. FIG. 2 and FIGS. 3A-3D all show standardized time series. At step 1530, the standardized time series can be used in the network of time series platform.

It should be understood that the steps shown in FIG. 15 are merely illustrative and that additional steps may be added, re-arranged, or omitted.

Figure 16:
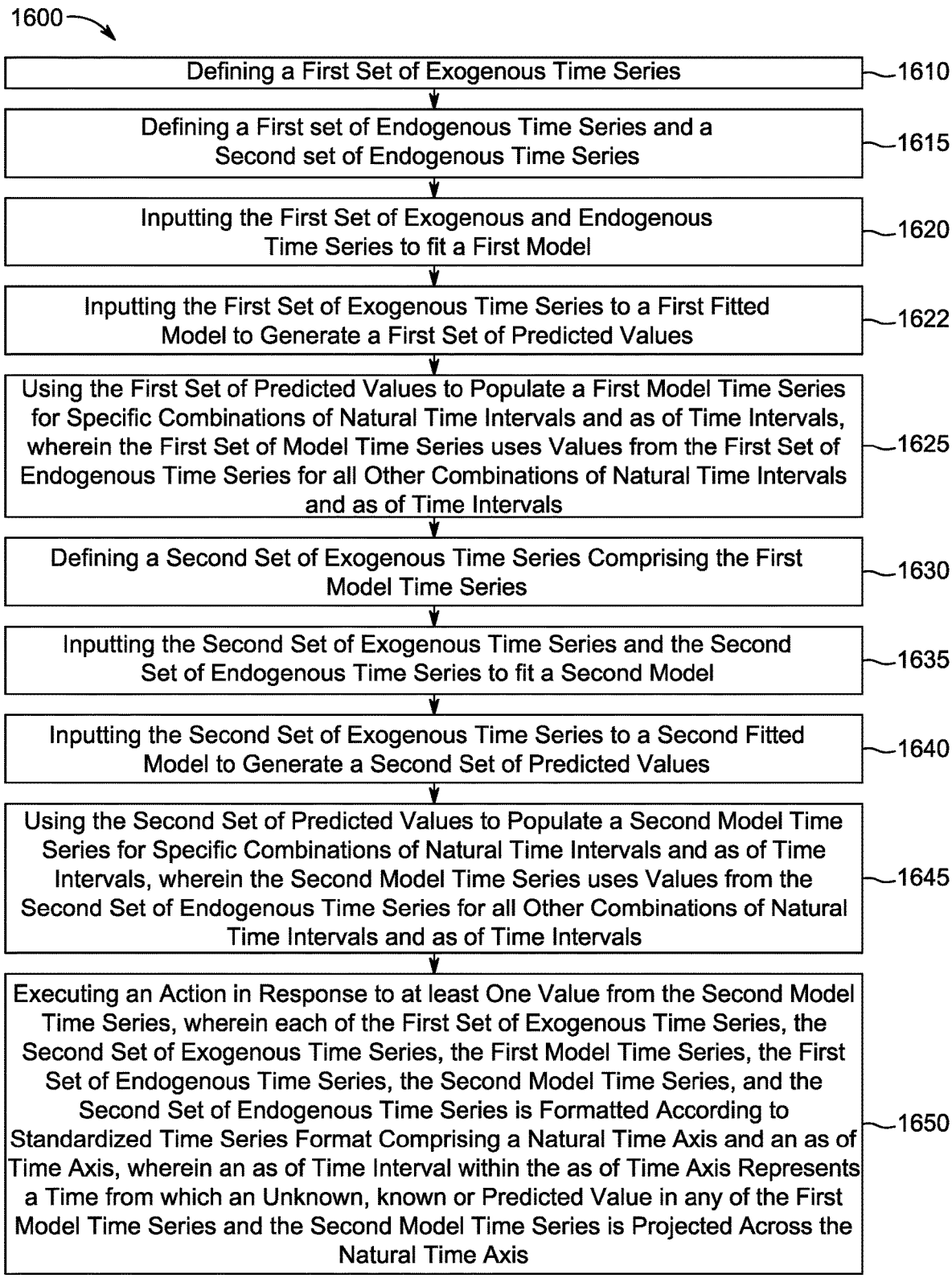

FIG. 16 shows illustrative process 1600 according to an embodiment. Process 1600 can be implemented in platform 1200, for example. Starting at step 1610, a first set of exogenous time series is defined. For example, referring to FIG. 10, the first set of exogenous time series can include time series 1001-1003. At step 1615, a first set of endogenous time series (e.g., source time series 1020) and a second set of endogenous time series (e.g., source time series 1060) are defined. At step 1620, the first set of exogenous time series can be input to a first fitted model to generate the first set of model predict results containing predicted values. For example, in FIG. 10, the first model can be model 1010, which is configured to predict a first endogenous time series (source time series 1020). At step 1622, the first set of exogenous time series can be input to a first fitted model to generate a first set of predicted values. At step 1625, the first set of model predicted values can be used to create a first model time series (e.g., model time series 1025) for specific combinations of natural time intervals and as of time intervals, where a first endogenous time series (e.g., source time series 1020) is used to fill in values for all combinations of natural time intervals and as of time intervals that were not covered by the model predict results. In other words, the first model time series can use the first endogenous time series as an underlying time series to populate the first model time series. At step 1630, a second set of exogenous time series comprising the first model time series can be defined. For example, in FIG. 10 the second set of exogenous time series can include model time series 1025, source time series 1030, and model time series 1070. At step 1635, the second set of exogenous time series and the second set of endogenous time series can be used to fit a second model. At step 1640, the second set of exogenous time series can be input to a second model (e.g., model 1075), which is configured to predict a second endogenous time series (e.g., source time series 1080), to generate a second set of model predict results containing predicted values. At step 1645, the second set of predicted values can be used to populate a second model time series for specific combinations of natural time intervals and as of time intervals, wherein the second model time series uses values from the second set of endogenous time series for all other combinations of natural time intervals and as of time intervals. For example, the second set of model predict results containing predicted values can be used to create a second model time series (e.g., model time series 1090), where a second endogenous time series (e.g., time series 1080) is used to fill in values for all combinations of natural time intervals and as of time intervals that were not covered by the model predict results. In other words, the second model time series can use the second endogenous time series as an underlying time series to populate the second model time series. At step 1650, an action can be executed in response to an output of the second model time series (e.g., action 1095). Each of the first set of exogenous time series, the second set of exogenous time series, the first model time series, the first endogenous time series, the second model time series, and the second endogenous time series is formatted according to a standardized time series format comprising a natural time axis and an as of time axis. The as of time interval within the as of time axis represents a time from which a value in any one of the first model time series and the second model time series is projected across the natural time axis.

It should be understood that the steps shown in FIG. 16 are merely illustrative and that additional steps may be added, re-arranged, or omitted.

It should be understood that most or all of the time series and the models discussed in connection with FIGS. 4A-4D, 5, 6, 6A, 7-12, 13A, 13B, 14-16 can be independent nodes within a NOTS. Referring to FIG. 6, for example, source time series 501, 502, 503, and 520 can be time series nodes, model 510 can be a model node, and model time series 525 can be a time series node. Not shown in FIG. 6 are source nodes and operation nodes. The arrangement of nodes within the NOTS and how each node is programmed to return its respective evaluation result is now discussed below.

Figure 18:
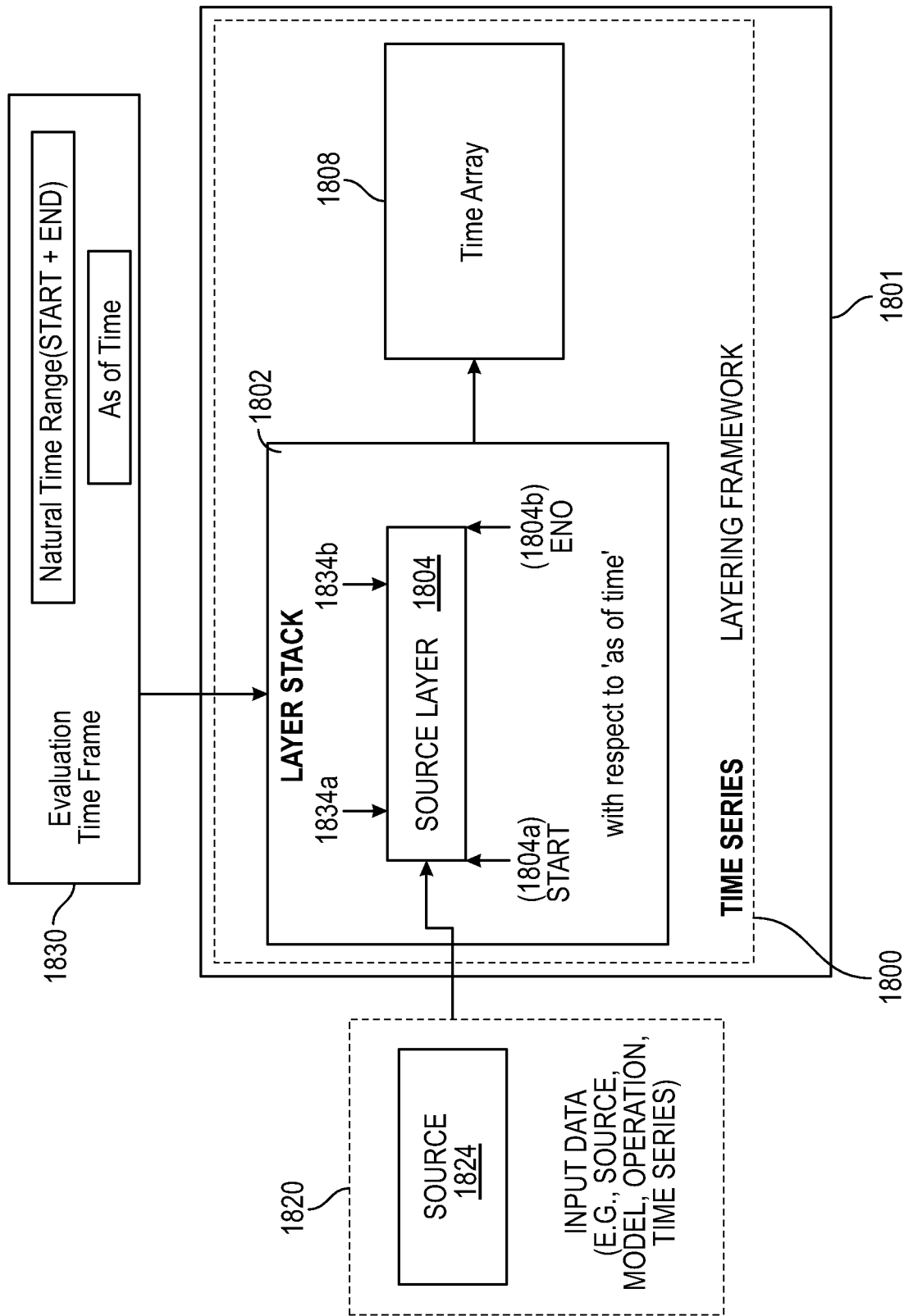
FIG. 18 represents a time series created using a layering framework according to an embodiment.

FIG. 18 represents a time series 1801 realized using a layering framework 1800 according to embodiments discussed herein. Layering framework 1800 can include layer stack 1802 and time array 1808 and has access to input data 1820. Layering framework 1800 may receive an evaluation time frame 1830 that defines a specific range of natural times to be evaluated with respect to an as of time. Only one layer, source layer 1804, is shown as being included as part of layer stack 1802, though multiple layers may be included. Input data 1820 is shown to include source 1824. Input data 1820 can include outputs of sources, models, operations (e.g., sometimes referred to herein as stateless transforms), and time series. Source based input data can represent data obtained from data sources (e.g., historical weather for a particular location). Model based input data can represent prediction data obtained from a model. Operation based input data can represent transformed data obtained from an operation. Time series input data can represent data obtained from another time series.

Each layer in layer stack 1802 may have a start time and an end time, which may be an absolute time or relative to an 'as of time'. For example, source layer 1804 has a start time 1804$a$ and end time 1804$b$. Start time 1804$a$ and end time 1804$b$ define the range of time for which data is pulled from source 1824 and potentially included in time series 1801. The data returned by layering framework 1800 (through the application of layering stack 1802 to input data 1820) is referred to as a time array, shown as time array 1808. The time array is embodied in time series 1801 and represents a multi-dimensional array where one of its axes is represented by a time dimension for a specific as of time. Multiple time arrays can be generated during evaluation of a time series. For example, a time series can comprise multiple time arrays that are "stitched" together.

Layering framework 1800 produces time array 1808 by applying layer stack 1802 to input data 1820 within context of evaluation time frame 1830. That is, when a time series is evaluated according to evaluation time frame 1830, layering framework 1800 progresses through the one or more layers contained in stack 1802 to retrieve data for the time ranges covered by each layer. For example, assume 1834$a$ and 1834$b$ refer to start and end time, respectively, of evaluation time frame 1830. Layering framework 1800 can produce time array 1808 by accessing source layer 1804 between start time 1834$a$ and end time 1834$b$, which results in source layer 1804 pulling data from source 1824 between start time 1834$a$ and end time 1834$b$ and populating time array 1808 with the pulled data. The values contained in time array 1808 represent the results returned for time series 1801.

Figure 19:
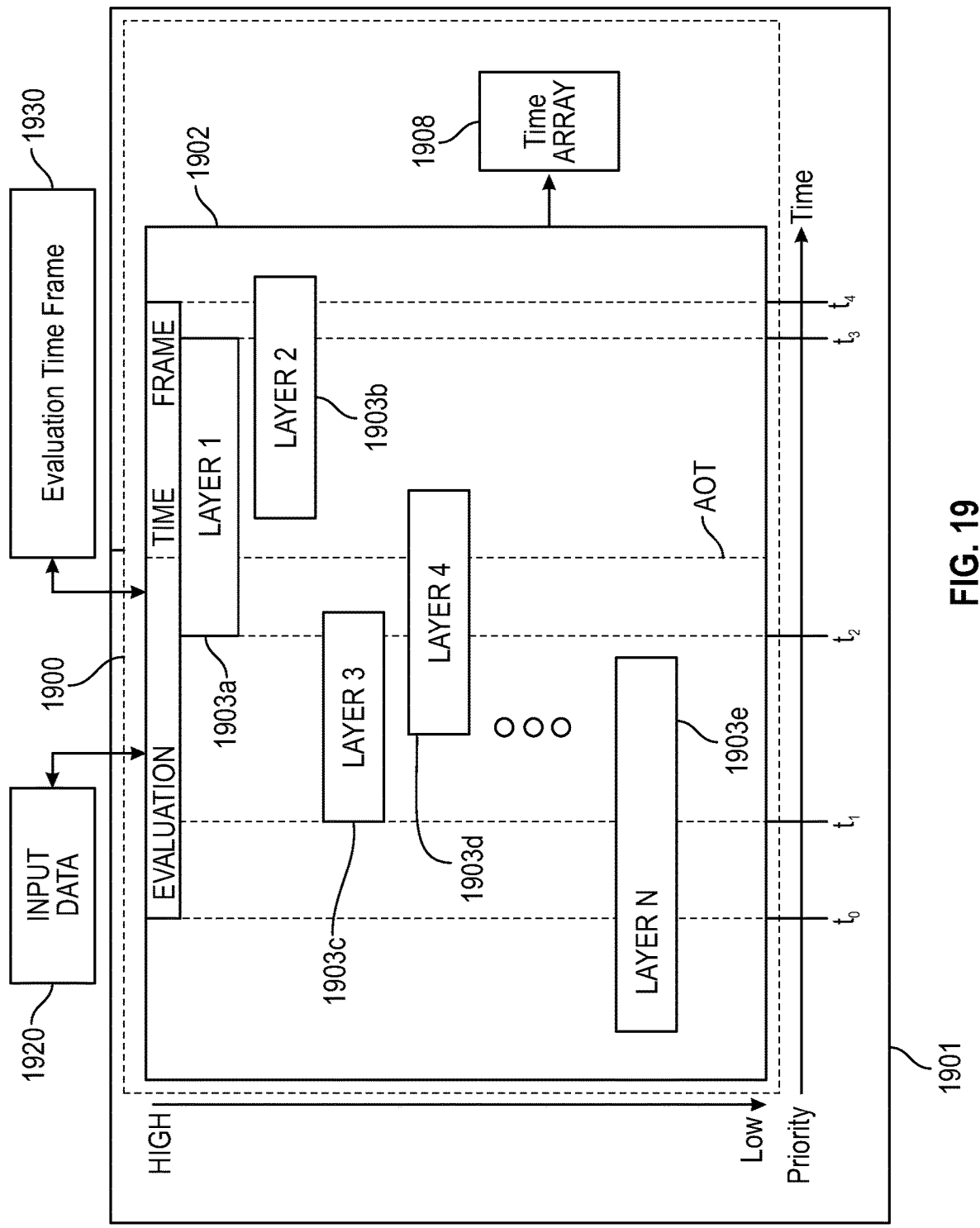
FIG. 19 shows multiple layers can be included in a layer stack of a layering framework according to an embodiment.

Although layer stack 1802 includes only one layer, multiple layers can be included therein. When multiple layers are included, they are arranged in order of priority (e.g., in a top/down priority arrangement) for defining how the time series is evaluated or constructed. Referring now to FIG. 19, multiple layers are shown to be included in layer stack 1902 of layering framework 1900 of time series 1901 according to an embodiment. Layering framework 1900 can include layer stack 1902, have access to input data 1920, and receive evaluation time frame 1930. Layer stack 1902 is shown to include N number of layers, where N is an integer. For example, layers 1903$a$-$e$ are shown. Each of layers 1903$a$-$e$ have respective start and end times, which may be an absolute time or relative to an as of time, defining a natural time range for which data can be retrieved from input data 1920 given a specified as of time. Layers 1903a-e are labeled generically and can be one of a model layer, a source layer, an operation layer, and a time series layer, each pointing to a node in a NOTS graph. As discussed above, a node can include a source, an operation, a model, or a time series.

Layers 1903a-e are arranged in order of priority, shown in FIG. 19, from high to low. The priority establishes which one of layers 1903a-e is used to evaluate time series 1901, the results of which are encapsulated time array 1908. For example, evaluation time frame 1930 spans from time, t0, to time, t4. Layering framework 1900 will access the highest priority layer based on the time requiring evaluation. Thus, in order to evaluate time series 1908 based on evaluation time frame 1930, layering framework 1900 will access layer 1903e from time, t0, to time, t1, access layer 1903c from time, t1, to time t2, access layer 1903a from time, t2, to time, t3, access layer 1903b from time, t3, to time, t4. The priority of the layers can also be used to establish which layer to use if a layer is unable to pull in data from its node. For example, assume that layer 1903c points to a node that malfunctions or is no longer accessible. In such a scenario, layering framework 1900 would access layer 1903e and layer 1903d to evaluate time series 1901 from time, t0, to time, t2.

Figure 20:
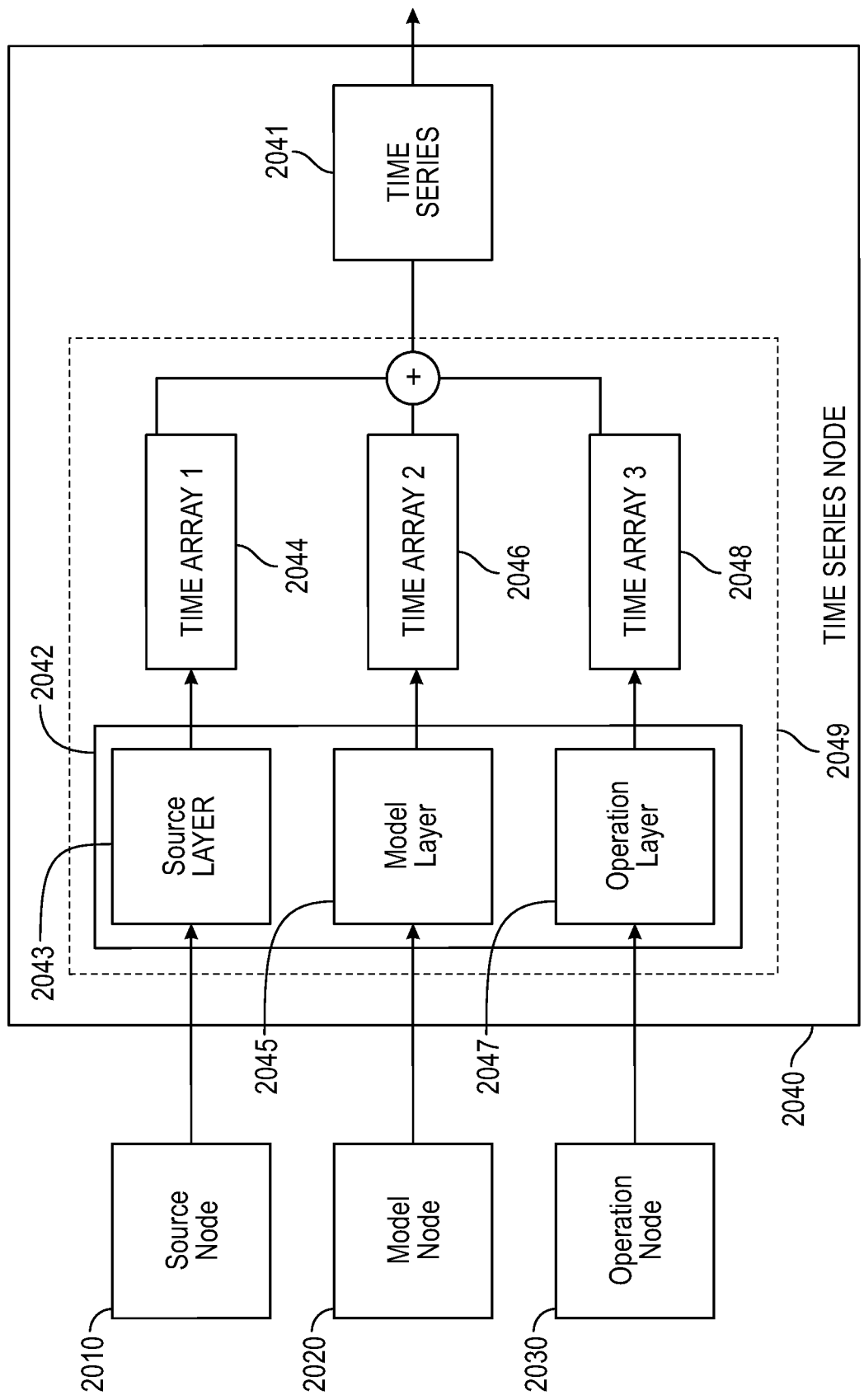
FIG. 20 shows another layering framework according to an embodiment.

FIG. 20 shows illustrative NOTS system 2000 according to an embodiment. NOTS system 2000 can include source node 2010, model node 2020, operation node 2030, and time series node 2040. Other nodes can be part of system 2000 but are excluded to avoid overcrowding the drawing. Time series node 2040 can include layering framework 2049 and time series 2041. Layering framework 2049 can include layer stack 2042, which includes source layer 2043, model layer 2045, and operation layer 2047. Source layer 2043 can return time array 1 2044 based on data received from source node 2010. Model layer 2045 can return time array 2 2046 based on data received from model node 2020. Operation layer 2047 can return time array 3 2048 based on data received from operation node 2030. The combination of time arrays 2044, 2046, and 2048 yield time series 2041. System 2000 illustrates that in order for time series 2041 to be resolved in time series node 2040, all upstream nodes (e.g., shown here as nodes 2010, 2020, and 2030) need to be resolved. When the upstream nodes are resolved, the data contained therein can then be mapped into time series 2041 via layering framework 2049. The output of time series 2041 can be provided to another node (not shown), stored in a database, or used for executing an action (e.g., populating a user interface with graphical or numerical data).

Figure 21A:
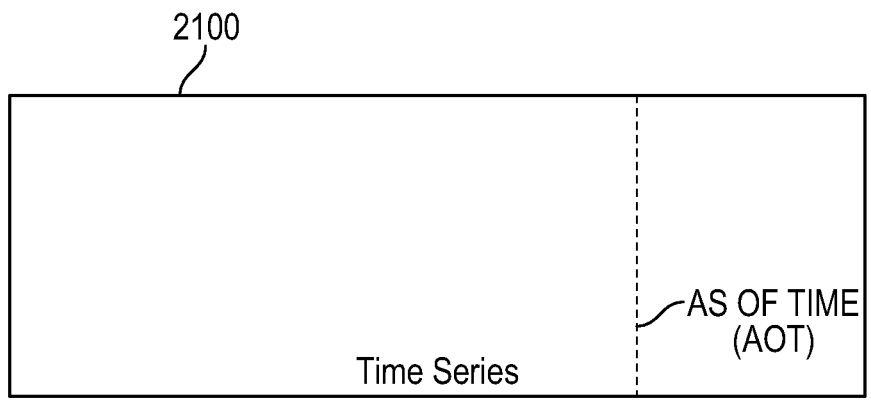
FIGS. 21A-21F shows several different specific examples of time series according to various embodiments.

FIGS. 21A-21F shows several different specific examples of time series according to various embodiments. Each time series (except that shown in FIG. 21A) shows an illustrative 'as of time' (AOT), one or more layers, and an evaluation time frame. Each time series has access to input data (not shown) required by each layer contained therein. Each time series is represented by the layers contained therein and the evaluation time frame. FIGS. 21A-21F represent condensed pictograph versions of a time series generated or evaluated by a layering framework (e.g., layering framework 1800). Each of time series 2110, 2120, 2130, 2140, 2150 returns a time array. FIG. 21A shows an illustrative empty time series 2100. Empty time series 2100 represents that any time series can be created from a blank slate. When evaluating an empty time series, the resulting time array will always contain only null values, regardless of the evaluation time frame.

Figure 21B:
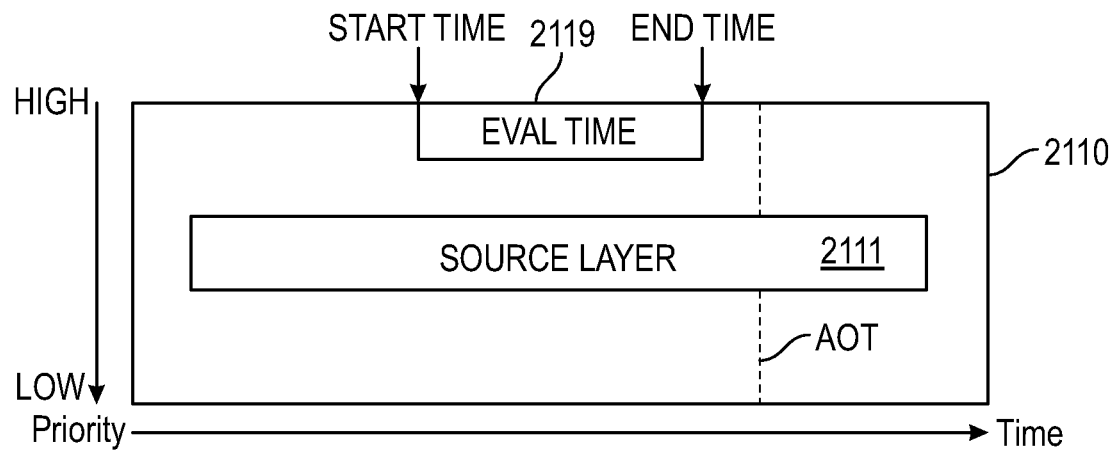

FIG. 21B shows illustrative source time series 2110 that is evaluated using source layer 2111 in conjunction with evaluation time 2119. Source layer 2111 can pull data from a source in an NOTS system and map the pulled data to time series 2110.

Figure 21C:
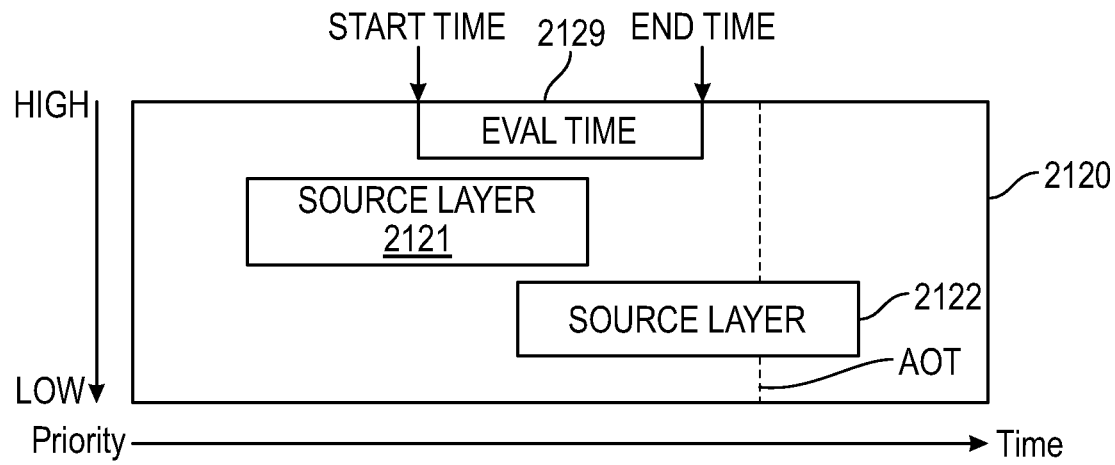

FIG. 21C shows illustrative source time series 2120 that is evaluated using source layer 2121 and source layer 2122 in conjunction with evaluation time 2129. Source layer 2121 has a higher priority than source layer 2122. Source layers 2121 and 2122 may pull data from their respective sources and map the pulled data to time series 2120.

Figure 21D:
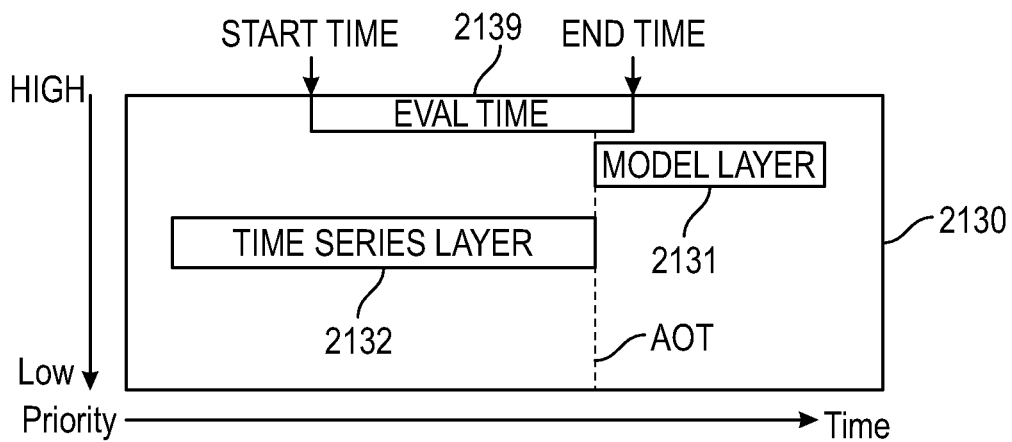

FIG. 21D shows illustrative model time series 2130 that is evaluated using model layer 2131 and time series layer 2132 in conjunction with evaluation time 2139. Model layer 2131 has a higher priority than time series layer 2132. Model layer 2131 can pull data from a model in an NOTS system and map the pulled data to time series 2130. Model layer 2131 points to a model that is trained or fitted before it is able to produce data. Depending on the configuration of model layer 2131, the output can be a prediction (e.g. if it is a linear regression model) or a transformation (e.g. if it is a principal component analysis model). Example models used by model layer 2131 can include linear regression, neural networks, k-means clustering, principal component analysis, and min-max scaling.

Figure 21E:
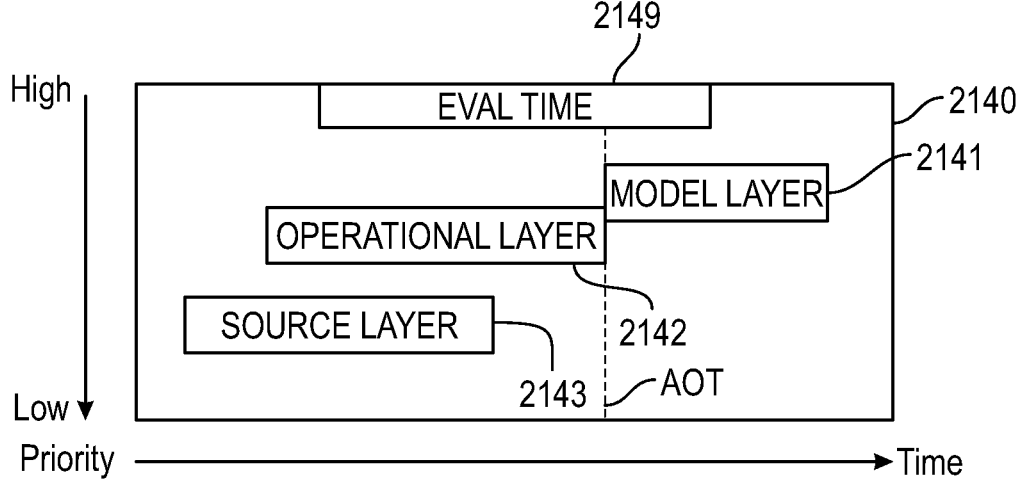

FIG. 21E shows illustrative time series 2140 that is evaluated using model layer 2141, operational layer 2142, and source layer 2143 in conjunction with evaluation time 2149. Model layer 2141 has a higher priority than operational layer 2142, which has a higher priority than source layer 2143. Operational layer 2142 can pull data from an operation in an NOTS system and map the pulled data to time series 2140. Example operations that operational layer 2142 can point to can include multiplying two time series, computing a percentile of a normal distribution, splitting a time series into two smaller sub-arrays.

Figure 21F:
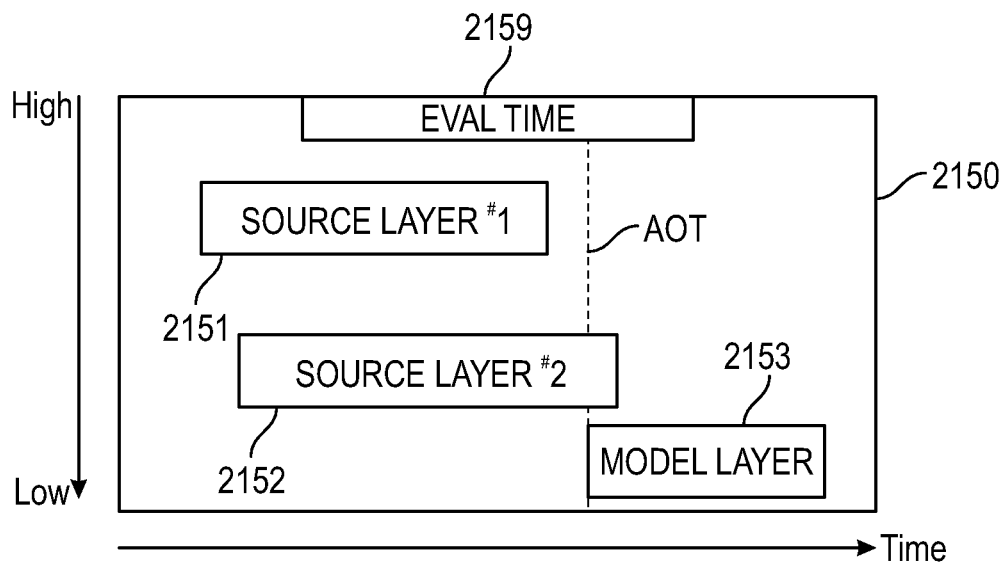

FIG. 21F shows illustrative time series 2150 that is evaluated using source layer 2151, source layer 2152, and model layer 2153 in conjunction with evaluation time 2149. Source layer 2151 has a higher priority than source layer 2152, which has a higher priority than model layer 2153.

The time series, models, and transforms of FIGS. 4A-4D, 5, 6, 6A, 7-12, 13A, 13B, 14-16 can be created using the layering framework according to embodiments discussed herein. For example, a source time series (e.g., source time series 420 of FIG. 4A) can embody the evaluation result of a time series node having a source layer. The source layer would point to a source node (not shown in FIG. 4A). As another example, a model time series (e.g., model time series 450 of FIG. 4D) can be a time series node including a time series layer pointing to source time series 430 and a model layer pointing to model 410. A transform time series can be a time series node having an operational layer. Model 410, for example, may be a model node including at least two source layers pointing to at least one exogenous/features time series and at least one endogenous/targets time series.

Figure 22:
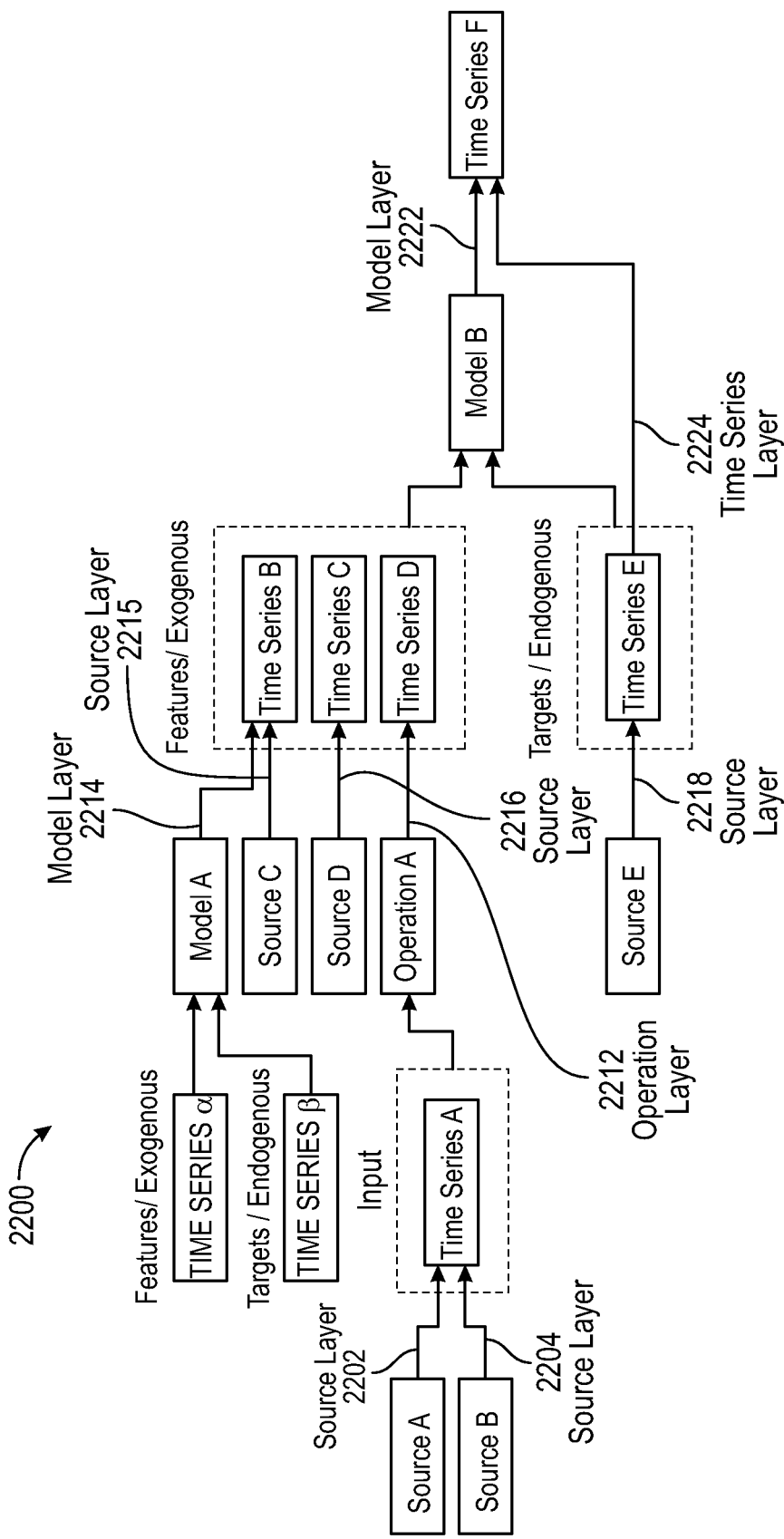
FIG. 22 shows an illustrative network of time series graph according to an embodiment.

Users of the NOTS platform can construct any number of time series and arrange them in any order to achieve a desired result. The user can construct a NOTS graph using the NOTS platform. An example of a NOTS graph 2200 is shown in FIG. 22. When any time series within a NOTS graph is evaluated, this triggers all upstream nodes (e.g., other time series, sources, models, or operations) to be evaluated. For many NOTS graphs, data may be introduced by sources such as, for example, sources A-E. As discussed above, the sources are incorporated into a time series via one or more layers (e.g., source layers). The time series can be transformed by operations or models, or in some embodiments, copied to another time series. These transformed time series are transformed through application of one or more layers (as discussed above). NOTS graph 2200 is now discussed in more detail.

NOTS graph 2200 includes many nodes arranged in a particular order to produce time series F. Each node is represented by a source, a time series, a model, or operation. As shown, sources A and B are mapped into time series A via respective source layers 2202 and 2204. Time series A can be generated using, for example, time series 2120 of FIG. 21C. Time series A is provided to operation A, which maps time series A to time series D via application of operation layer 2212. Model A receives exogenous and endogenous input time series a and (3, respectively, which may also be referred to as features and targets, respectively and maps the output of model A to time series B via application of model layer 2214. Source C may be mapped to time series B via application of source layer 2215. Source D may be mapped to time series C via application of source layer 2216. Source E may be mapped to time series E via application of source layer 2218. Times series B, C, and D are provided to model B as exogenous inputs and time series E is provided to model B as an endogenous input. Model B is first trained on its exogenous and endogenous inputs, and then generates outputs based on those inputs, outputs that are mapped to time series F via application of model layer 2222. Time series E is also mapped to time series F via application of time series layer 2224.

When time series F is evaluated according to a user defined evaluation time frame, all of the nodes upstream of time series F are evaluated accordingly so that time series F is populated with the appropriate time array. For example, assume that time evaluation range is −4 to +8 hours with respect of an as of time of now. Model B is evaluated, for example, to determine time series data between 0 and +8 hours, and time series E is evaluated to ascertain time series data between −4 to 0 hours. Then time series B, C, and D are evaluated with respect to times 0 to +8 hours. Then time series A is evaluated for times 0 to +8 hours because it is an input required of time series D.

Figure 23:
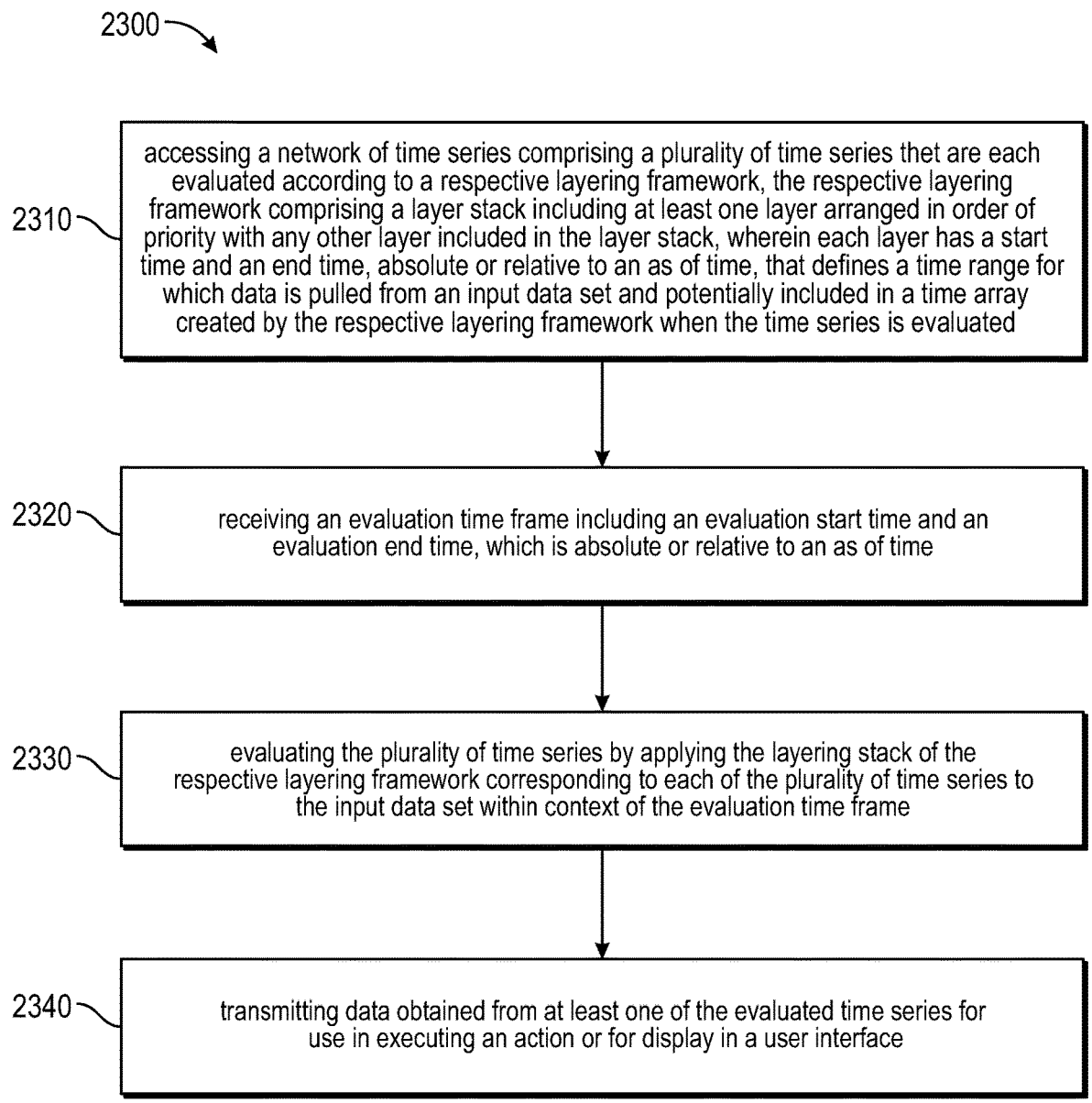
FIG. 23 shows an illustrative process for evaluating time series in a network of time series platform according to an embodiment.

FIG. 23 shows illustrative process 2300 for evaluating time series in a network of time series platform according to an embodiment. Starting at step 2310, a network of time series is accessed. For example, NOTS 2200 of FIG. 22 can be accessed. The network of time series includes a plurality of time series that are each evaluated according to a respective layering framework. The respective layering framework can include a layer stack including at least one layer arranged in order of priority with any other layer included in the layer stack, wherein each layer has a start time and an end time, absolute or relative to an as of time, that defines a time range for which data is pulled from an input data set and potentially included in a time array created by the respective layering framework when the time series is evaluated. The layering framework can be, for example, layering framework 1800 or 1900, as discussed above. The input data collectively refers to any input data set that is accessed by a layer. The input data accessed by a layer can be a time series, an output of a model, an output of an operation, or a data source. Each layer within the layer stack is designed to pull data from a specific input data set that consists of other nodes in the NOTS. In some cases, the specific input data set is output provided by another one of the time series within the plurality of time series. In other cases, the specific input data set can be a source. A layer within the layer stack can be a source layer, an operation layer, a time series layer, or a model layer.

At step 2320, an evaluation time frame including an evaluation start time and an evaluation end time can be received. The evaluation time frame is absolute or relative to an as of time. For example, a user of the NOTS platform may desire to obtain data from a specific time series in the NOTS for a range of natural time with respect to an as of time. As a specific example, the user may desire to view electricity load from a start date to an end date for a particular as of time. The evaluation time frame may include time in the future and therefore can include predicted values from a model that is represented through a layer in the time series.

At step 2330, the plurality of time series are evaluated by applying the layering stack of the respective layering framework corresponding to each of the plurality of time series to the input data set within context of the evaluation time frame. For example, in one embodiment, a first time series is selected from the plurality of time series, the first time series associated with a first layering framework including a first layer that accesses a first input data set from a first node, the first layer including a first layer time range. A time overlap between the evaluation time frame and the first layer time range can be determined and data can be retrieved from the first node corresponding to the time overlap. The first time series can be populated with the retrieved data.

As another example, assume that a first time series is selected from the plurality of time series and that, the first time series is associated with a first layering framework. Further assume that the first layering framework includes a first layer that accesses a first input data set from a first node and a second layer that accesses a second input data set from a second node. The first layer can include a first layer time range and the second layer can include a second layer time range. The first layer can have a higher priority than the second layer. A portion of the first layer may overlap a portion of the second layer. In order to determine how to populate the first time series, first and second time overlaps between the evaluation time frame and respective first and second layers are determined. When the first time overlap between the evaluation time frame and the first layer time range is determined, data from the first data set corresponding to the first time overlap can be retrieved and can be populated with the data retrieved from the first data set. When the second time overlap between the evaluation time frame and second layer time range is determined, data from the second data set corresponding to the second time overlap can be retrieved and used to populate the first time series. The second time overlap excludes any time overlap between the first layer time range and the second layer time range because the first layer has priority over the second layer.

At step 2340, data obtained from at least one of the evaluated time series can be transmitted for use in executing an action or for display in a user interface. The data can also be stored in a database or memory. For example, the data can be displayed in a user interface such as that shown in FIG. 24. As another example, the data can be used to execute a purchase or sale of energy, stocks, or commodities.

It should be understood that the steps shown in FIG. 23 are merely illustrative and that additional steps may be added, re-arranged, or omitted.

Figure 24:
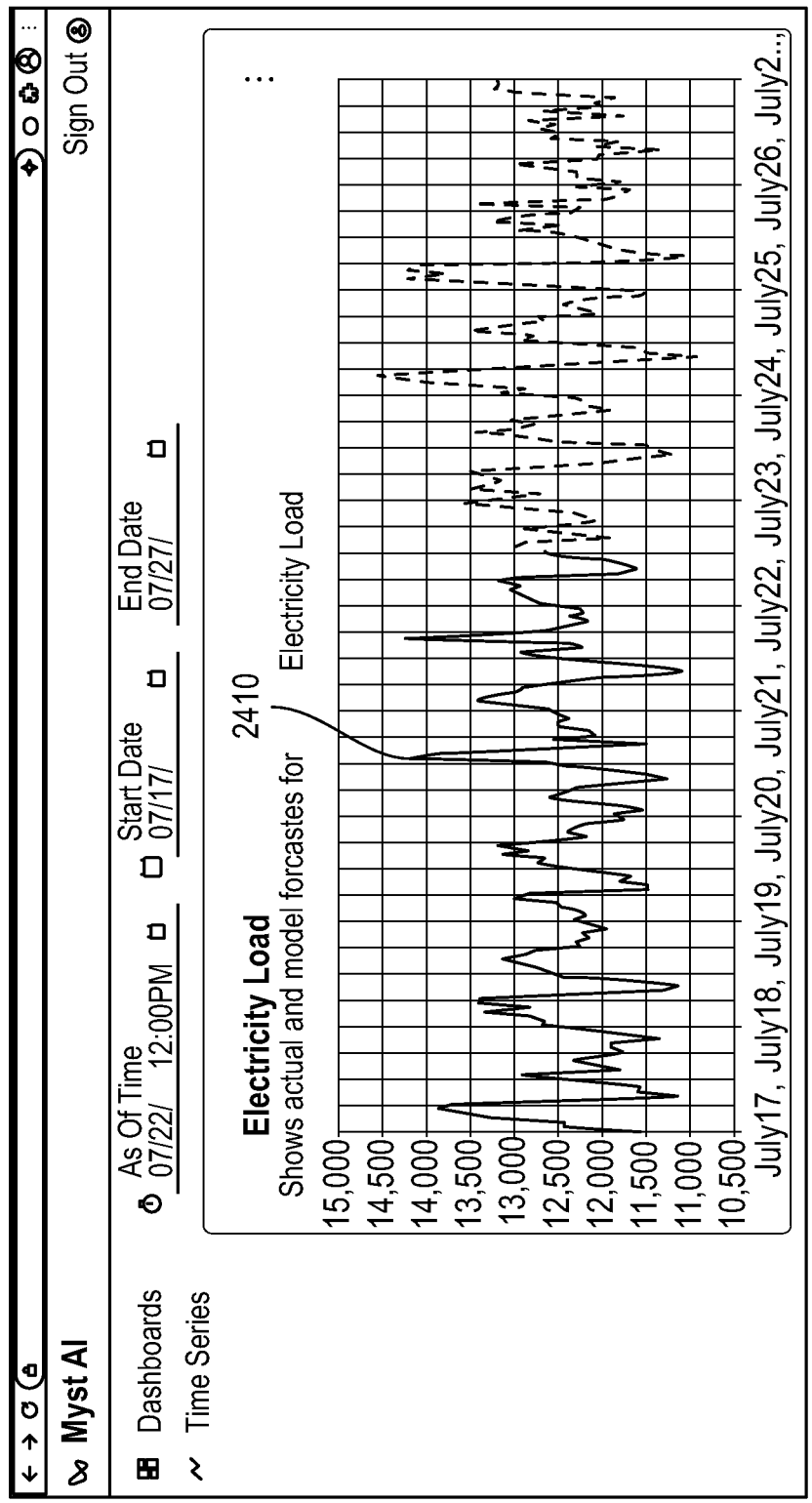
FIG. 24 shows an illustrative user interface showing a time series generated using a NOTS platform according to an embodiment.

FIG. 24 shows illustrative user interface 2400 showing a time series generated using a NOTS platform according to an embodiment. User interface 2400 shows electricity load 2410 from July 17 to July 27 as of 12:00 pm July 22. As shown, electricity load 2410 is shown as either a solid line or a dashed line. The solid line represents known and monitored electricity load and the dashed line represents the forecasted electricity load obtained from a time series generated using a NOTS platform.

Figure 25:
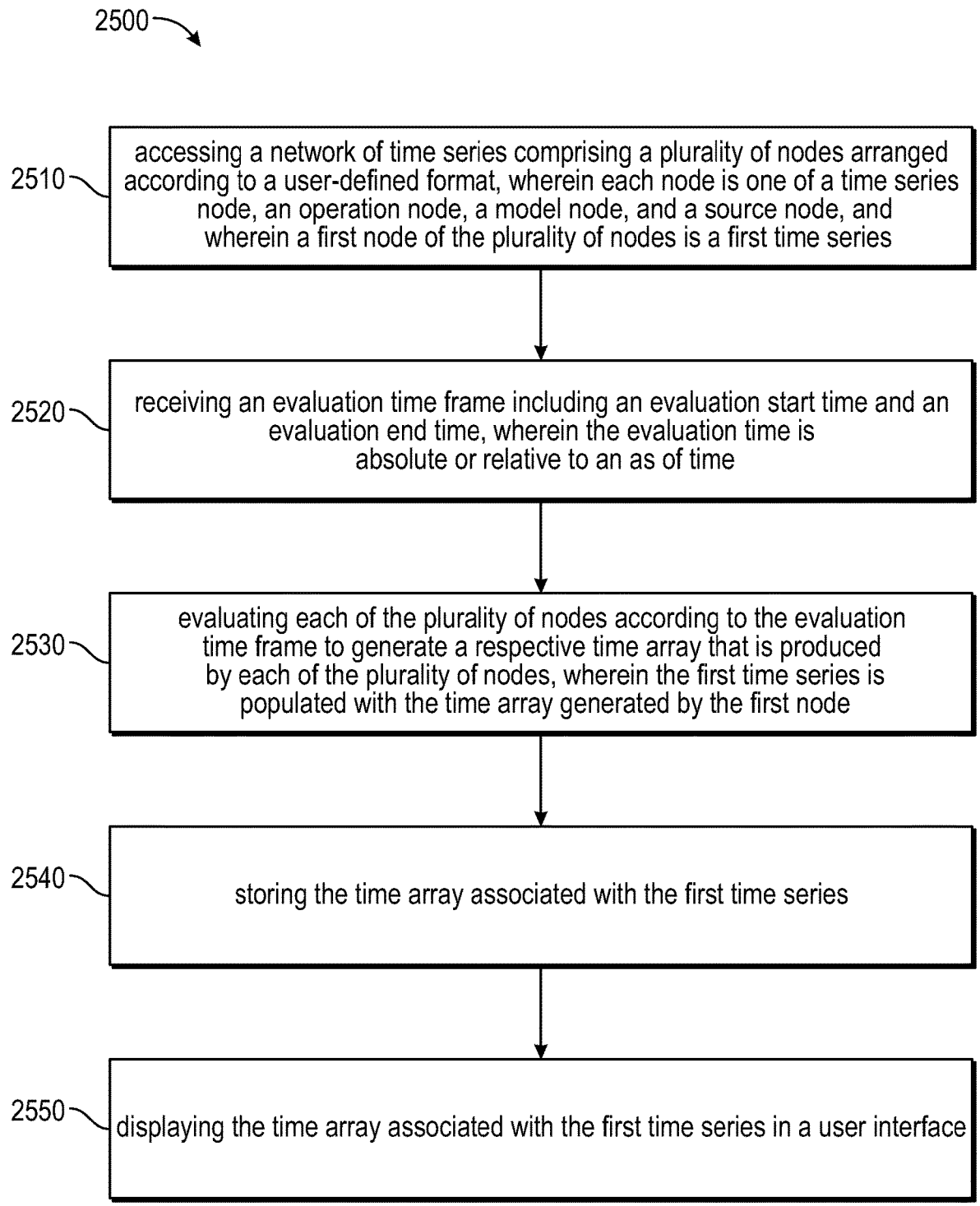
FIG. 25 shows an illustrative process according to an embodiment.

FIG. 25 shows illustrative process 2500 according to an embodiment. Starting at step 2510, a network of time series comprising a plurality of nodes arranged according to a user-defined format can be accessed, wherein each node is one of a time series node, an operation node, a model node, and a source node, and wherein a first node of the plurality of nodes is a first time series. The user-defined format is an upstream to downstream format in which any upstream node directly or indirectly feeds into a downstream node, and wherein a position of each of the plurality of nodes within the upstream to downstream format is arranged by a user using a user interface. The source node can be connected to a particular data source. The operation node executes a stateless transformation. The model node executes an operation using a fitted model. At step 2520, an evaluation time frame including an evaluation start time and an evaluation end time can be received, wherein the evaluation time is absolute or relative to an as of time.

At step 2530, each of the plurality of nodes can be evaluated according to the evaluation time frame to generate a respective time array that is produced by each of the plurality of nodes, wherein the first time series is populated with the time array generated by the first node. The first time series can be evaluated according to a layering framework. The layering framework can include a layer stack including at least one layer arranged in order of priority with any other layer potentially included in the layer stack, wherein each layer has a start time and an end time, absolute or relative to an as of time, that defines a time range for which data is pulled from an input data set and potentially included in a time array being evaluated by the layering framework when the first time series is evaluated. The layer can be a source layer, wherein the source layer is operative to pull source data from a source node. The layer can be an operation layer, wherein the operation layer is operative to pull transformed data obtained from an operation node. The layer can be a model layer, wherein the model layer is operative to pull prediction data obtained from a model node. The layer can be a time series layer, wherein the time series layer is operative to pull time series data from a time series node.

At step 2540, the time array associated with the first time series can be stored, for example, in a database. At step 2450, the time array associated with the first time series can be displayed in a user interface.

It should be understood that the steps shown in FIG. 25 are merely illustrative and that additional steps may be added, re-arranged, or omitted.

Figure 26:
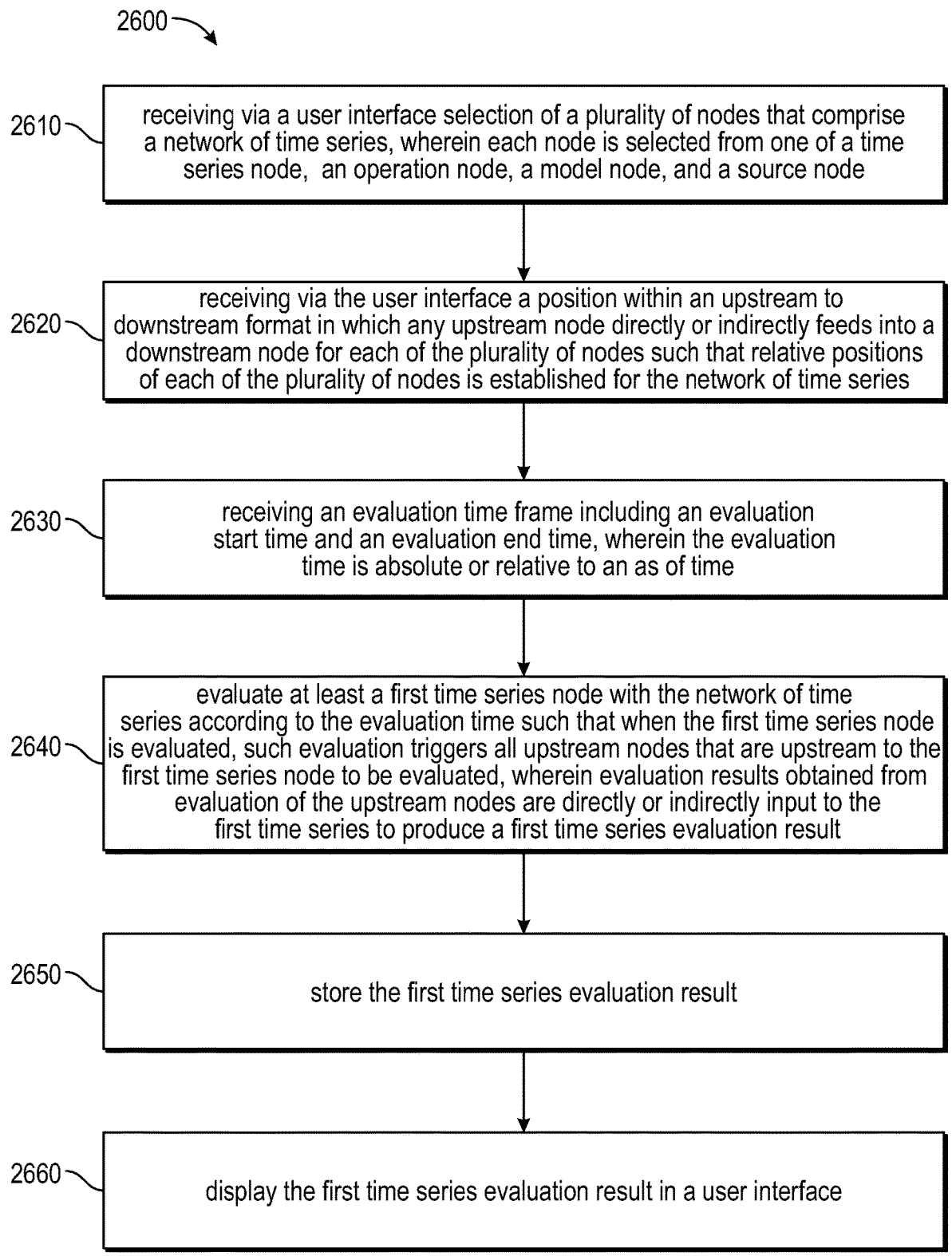
FIG. 26 shows another illustrative process according to an embodiment.

FIG. 26 shows illustrative process 2600 according to an embodiment. Starting at step 2610, selection of a plurality of nodes that comprise a network of time series can be received, wherein each node is selected from one of a time series node, an operation node, a model node, and a source node. At step 2620, a position within an upstream to downstream format can be received via the user interface for each of the plurality of nodes such that relative positions of each of the plurality of nodes is established for the network of time series. The upstream to downstream format specified which upstream nodes directly or indirectly feeds into a downstream node. At step 2630, an evaluation time frame including an evaluation start time and an evaluation end time can be received, wherein the evaluation time is absolute or relative to an as of time.

At step 2640, at least a first time series node with the network of time series is evaluated according to the evaluation time frame such that when the first time series node is evaluated, such evaluation triggers all upstream nodes that are upstream to the first time series node to be evaluated, wherein evaluation results obtained from evaluation of the upstream nodes are directly or indirectly input to the first time series to produce a first time series evaluation result. The first time series node can be evaluated according to a layering framework. The layering framework can include a layer stack including at least one layer arranged in order of priority with any other layer potentially included in the layer stack, wherein each layer has a start time and an end time, absolute or relative to an as of time, that defines a time range for which data is pulled from an input data set included as part of one of the upstream nodes and potentially included in a time array being evaluated by the layering framework when the first time series node is evaluated. At step 2650, the first time series evaluation result can be stored, and displayed in a user interface, at step 2660.

It should be understood that the steps shown in FIG. 26 are merely illustrative and that additional steps may be added, re-arranged, or omitted.

In one embodiment, a computer implemented method for using a network of time series platform is provided that includes defining a network of time series (NOTS) comprising a combination of time series arranged in an upstream to downstream format in which any upstream time series directly or indirectly feeds into a downstream time series. Defining the NOTS include receiving user input via the NOTS platform selection of each time series for inclusion into the combination of time series, where each time series is selected from one of a source time series, a transform time series, and a model time series; arranging, via user input on the NOTS platform, a position of each time series comprising the combination of time series within the upstream to downstream format of the NOTS; and wherein the combination of time series comprises a plurality of source time series and at least one model time series. The method specifies generating predicted values for the at least one model time series using the NOTS, and performing an action based on the generated predicted values.

In one embodiment, the plurality of time series comprises exogenous time series and endogenous time series, wherein a first model of the plurality of models is fit with at least one first exogenous time series and one first endogenous time series, wherein the first model is operative to generate predicted values based on the at least one first exogenous time series, wherein values associated with the at least one first endogenous time series are provided to a first model time series of the plurality of model time series for all combinations of natural time intervals and as of time intervals, and wherein the predicted values for the at least one first endogenous time series generated by the first model are provided to the first model time series and used to overwrite the values provided by the at least one first endogenous time series for specific combinations of natural time intervals and as of time intervals.

In one embodiment, each of the source time series, transform time series, and the model time series comprises a natural time axis and an as of time axis.

In one embodiment, a source time series, transform time series, or a model time series within the NOTS is characterized as one of an upstream time series, a downstream time series, and both an upstream time series and a downstream time series relative to any other source time series, transform time series, or model time series within the NOTS.

In one embodiment, the downstream time series may have a higher intrinsic value than an intrinsic value of upstream time series, and wherein downstream time series produce values that may have lower confidence or a lower accuracy than values produced by upstream time series.

In one embodiment, at least one of the plurality of source time series comprises future predicted values.

In one embodiment, at least one of the model time series is used as an input to one of the plurality of models.

In one embodiment, the generated predicted values are future predicted values.

In one embodiment, the generated predicted values are past predicted values.

In one embodiment, the generated predicted values are present predicted values.

In one embodiment, the generated predicted values are relative to an as of time.

In one embodiment, the generated predicted values are not relative to an as of time.

In one embodiment, the action is performed external to the network of time series platform.

In one embodiment, a computer implemented method for using time series is provided that includes receiving user inputs via a platform to define a network of time series; receiving user inputs via the platform to define an evaluation time period; and evaluating the network of time series based on the evaluation time period. The evaluation includes accessing at least one exogenous time series that supplies values to a model; accessing at least one endogenous time series, wherein the model is configured to predict values associated with the endogenous time series, and wherein the endogenous time series serves as an underlying time series for a model time series; populating the model time series with values supplied by the underlying endogenous time series for all combinations of natural time intervals and as of time intervals; using the at least one exogenous time series and the at least one endogenous time series to fit the model; using the fitted model to generate predicted values based on the at least one exogenous time series; using the predicted values to overwrite at least one of the underlying values in the model time series for specific combinations of natural time intervals and as of time intervals; and using the model time series as an input to a second model or as a basis for a user to perform an action.

In one embodiment, the model time series includes a natural time axis and an as of time axis, wherein an as of time interval within the as of time axis represents a time from which a predicted value is projected across the natural time axis.

In one embodiment, the predicted values for a specific as of time interval are relative to the as of time interval.

In one embodiment, the model time series includes the predicted values for natural time intervals relative to the as of time interval, wherein a range of natural time intervals spans from a start offset through an end offset.

In one embodiment, the range of natural time intervals exists entirely before the as of time interval, spans across the as of time interval, or exists entirely after the as of time interval.

In one embodiment, the predicted values for a specific as of time interval are not relative to the as of time interval.

In one embodiment, the model time series includes the predicted values for a fixed range of natural time intervals, wherein the range of natural time intervals spans from a start time to an end time.

In one embodiment, the at least one exogenous time series comprises known values and predicted future values.

In one embodiment, a computer implemented method for using time series is provided that includes receiving a time series; formatting the received time series to a standardized time series suitable for use in a network of time series platform, the standardized time series comprising a natural time axis and an as of time axis, wherein an as of time interval within the as of time axis represents a time from which an unknown value, known value, or predicted value is projected across the natural time axis; and using the standardized time series in the network of time series platform.

In one embodiment, the standardized time series includes only deterministically known values.

In one embodiment, the standardized time series includes unknown values, known values, predicted values, or a combination of unknown, known and predicted values.

In one embodiment, the predicted values are obtained from a fitted model that generates the predicted values based on at least one exogenous time series.

In one embodiment, the predicted values for a specific as of time interval are relative to the as of time interval.

In one embodiment, the model generates the predicted values for a range of natural time intervals relative to the as of time intervals, wherein the range of natural time intervals spans from a start offset through an end offset.

In one embodiment, the range of natural time intervals exists entirely before the as of time interval, spans across the as of time interval, or exists entirely after the as of time interval.

In one embodiment, the predicted values for a specific as of time interval are not relative to an as of time interval.

In one embodiment, the model generates the predicted values for a fixed range of natural time intervals, wherein the range of natural time intervals spans from a start time to an end time.

In one embodiment, a computer implemented method for using time series is provided that includes defining a first set of exogenous time series; defining a first set of endogenous time series and a second set of endogenous time series; inputting the first set of exogenous and endogenous time series to fit a first model; inputting the first set of exogenous time series to a first fitted model to generate a first set of predicted values; using the first set of predicted values to populate a first model time series for specific combinations of natural time intervals and as of time intervals, wherein the first model time series uses values from the first set of endogenous time series for all other combinations of natural time intervals and as of time intervals; defining a second set of exogenous time series comprising the first model time series; inputting the second set of exogenous time series and the second set of endogenous time series to fit a second model; inputting the second set of exogenous time series to a second fitted model to generate a second set of predicted values; using the second set of predicted values to populate a second model time series for specific combinations of natural time intervals and as of time intervals, wherein the second model time series uses values from the second set of endogenous time series for all other combinations of natural time intervals and as of time intervals; and executing an action in response to at least one value from the second model time series, wherein each of the first set of exogenous time series, the second set of exogenous time series, the first model time series, the first set of endogenous time series, the second model time series, and the second set of endogenous time series is formatted according to a standardized time series format comprising a natural time axis and an as of time axis, wherein an as of time interval within the as of time axis represents a time from which an unknown, known or predicted value in any of the first model time series and the second model time series is projected across the natural time axis.

In one embodiment, the method further includes displaying, in a user interface, the output from the second model time series.

In one embodiment, the method further includes determining whether the at least one time series is suitable for use in the first set of exogenous time series, wherein the at least one time series is a source time series, a transform time series, or a model time series. If the at least one time series is not determined to be suitable: using a backup time series; using a backup value; or providing a null output. If the at least one time series is determined to be suitable, incorporating that at least one time series into the first set of exogenous time series.

In one embodiment, the method further includes defining a third set of exogenous time series; defining a third set of endogenous time series; inputting the third set of exogenous and endogenous time series to fit a third model; inputting the third set of exogenous time series to a third fitted model to generate a third set of predicted values; using the third set of predicted values to populate a third set of model time series for specific combinations of natural time intervals and as of time intervals, wherein the third set of model time series uses values from a third set of endogenous time series for all other combinations of natural time intervals and as of time intervals; and wherein the second set of exogenous time series further comprises the third model time series.

In one embodiment, the second set of exogenous time series further comprises a source time series.

In one embodiment, the first set of exogenous time series comprise a temperature time series, a humidity time series, a cloud coverage time series, wherein the first set of endogenous time series comprise an electricity load time series; wherein the third set of exogenous time series comprises a solar irradiance time series and the cloud coverage time series, wherein the third set of endogenous time series comprise an solar electricity generation time series; wherein the first model is an electricity load model and the first model time series is an electricity load time series; wherein the third model is a solar electricity generation model and the third model time series is a solar electricity generation time series; wherein the second set of exogenous time series comprises the electrical load time series, the solar energy generation time series, and an oil price time series, wherein the second set of endogenous time series comprise an electricity price time series; wherein the second model is a electricity price model and the second model time series is an electricity price time series; and wherein the action executed in response to values derived from the electricity price model time series comprises purchasing electricity in an electricity wholesale market.

In one embodiment, a monetary value associated with the second model time series is higher than a monetary value associated with the first model time series.

In one embodiment, a network of time series platform is provided that includes an input adapter configured to receive time series data from a plurality of data sources; a model engine, and a transform engine. The model engine is operative to manage a plurality of models; fit at least one model using at least one exogenous time series and at least one endogenous time series received from the time series engine; store the resulting fit result in a database; generate predicted values using at least one exogenous time series received from the time series engine and at least one fitted model; store the resulting predict result in a database; create at least one model time series which uses the values from the at least one endogenous time series for all combinations of as of time intervals and natural time intervals, and the predicted values from the stored predict results to overwrite values for specific combinations of as of time intervals and natural time intervals; and commit the at least one model time series to the plurality of time series managed by the time series engine. The transform engine is operative to manage a plurality of stateless transformations; apply at least one stateless transformation to at least one time series received from the time series engine; create a transform time series that contains the values that are the result of the stateless transformation; and commit the transform time series to the plurality of time series managed by the time series engine. The platform includes a time series engine operative to: manage a plurality of time series including source time series, transform time series, and model time series. The platform includes an output adapter configured to convert a time series to a user defined format; and transmit the known or predicted values in the user defined format to a user device or user service.

In one embodiment, each of the plurality of time series is standardized according to a format comprising a natural time axis and an as of time axis, wherein an as of time interval within the as of time axis represents a time from which a value is projected across the natural time axis.

In one embodiment, the time series engine is configured to access a database comprising at least a subset of the plurality of time series; and retrieve at least one time series from the database for use in the network of time series.

In one embodiment, the input adapter is configured to receive time series data from external sources; and format the received time series data into a standardized format suitable for use in the network of time series.

In one embodiment, the model time series is a first model series, the network of time series further comprises a second model time series, wherein the first model time series is used as an input to a second model that is responsible for generating predicted values that populate the second model time series.

In one embodiment, the method further includes a model adapter operative to enable the model engine to use a first user model located remote from the system in lieu of one of the plurality of native models maintained by the model engine.

In one embodiment, the model engine is operative to generate, using the first user model, the predicted values for the at least one endogenous time series based on the at least one exogenous time series.

In one embodiment, the plurality of data sources are provided by external data vendors.

In one embodiment, a network of time series system is provided that includes an input adapter configured to receive data from a plurality of data sources; a model engine operative manage a plurality of models; a transform engine operative manage a plurality of stateless transformations; and a time series engine operative to manage a plurality of time series including source time series, transform times series, and model time series. The model engine, the transform engine, and the time series engine are collectively operative to define a network of time series to include at least one exogenous time series, at least one endogenous times series, a model time series, and at least one model, wherein the at least one exogenous time series and endogenous time series are populated with data received from one of the plurality of data sources; and generate a predicted value for inclusion into the model time series using the network of time series.

In one embodiment, the network further includes an output adapter configured to convert the model time series to a user defined format and transmit the predicted value in the user defined format to a user device or user service.

In one embodiment, each of the plurality of time series is standardized according to a format comprising a natural time axis and an as of time axis, wherein an as of time interval within the as of time axis represents a time from which a value is projected across the natural time axis.

In one embodiment, the time series engine is configured to access a database comprising at least a subset of the plurality of time series and retrieve at least one time series from the database for use in the network of time series.

In one embodiment, the input adapter is configured to receive time series data and format the received time series data into a standardized format suitable for use in the network of time series.

In one embodiment, the model time series is a first model series, the network of time series further comprises a second model time series, wherein the first model time series is used as an input responsible for populating the second model time series.

In one embodiment, the time series further includes a model engine operative to use models to predict values for an existing time series, which are used to create new model time series for use by the time series engine.

In one embodiment, the time series further includes a transform engine operative to generate a new time series by applying stateless transformations to one or more of the existing plurality of time series, wherein the resulting new transform time series is added to the plurality of time series managed by the time series engine.

In one embodiment, the model engine is operative to fit each of the plurality of models using at least one exogenous time series and at least one endogenous time series.

In one embodiment, the model engine is operative to select a first model within the plurality of models for use in the network of time series generate, using the first model, the predicted values for the at least one endogenous time series based on the at least one exogenous time series.

In one embodiment, the time series further includes a model adapter operative to enable the model engine to use a first user model located remote from the system in lieu of one of the plurality of native models maintained by the model engine.

In one embodiment, the model engine is operative to generate, using the first user model, the predicted values for the at least one endogenous time series based on the at least one exogenous time series.

In one embodiment, the plurality of data sources are data vendors.

In one embodiment, a computer-implemented method for evaluating time series in a network of time series platform is provided that includes accessing a network of time series comprising a plurality of time series that are each evaluated according to a respective layering framework. The respective layering framework includes a layer stack including at least one layer arranged in order of priority with any other layer included in the layer stack, wherein each layer has a start time and an end time, absolute or relative to an as of time, that defines a time range for which data is pulled from an input data set and potentially included in a time array created by the respective layering framework when the time series is evaluated. The method includes receiving an evaluation time frame including an evaluation start time and an evaluation end time, which is absolute or relative to an as of time; evaluating the plurality of time series by applying the layering stack of the respective layering framework corresponding to each of the plurality of time series to the input data set within context of the evaluation time frame; and transmitting data obtained from at least one of the evaluated time series for use in executing an action or for display in a user interface.

In one embodiment, wherein applying the layering stack of the respective layering framework corresponding to each of the plurality of time series to the input data within context of the evaluation time frame includes selecting a first layer within the at least one layer based on the time range of the first layer that overlaps the evaluation time range and the priority of the first layer; and using the selected first layer to retrieve data from the input data set to populate the time series.

In one embodiment, wherein applying the layering stack of the respective layering framework corresponding to each of the plurality of time series to the input data set within context of the evaluation time frame includes selecting a first time series from the plurality of time series, the first time series associated with a first layering framework comprising a first layer that accesses a first input data set, the first layer including a first layer time range; determining a time overlap between the evaluation time frame and the first layer time range; retrieving data from the first data set corresponding to the time overlap; and populating the first time series with the retrieved data.

In one embodiment, wherein applying the layering stack of the respective layering framework corresponding to each of the plurality of time series to the input data within context of the evaluation time frame includes selecting a first time series and second time series from the plurality of time series, the first time series associated with a first layering framework comprising a first layer that accesses a first input data set and a second layer that accesses a second input data set, the first layer including a first layer time range, the second layer including a second layer time range, wherein the first layer has a higher priority than the second layer; determining a first time overlap between the evaluation time frame and the first layer time range; retrieving data from the first data set corresponding to the first time overlap; populating the first time series with the data retrieved from the first data set; determining a second time overlap between the evaluation time frame and second layer time range, wherein the second time overlap excludes any time overlap between the first layer time range and the second layer time range; retrieving data from the second data set corresponding to the second time overlap; populating the first time series with the data retrieved from the second data set.

In one embodiment, the input data accessed by a layer is selected from the group consisting of a time series, an output of a model, an output of an operation, or a source.

In one embodiment, each layer within the layer stack is designed to pull data from a specific input data set, wherein the input data comprises the specific input data set.

In one embodiment, the specific input data set is output provided by another one of the time series within the plurality of time series.

In one embodiment, the specific input data set is a source.

In one embodiment, a layer within the layer stack is selected from a source layer, an operation layer, a time series layer, and a model layer.

In one embodiment, a network of time series platform is provided that includes a processor; and a non-transitory computer-readable storage medium including instructions stored thereon, which when executed by the processor, cause the platform to perform operations including: accessing a network of time series comprising a plurality of time series that are each evaluated according to a respective layering framework, the respective layering framework including: a layer stack including at least one layer arranged in order of priority with any other layer included in the layer stack, wherein each layer has a start time and an end time that defines a time range for which data is pulled from input data and potentially included in a time series being evaluated by the respective layering framework; receiving an evaluation time frame including an evaluation start time and an evaluation end time, which is absolute or relative to an as of time; evaluating the plurality of time series by applying the layering stack of the respective layering framework corresponding to each of the plurality of time series to the input data within context of the evaluation time frame; and transmitting data obtained from at least one of the evaluated time series for use in executing an action or for display in a user interface.

In one embodiment, the platform can perform operations including selecting a first layer within the at least one layer based on the time range of the first layer that overlaps the evaluation time range and the priority of the first layer; and using the selected first layer to retrieve data from the input data to populate the time series.

In one embodiment, the platform can perform operations including selecting a first time series from the plurality of time series, the first time series associated with a first layering framework comprising a first layer that accesses a first input data set, the first layer including a first layer time range; determining a time overlap between the evaluation time frame and the first layer time range; retrieving data from the first data set corresponding to the time overlap; and populating the first time series with the retrieved data.

In one embodiment, the platform can perform operations including selecting a first time series and second time series from the plurality of time series, the first time series associated with a first layering framework comprising a first layer that accesses a first input data set and a second layer that accesses a second input data set, the first layer including a first layer time range, the second layer including a second layer time range, wherein the first layer has a higher priority than the second layer; determining a first time overlap between the evaluation time frame and the first layer time range; retrieving data from the first data set corresponding to the first time overlap; and populating the first time series with the data retrieved from the first data set; determining a second time overlap between the evaluation time frame and second layer time range, wherein the second time overlap excludes any time overlap between the first layer time range and the second layer time range; retrieving data from the second data set corresponding to the second time overlap; populating the first time series with the data retrieved from the second data set.

In one embodiment, the input data accessed by a layer is selected from the group consisting of a time series, an output of a model, an output of an operation, or a source.

In one embodiment, each layer within the layer stack is designed to pull data from a specific input data set, wherein the input data comprises the specific input data set.

In one embodiment, the specific input data set is output provided by another one of the time series within the plurality of time series.

In one embodiment, the specific input data set is a data source.

In one embodiment, a layer within the layer stack is selected from a source layer, an operation layer, a time series layer, and a model layer.

In one embodiment, a method is provided for accessing a network of time series comprising a plurality of nodes arranged according to a user-defined format, wherein each node is one of a time series node, an operation node, a model node, and a source node, and wherein a first node of the plurality of nodes is a first time series; receiving an evaluation time frame including an evaluation start time and an evaluation end time, wherein the evaluation time is absolute or relative to an as of time; evaluating each of the plurality of nodes according to the evaluation time frame to generate a respective time array that is produced by each of the plurality of nodes, wherein the first time series is populated with the time array generated by the first node; storing the time array associated with the first time series; and displaying the time array associated with the first time series in a user interface.

In one embodiment, the user-defined format is an upstream to downstream format in which any upstream node directly or indirectly feeds into a downstream node, and wherein a position of each of the plurality of nodes within the upstream to downstream format is arranged by a user using a user interface.

In one embodiment, the first time series is a downstream node.

In one embodiment, the first time series is evaluated according to a layering framework, the layering framework including a layer stack including at least one layer arranged in order of priority with any other layer potentially included in the layer stack, wherein each layer has a start time and an end time, absolute or relative to an as of time, that defines a time range for which data is pulled from an input data set and potentially included in a time array being evaluated by the layering framework when the first time series is evaluated.

In one embodiment, a first of the at least one layer is a source layer, wherein the source layer is operative to pull source data from a source node.

In one embodiment, a second of the at least one layer is an operation layer, wherein the operation layer is operative to pull transformed data obtained from an operation node.

In one embodiment, a third of the at least one layer is a model layer, wherein the model layer is operative to pull prediction data obtained from a model node.

In one embodiment, a fourth of the at least one layer is a time series layer, wherein the time series layer is operative to pull time series data from a time series node.

In one embodiment, wherein the source node is connected to a particular data source.

In one embodiment, the operation node executes a stateless transformation.

In one embodiment, the model node executes an operation using a fitted model.

In one embodiment, a system is provide that includes one or more processors; one or more memories to store one or more machine-readable instructions that, as a result of being performed by the one or more processors, cause the system to at least: receive via a user interface selection of a plurality of nodes that comprise a network of time series, wherein each node is selected from one of a time series node, an operation node, a model node, and a source node; receive via the user interface a position within an upstream to downstream format in which any upstream node directly or indirectly feeds into a downstream node for each of the plurality of nodes such that relative positions of each of the plurality of nodes is established for the network of time series; receive an evaluation time frame including an evaluation start time and an evaluation end time, wherein the evaluation time is absolute or relative to an as of time; evaluate at least a first time series node with the network of time series according to the evaluation time frame such that when the first time series node is evaluated, such evaluation triggers all upstream nodes that are upstream to the first time series node to be evaluated, wherein evaluation results obtained from evaluation of the upstream nodes are directly or indirectly input to the first time series to produce a first time series evaluation result; store the first time series evaluation result; and display the first time series evaluation result in a user interface.

In one embodiment, that instruction can cause the system to at least evaluate the first time series node according to a layering framework, the layering framework including a layer stack including at least one layer arranged in order of priority with any other layer potentially included in the layer stack, wherein each layer has a start time and an end time, absolute or relative to an as of time, that defines a time range for which data is pulled from an input data set included as part of one of the upstream nodes and potentially included in a time array being evaluated by the layering framework when the first time series node is evaluated.

In one embodiment, a first of the at least one layer is a source layer, wherein the source layer is operative to pull source data from a source node.

In one embodiment, a second of the at least one layer is an operation layer, wherein the operation layer is operative to pull transformed data obtained from an operation node.

In one embodiment, a third of the at least one layer is a model layer, wherein the model layer is operative to pull prediction data obtained from a model node.

In one embodiment, a fourth of the at least one layer is a time series layer, wherein the time series layer is operative to pull time series data from a time series node.

Figure 17:
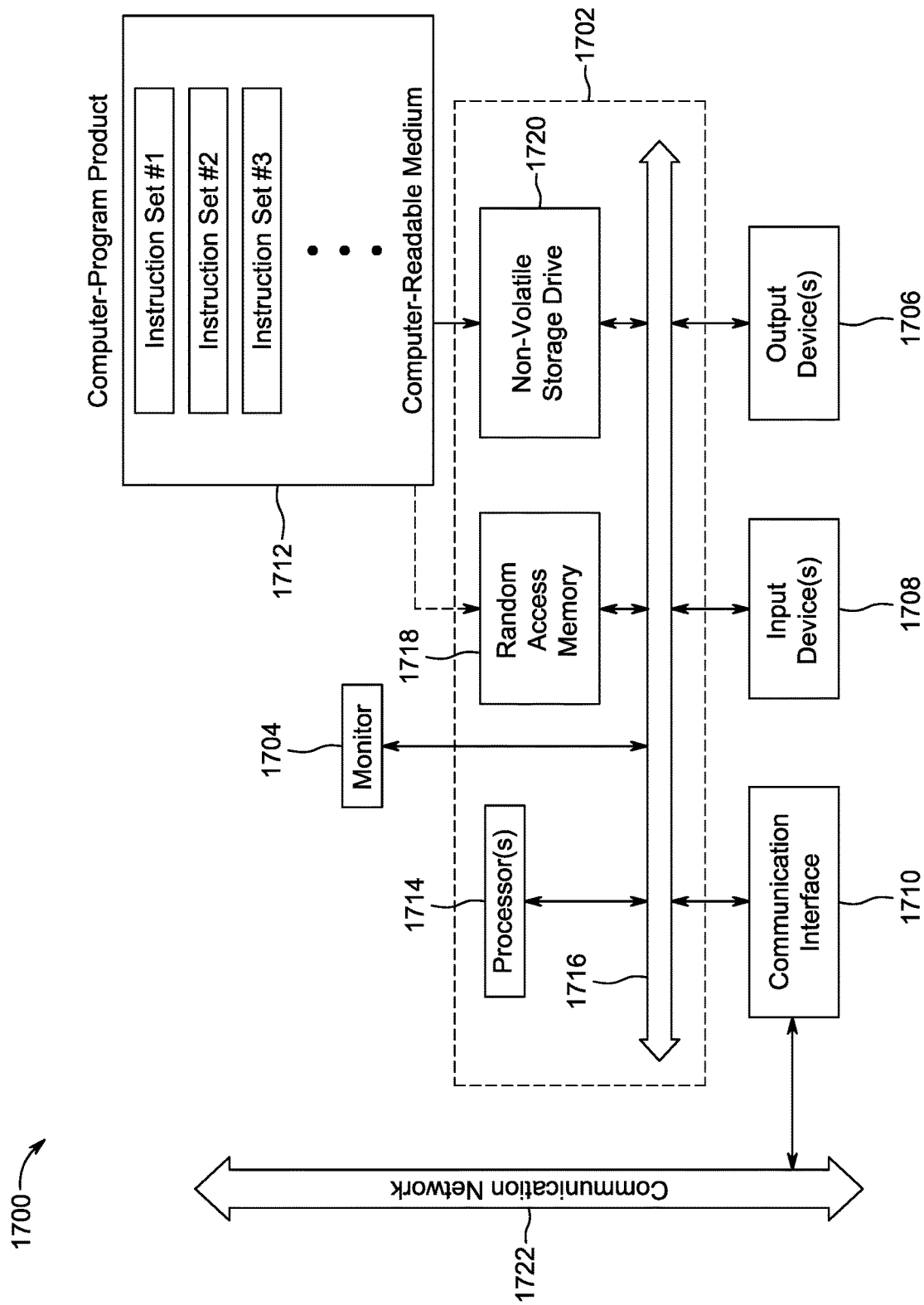
FIG. 17 is a block diagram of a special-purpose computer system according to an embodiment.

FIG. 17 is a block diagram of a special-purpose computer system 1700 according to an embodiment. For example, platform 1200 or any of the methods described herein may be implemented as a special-purpose computer system 1700. The methods and processes described herein may similarly be implemented by tangible, non-transitory computer readable storage mediums and/or computer-program products that direct a computer system to perform the actions of the methods and processes described herein. Each such computer-program product may comprise sets of instructions (e.g., codes) embodied on a computer-readable medium that directs the processor of a computer system to perform corresponding operations. The instructions may be configured to run in sequential order, or in parallel (such as under different processing threads), or in a combination thereof.

Special-purpose computer system 1700 comprises a computer 1702, a monitor 104 coupled to computer 1702, one or more additional user output devices 1706 (optional) coupled to computer 1702, one or more user input devices 1708 (e.g., keyboard, mouse, track ball, touch screen) coupled to computer 1702, an optional communications interface 1710 coupled to computer 1702, and a computer-program product including a tangible computer-readable storage medium 1712 in or accessible to computer 1702. Instructions stored on computer-readable storage medium 1712 may direct system 1700 to perform the methods and processes described herein. Computer 1702 may include one or more processors 1714 that communicate with a number of peripheral devices via a bus subsystem 1716. These peripheral devices may include user output device(s) 1706, user input device(s) 1708, communications interface 1710, and a storage subsystem, such as random access memory (RAM) 1718 and non-volatile storage drive 1720 (e.g., disk drive, optical drive, solid state drive), which are forms of tangible computer-readable memory.

Computer-readable medium 1712 may be loaded into random access memory 1718, stored in non-volatile storage drive 1720, or otherwise accessible to one or more components of computer 1702. Each processor 1714 may comprise a microprocessor, such as a microprocessor from Intel® or Advanced Micro Devices, Inc.®, or the like. To support computer-readable medium 1712, the computer 1702 runs an operating system that handles the communications between computer-readable medium 1712 and the above-noted components, as well as the communications between the above-noted components in support of the computer-readable medium 1712. Exemplary operating systems include Windows® or the like from Microsoft Corporation, Solaris® from Sun Microsystems, LINUX, UNIX, and the like. In many embodiments and as described herein, the computer-program product may be an apparatus (e.g., a hard drive including case, read/write head, etc., a computer disc including case, a memory card including connector, case, etc.) that includes a computer-readable medium (e.g., a disk, a memory chip, etc.). In other embodiments, a computer-program product may comprise the instruction sets, or code modules, themselves, and be embodied on a computer-readable medium.

User input devices 1708 include all possible types of devices and mechanisms to input information to computer system 1702. These may include a keyboard, a keypad, a mouse, a scanner, a digital drawing pad, a touch screen incorporated into the display, audio input devices such as voice recognition systems, microphones, and other types of input devices. In various embodiments, user input devices 1708 are typically embodied as a computer mouse, a trackball, a track pad, a joystick, wireless remote, a drawing tablet, a voice command system. User input devices 1708 typically allow a user to select objects, icons, text and the like that appear on the monitor 1704 via a command such as a click of a button or the like. User output devices 1706 include all possible types of devices and mechanisms to output information from computer 1702. These may include a display (e.g., monitor 1704), printers, non-visual displays such as audio output devices, etc.

Communications interface 1710 provides an interface to other communication networks and devices and may serve as an interface to receive data from and transmit data to other systems, WANs and/or the Internet, via a wired or wireless communication network 1722. Embodiments of communications interface 1710 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1710 may be coupled to a computer network, to a FireWire® bus, or the like. In other embodiments, communications interface 170 may be physically integrated on the motherboard of computer 1702, and/or may be a software program, or the like.

RAM 1718 and non-volatile storage drive 1720 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1718 and non-volatile storage drive 1720 may be configured to store the basic programming and data constructs that provide the functionality of various embodiments of the present invention, as described above.

Software instruction sets that provide the functionality of the present invention may be stored in computer-readable medium 1712, RAM 1718, and/or non-volatile storage drive 1720. These instruction sets or code may be executed by the processor(s) 1714. Computer-readable medium 1712, RAM 1718, and/or non-volatile storage drive 1720 may also provide a repository to store data and data structures used in accordance with the present invention. RAM 1718 and non-volatile storage drive 1720 may include a number of memories including a main random access memory (RAM) to store instructions and data during program execution and a read-only memory (ROM) in which fixed instructions are stored. RAM 1718 and non-volatile storage drive 1720 may include a file storage subsystem providing persistent (non-volatile) storage of program and/or data files. RAM 1718 and non-volatile storage drive 1720 may also include removable storage systems, such as removable flash memory.

Bus subsystem 1716 provides a mechanism to allow the various components and subsystems of computer 1702 communicate with each other as intended. Although bus subsystem 1716 is shown schematically as a single bus, alternative embodiments of the bus subsystem may utilize multiple busses or communication paths within the computer 1702.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C #or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as My SQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk ("DVD") or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

Whereas many alterations and modifications of the present invention will no doubt become apparent to a person of ordinary skill in the art after having read the foregoing description, it is to be understood that the particular embodiments shown and described by way of illustration are in no way intended to be considered limiting.

What is claimed is:

1. A method, implemented by an electronic device comprising a processor, a user interface coupled to the processor, and a memory component coupled to the processor, comprising:

accessing, with the processor, a network of time series comprising a plurality of nodes arranged according to a user-defined format, wherein the plurality of nodes have been selected and arranged by a user via the user interface, wherein each node is one of a time series node, an operation node, a model node, and a source node, wherein each time series node generates a time array based on a layering framework, wherein a third node of the plurality of nodes is a third time series node that returns a third time array, wherein the plurality of nodes other than the third node are positioned upstream from the third node and serve as direct or indirect inputs to the third node, wherein a first model node and a second time series node serve as direct inputs to the third time series node, wherein the first model node is operative to generate predictive data, wherein the layering framework defines a priority order of how data is retrieved from any combination of time series nodes, operation nodes, model nodes, and source nodes serving as direct inputs to a time series node and used to populate the time array for that time series node, wherein the third time array represents results obtained by the third time series node for an evaluation time range, wherein the plurality of nodes of the network of time series comprises:
 a first source node that retrieves, with the processor, first data for a geographic region from a first data source located remote from the electronic device, wherein a first time series node receives the first data from the first source node; and
 a second source node that retrieves, with the processor, historical electricity load, generation, or market price data for the geographic region from a second data source located remote from the electronic device, wherein the second time series node receives the historical electricity load, generation, or market price data from the second source node, and
 wherein the first model node receives the first data from the first time series node and historical electricity load, generation, or market price from the second time series node and generates predictive electricity load, generation, or market price data that populates data in the third time array;

receiving, with the processor, via the user interface, the evaluation time range comprising an evaluation start time and an evaluation end time, wherein the evaluation time range is absolute or relative to an as of time;

evaluating, with the processor, each of the plurality of nodes according to the evaluation time range to generate a respective time array that is produced by each of the plurality of nodes, wherein each time array uniformly sequences data for a specific natural time range and as of time, wherein evaluating the third time series node comprises:

accessing a time series node layering framework that is associated with the third node, wherein the time series node layering framework specifies that the first model node provide data from the as of time to the evaluation end time and that the second time series node provide data from the evaluation start time to the as of time, wherein the time series node layering framework comprises:

a model layer operative to populate a first temporary time array by retrieving predictive electricity load, generation, or market price data from the first model node, wherein the model layer is selected by the user via the user interface, and wherein the user further defines: a first priority order to the model layer; and a first start time and a first end time that define a first time range in which predictive electricity load, generation, or market price data is retrievable from the first model node, wherein the first start time corresponds to the as of time and the first end time corresponds to the evaluation end time; and a time series layer operative to populate a second temporary time array by retrieving historical electricity load, generation, or market price data from the second time series node, wherein the time series layer is selected by the user via the user interface, and wherein the user further defines: a second priority order to the time series layer; and a second start time and second end time that define a second time range in which historical electricity load data is retrievable from the second time series node, wherein the second start time corresponds to the evaluation start time and the second end time corresponds to the as of time; and populating, with the processor, the third time array with data retrieved from the second time series node from the evaluation start time to the as of time and with data retrieved from the first model node from the as of time to the evaluation end time such that the third time array is populated with data supplied by the first model node and the second time series node for the entirety of the evaluation time range, wherein populating the third time array comprises:

determining data retrieval time windows for populating the first third time array based on the evaluation time frame, the first priority order, the second priority order, the first time range, and the second time range, the data retrieval time windows determined by:

determining a first data retrieval time window based on overlap between the evaluation time range and the first time range;

determining a second data retrieval time window based on overlap between the evaluation time range and the second time range;

determining a priority order of the first data retrieval window and the second data time window based on the first priority order and the second priority order;

retrieving predictive electricity load, generation, or market price data from the first model node based on the priority order of the first data retrieval window to populate the first temporary time array, wherein the first data retrieval window spans from the as of time to the evaluation end time;

retrieving historical electricity load, generation, or market price data from the second time series node based on the priority order of the second data retrieval window to populate the second temporary time array, wherein the second data retrieval window spans from the evaluation start time to the as of time; and merging the first temporary time array and the second temporary time array to populate the third time array such the third time array includes predictive electricity load, generation, or market price data and historical load, generation, or market price data;

storing, with the processor, in the memory component, the populated first time array;

populating, with the processor, a display graph in the user interface with the stored populated time array; and displaying, with the processor, in the user interface, the populated display graph, wherein data of the populated display graph displayed in the user interface from the evaluation start time to the as of time is derived from the second time series node, and wherein data of the populated display graph displayed in the user interface from the as of time to the evaluation end time is derived from the first model node and comprises predictive data.

2. The method of claim 1, wherein the user-defined format is an upstream to downstream format in which any upstream node directly or indirectly feeds into a downstream node, and wherein a position of each of the plurality of nodes within the upstream to downstream format is arranged by a user using a user interface.

3. The method of claim 2, wherein the first third time series is a downstream node.

4. The method of claim 1, wherein the source node is connected to a particular data source.

5. The method of claim 1, wherein the operation node executes a stateless transformation.

6. The method of claim 1, wherein the model node executes an operation using a fitted model.

7. The method of claim 1, further comprising:

executing an action based on predictive data contained in the third time array, wherein the action is implemented in a system or platform other than a platform hosting the method.

8. The method of claim 7, wherein the action comprises controlling distribution of electricity or purchasing energy.

9. The method of claim 1, wherein a time array provided by each node of the plurality of nodes arranges data according to a standardized time series format comprising a Natural Time axis and an As of Time axis, wherein the standardized time series format enables the layering framework to pull data from any node that serves as a direct input to a time series node.

10. The method of claim 9, wherein the standardized time series format further enables any upstream node to provide a time array that serves as a direct or indirect input to a downstream node.

11. A system, comprising:
one or more processors;
one or more memories to store one or more machine-readable instructions that, as a result of being performed by the one or more processors, cause the system to at least:

receive via a user interface selection of a plurality of nodes that comprise a network of time series, wherein each node is selected from one of a time series node, an operation node, a model node, and a source node, wherein each time series node returns a time array based on a layering framework;

receive via the user interface a position within an upstream to downstream format in which any upstream node directly or indirectly feeds into a downstream node for each of the plurality of nodes such that relative positions of each of the plurality of nodes is established for the network of time series, wherein a third node of the plurality of nodes is a third time series node that returns a third time array, wherein the plurality of nodes other than the third node are positioned upstream from the third node and serve as direct or indirect inputs to the third node, wherein a first model node and a second time series node serve as direct inputs to the third time series node, wherein the first model node is operative to generate predictive data, wherein the layering framework defines a priority order of how data is retrieved from any combination of time series nodes, operation nodes, model nodes, and source nodes serving as direct inputs to a time series node and used to populate the time array for that time series node, wherein the third time array represents results obtained by the third time series node for an evaluation time frame range, wherein the network of time series comprises:

a first source node that retrieves first data for a geographic region from a first data source located remote to the system, wherein a first time series node receives the first data from the first source node; and a second source node that retrieves second data for the geographic region from a second data source located remote to the system, wherein the second time series node receives the second data from the second source node, and wherein the first model node receives the first data from the first time series node and second data from the second time series node and generates predictive data that populates the third time array;

receive the evaluation time frame including an evaluation start time and an evaluation end time, wherein the evaluation time is absolute or relative to an as of time; evaluate at least the third time series node with the network of time series according to the evaluation time frame such that when the third time series node is evaluated, such evaluation triggers all upstream nodes that are upstream to the third time series node to be evaluated, wherein each time array generated by any of the nodes uniformly sequences data for a specific natural time range and as of time, wherein evaluation of the third time series node causes the system to at least:

access a time series node layering framework that is associated with the third node, wherein the time series node layering framework specifies that the first model node provide data from the as of time to the evaluation end time and that the second time series node provide data from the evaluation start time to the as of time, wherein the time series node layering framework comprises:

a model layer operative to populate a first temporary time array by retrieving predictive data from the first model node, wherein the model layer is selected by the user via the user interface, and wherein the user further defines: a first priority order to the model layer; and a first start time and a first end time that define a first time range in which predictive data is retrievable from the first model node, wherein the first start time corresponds to the as of time and the first end time corresponds to the evaluation end time; and a time series layer operative to populate a second temporary time array by retrieving second data from the second time series node, wherein the time series layer is selected by the user via the user interface, and wherein the user further defines: a second priority order to the time series layer; and a second start time and second end time that define a second time range in which second data is retrievable from the second time series node, wherein the second start time corresponds to the evaluation start time and the second end time corresponds to the as of time; and populate the third time array with data retrieved from the second time series node from the evaluation start time to the as of time and with data retrieved from the first model node from the as of time to the evaluation end time such that the third time array is populated with data supplied by the first model node and the second time series node for the entirety of the evaluation time range, wherein population of the third time array causes the system to:

determine data retrieval time windows for populating the third time array based on the evaluation time frame, the first priority order, the second priority order, the first time range, and the second time range;

determine a first data retrieval time window based on overlap between the evaluation time range and the first time range;

determine a second data retrieval time window based on overlap between the evaluation time range and the second time range;

determine a priority order of the first data retrieval window and the second data time window based on the first priority order and the second priority order;

retrieve predictive data from the first model node based on the priority order of the first data retrieval window to populate the first temporary time array, wherein the first data retrieval window spans from the as of time to the evaluation end time;

retrieve second data from the second time series node based on the priority order of the second data retrieval window to populate the second temporary time array, wherein the second data retrieval window spans from the evaluation start time to the as of time; and merge the first temporary time array and the second temporary time array to populate the third time array such that the third time array includes predictive data and second data;

store, in the one or more memories, the third time series array;

populate a display graph in the user interface with the stored time array; and display in the user interface the populated display graph, wherein data of the populated display graph displayed in the user interface from the evaluation start time to the as of time is derived from the second time series node, and wherein data of the populated display graph displayed in the user interface from the as of time to the evaluation end time is derived from the first model node and comprises predictive data.

12. The system of claim 11 is further operative to:

execute an action based on predictive data contained in the third time array, wherein the action is implemented in a system or platform other than a platform hosting the method.

13. The system of claim 12, wherein the action is a controlled distribution of electricity or a purchase of energy.

14. The system of claim 11, wherein a time array provided by each node of the plurality of nodes arranges data according to a standardized time series format comprising a Natural Time axis and an As of Time axis, wherein the standardized time series format enables the layering framework to pull data from any node that serves as a direct input to a time series node.

15. The system of claim 14, wherein the standardized time series format further enables any upstream node to provide a time array that serves as a direct or indirect input to a downstream node.

* * * * *